United States Patent
Ikeda et al.

(10) Patent No.: US 11,112,961 B2
(45) Date of Patent: Sep. 7, 2021

(54) INFORMATION PROCESSING SYSTEM, INFORMATION PROCESSING METHOD, AND PROGRAM FOR OBJECT TRANSFER BETWEEN DEVICES

(71) Applicant: SONY CORPORATION, Tokyo (JP)

(72) Inventors: Tetsuo Ikeda, Tokyo (JP); Haruo Oba, Kanagawa (JP); Makoto Niijima, Saitama (JP); Rei Fukuda, Tokyo (JP); D. Forrest Matthew, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,665

(22) PCT Filed: Nov. 12, 2018

(86) PCT No.: PCT/JP2018/041786
§ 371 (c)(1),
(2) Date: Jun. 12, 2020

(87) PCT Pub. No.: WO2019/123888
PCT Pub. Date: Jun. 27, 2019

(65) Prior Publication Data
US 2021/0081092 A1 Mar. 18, 2021

(30) Foreign Application Priority Data
Dec. 19, 2017 (JP) .............................. JP2017-242317

(51) Int. Cl.
G06F 3/0488 (2013.01)
G06F 3/01 (2006.01)
G06F 3/0486 (2013.01)

(52) U.S. Cl.
CPC ............ *G06F 3/0488* (2013.01); *G06F 3/011* (2013.01); *G06F 3/0486* (2013.01)

(58) Field of Classification Search
CPC ....... G06F 3/0488; G06F 3/011; G06F 3/0486
See application file for complete search history.

(56) References Cited

U.S. PATENT DOCUMENTS

| 6,545,669 | B1 * | 4/2003 | Kinawi | G06F 3/0486 |
| | | | | 345/1.1 |
| 6,947,162 | B2 * | 9/2005 | Rosenberg | G06F 40/151 |
| | | | | 358/1.15 |

(Continued)

FOREIGN PATENT DOCUMENTS

| GB | 2451274 A | 1/2009 |
| JP | 2010-211407 A | 9/2010 |

(Continued)

*Primary Examiner* — Jung-Mu T Chuang
(74) *Attorney, Agent, or Firm* — Paratus Law Group, PLLC

(57) ABSTRACT

There is provided an information processing system, an information processing method, and a program capable of adaptively controlling a display on a display surface in response to an operation of moving an object in a certain display surface with respect to a transfer object. The information processing system includes a processing unit that performs, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface, and changes a display state of the second display surface based on a detection result of a second operation by the first user after the first operation.

17 Claims, 39 Drawing Sheets

(56) References Cited

U.S. PATENT DOCUMENTS

| | | | | |
|---|---|---|---|---|
| 7,240,063 B2* | 7/2007 | Aoyama | | G06F 16/258 |
| 8,181,114 B2* | 5/2012 | Saka | | H04L 29/06 |
| | | | | 715/748 |
| 8,499,243 B2* | 7/2013 | Yuki | | H04N 21/42204 |
| | | | | 715/735 |
| 8,516,393 B2* | 8/2013 | Davis | | G06F 3/04842 |
| | | | | 715/810 |
| 8,976,210 B2* | 3/2015 | Heyman | | G06T 3/4092 |
| | | | | 345/698 |
| 9,032,325 B2* | 5/2015 | Janssen | | G06F 3/0481 |
| | | | | 715/778 |
| 9,529,820 B2* | 12/2016 | Lwo | | G06F 3/0482 |
| 10,114,522 B2* | 10/2018 | Park | | H04N 21/4782 |
| 10,635,295 B2* | 4/2020 | Seo | | G06F 3/1423 |
| 10,664,162 B2* | 5/2020 | Strode | | G06F 3/0489 |
| 2004/0051943 A1* | 3/2004 | Ashkinazy | | G02B 27/46 |
| | | | | 359/432 |
| 2004/0205616 A1* | 10/2004 | Rosenberg | | G06F 40/151 |
| | | | | 715/205 |
| 2005/0080755 A1* | 4/2005 | Aoyama | | G06F 16/258 |
| 2008/0148184 A1* | 6/2008 | Davis | | G06F 3/1454 |
| | | | | 715/810 |
| 2008/0307324 A1* | 12/2008 | Westen | | H04M 3/563 |
| | | | | 715/753 |
| 2009/0135162 A1* | 5/2009 | Van De Wijdeven | | |
| | | | | G06F 3/04883 |
| | | | | 345/175 |
| 2009/0183088 A1* | 7/2009 | Saka | | H04L 67/06 |
| | | | | 715/751 |
| 2009/0292994 A1* | 11/2009 | Lwo | | G06F 9/543 |
| | | | | 715/733 |
| 2009/0307623 A1* | 12/2009 | Agarawala | | G06F 3/04815 |
| | | | | 715/765 |
| 2010/0045705 A1* | 2/2010 | Vertegaal | | G06F 3/041 |
| | | | | 345/661 |
| 2010/0169791 A1* | 7/2010 | Pering | | G06F 3/1423 |
| | | | | 715/740 |
| 2010/0205628 A1* | 8/2010 | Davis | | H04N 21/41265 |
| | | | | 725/25 |
| 2010/0257473 A1* | 10/2010 | Kang | | G06F 3/0486 |
| | | | | 715/769 |
| 2011/0037732 A1* | 2/2011 | Takama | | G06F 3/042 |
| | | | | 345/175 |
| 2011/0291964 A1* | 12/2011 | Chambers | | G06F 1/1643 |
| | | | | 345/173 |
| 2011/0294433 A1* | 12/2011 | Matsubara | | G06F 3/0484 |
| | | | | 455/41.3 |
| 2012/0005269 A1* | 1/2012 | Janssen | | G06F 3/0481 |
| | | | | 709/203 |
| 2012/0060089 A1* | 3/2012 | Heo | | G06F 3/1431 |
| | | | | 715/702 |
| 2012/0236035 A1* | 9/2012 | Kimura | | H04M 1/0247 |
| | | | | 345/660 |
| 2012/0242599 A1* | 9/2012 | Seo | | G06F 3/1423 |
| | | | | 345/173 |
| 2014/0025513 A1* | 1/2014 | Cooke | | G06Q 20/20 |
| | | | | 705/17 |
| 2014/0026068 A1* | 1/2014 | Park | | H04N 21/41265 |
| | | | | 715/748 |
| 2014/0089823 A1* | 3/2014 | Kang | | G06F 3/04847 |
| | | | | 715/761 |
| 2014/0101577 A1* | 4/2014 | Kwak | | G06F 3/1431 |
| | | | | 715/761 |
| 2014/0101578 A1* | 4/2014 | Kwak | | G06F 1/1647 |
| | | | | 715/761 |
| 2014/0105398 A1* | 4/2014 | Gao | | G06F 1/1662 |
| | | | | 380/270 |
| 2014/0184471 A1* | 7/2014 | Martynov | | G06F 3/0481 |
| | | | | 345/1.2 |
| 2014/0204040 A1* | 7/2014 | Kim | | G06F 3/0483 |
| | | | | 345/173 |
| 2014/0223313 A1* | 8/2014 | Aebi | | G06F 3/0488 |
| | | | | 715/733 |
| 2014/0240199 A1* | 8/2014 | Matsubara | | G09G 5/12 |
| | | | | 345/1.2 |
| 2014/0267090 A1* | 9/2014 | Heyman | | G06F 3/04886 |
| | | | | 345/173 |
| 2014/0282068 A1* | 9/2014 | Levkovitz | | H04L 67/10 |
| | | | | 715/748 |
| 2014/0344053 A1* | 11/2014 | Yang | | H04L 67/26 |
| | | | | 705/14.53 |
| 2015/0094127 A1* | 4/2015 | Canose | | G06F 3/04842 |
| | | | | 463/2 |
| 2015/0296268 A1* | 10/2015 | Lee | | H04N 21/8352 |
| | | | | 713/156 |
| 2016/0124599 A1* | 5/2016 | Joo | | G06F 1/1643 |
| | | | | 715/748 |
| 2016/0259616 A1* | 9/2016 | Hosein | | H04N 21/41265 |
| 2016/0320920 A1* | 11/2016 | Morris | | G06F 3/0416 |
| 2017/0032796 A1* | 2/2017 | Baum | | G10L 19/018 |
| 2017/0052685 A1* | 2/2017 | Kovacs | | G06F 3/0484 |
| 2017/0168651 A1 | 6/2017 | Ikeda et al. | | |
| 2018/0232195 A1* | 8/2018 | Jaegal | | G06F 3/14 |
| 2019/0037611 A1* | 1/2019 | Renn | | G06F 3/0486 |
| 2019/0303052 A1* | 10/2019 | Nakamura | | H04N 1/00506 |
| 2020/0201038 A1* | 6/2020 | Gelman | | G02B 27/0093 |

FOREIGN PATENT DOCUMENTS

| | | |
|---|---|---|
| JP | 2011-070511 A | 4/2011 |
| JP | 2015-090524 A | 5/2015 |
| WO | WO 2011/037222 A1 | 3/2011 |

\* cited by examiner

FIG.10A
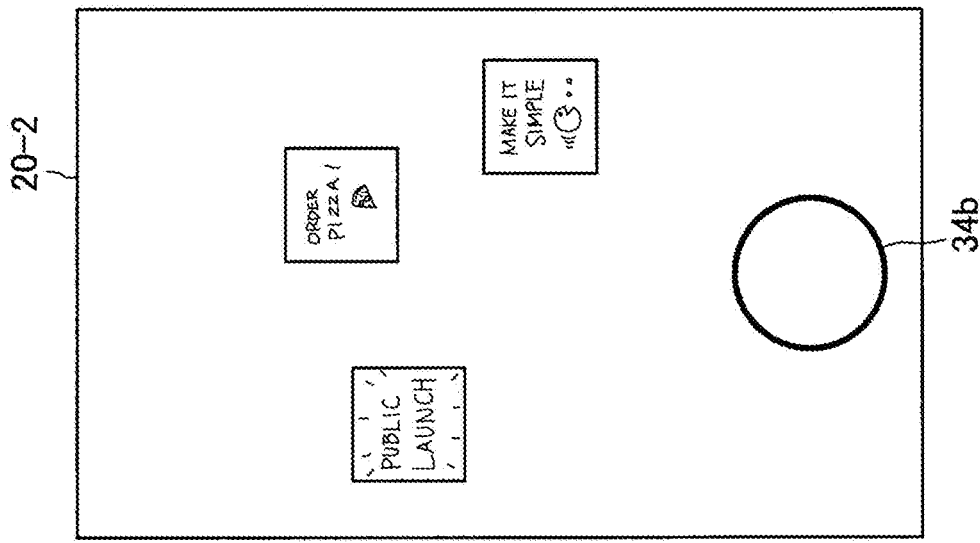
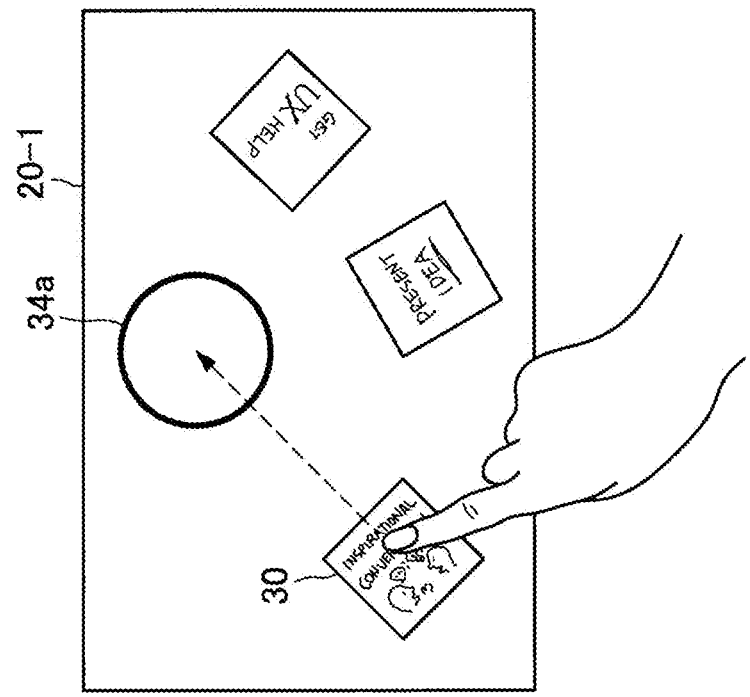

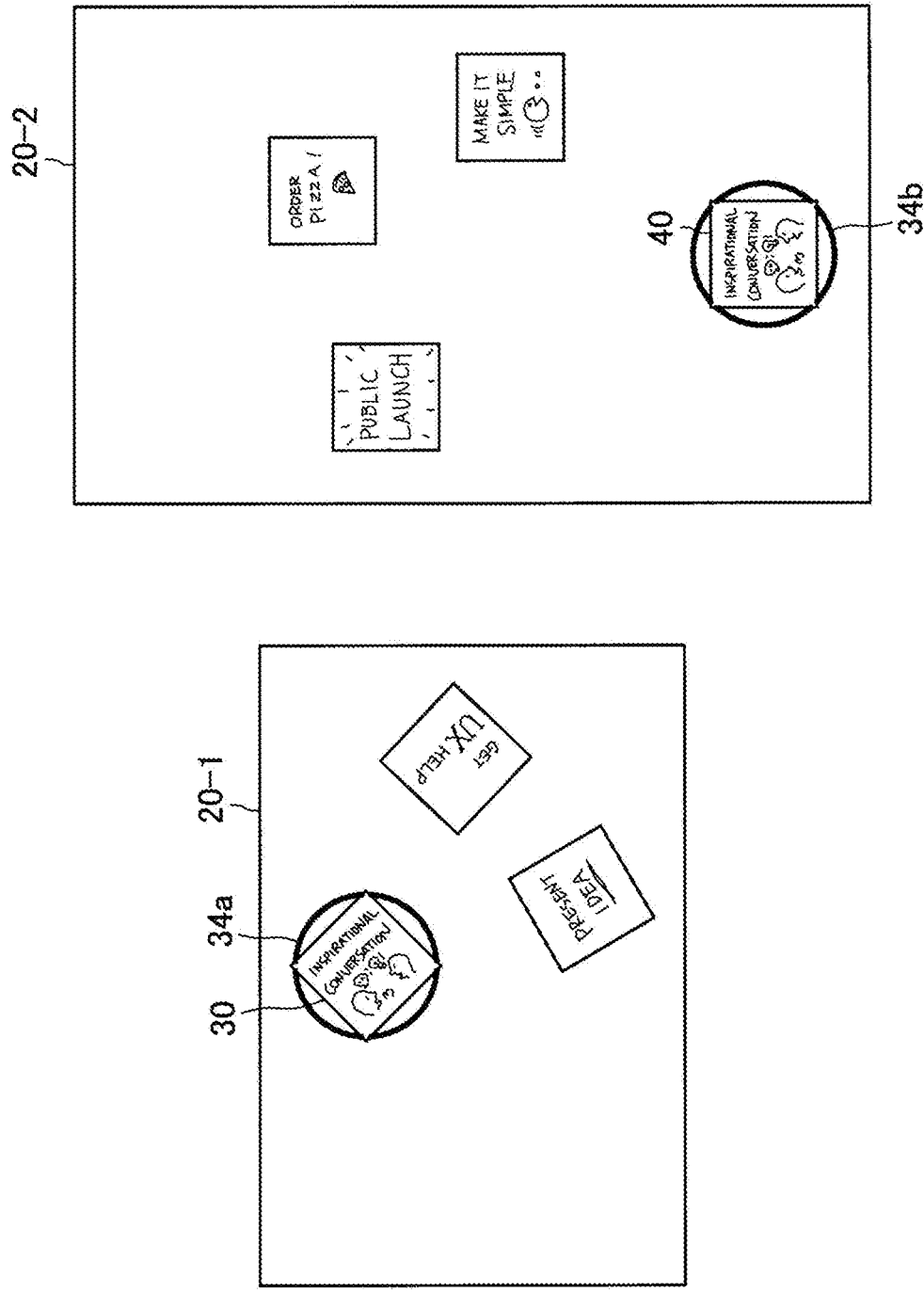

FIG.13
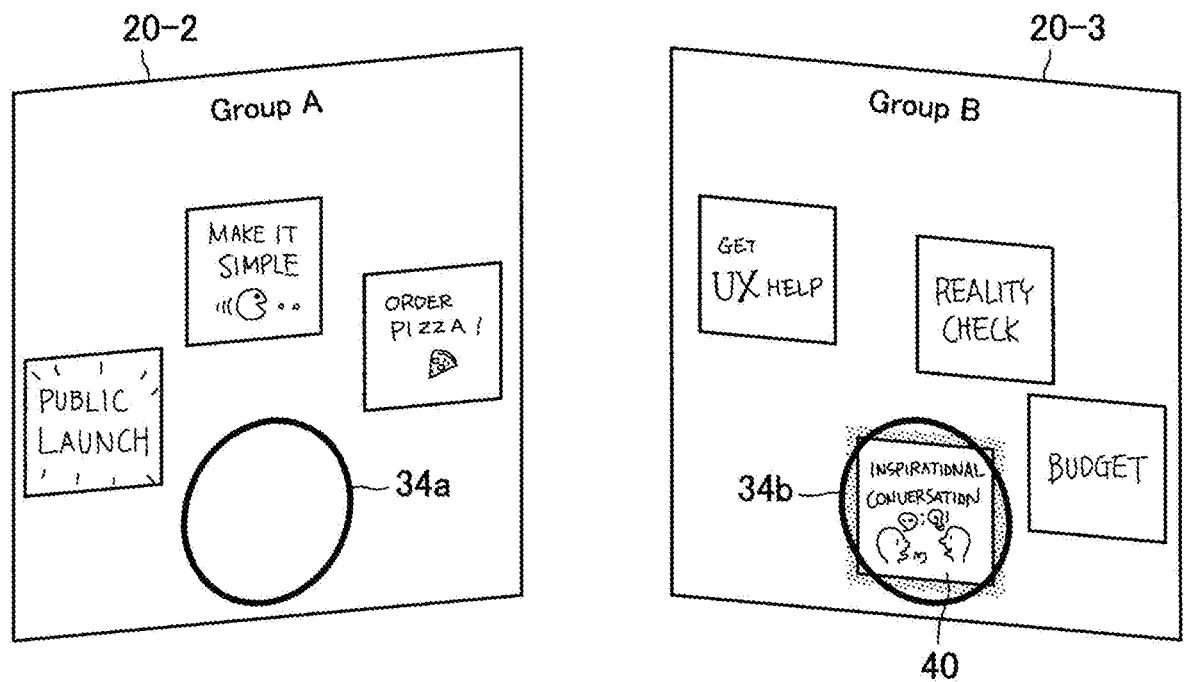
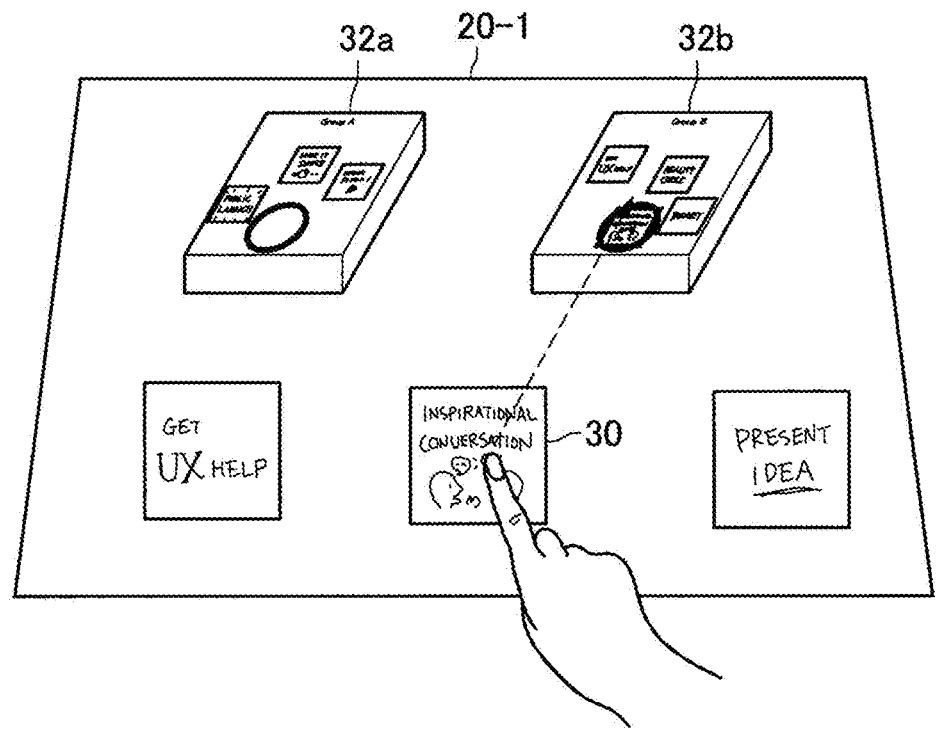

FIG.14
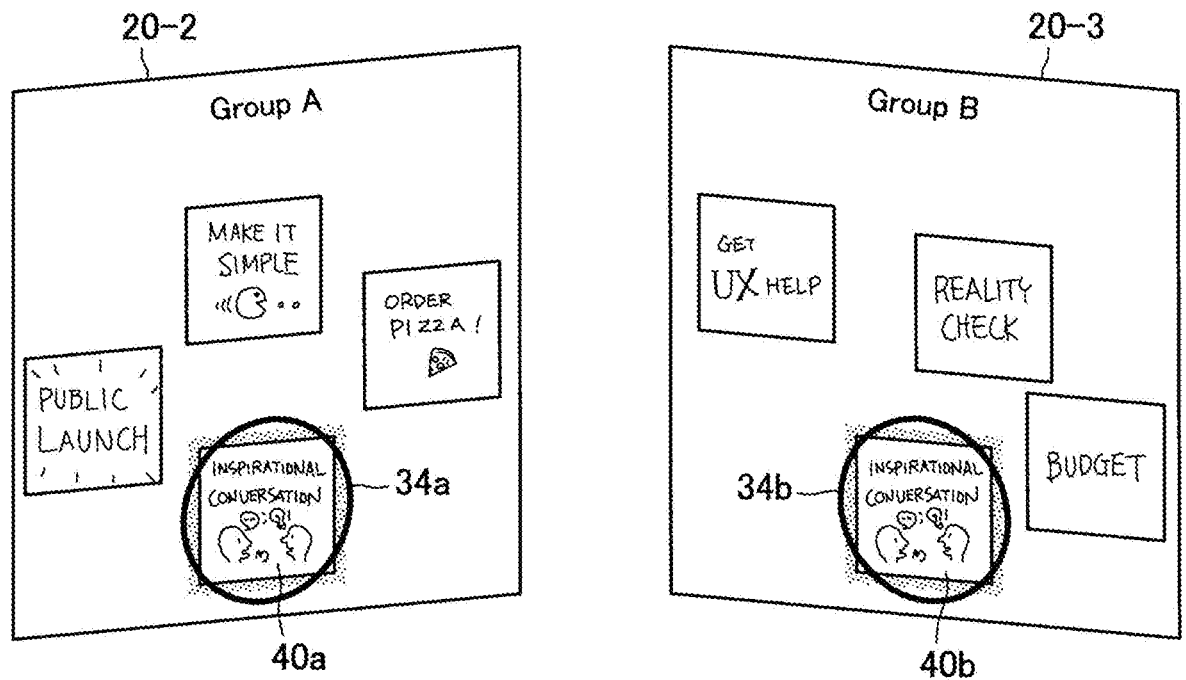
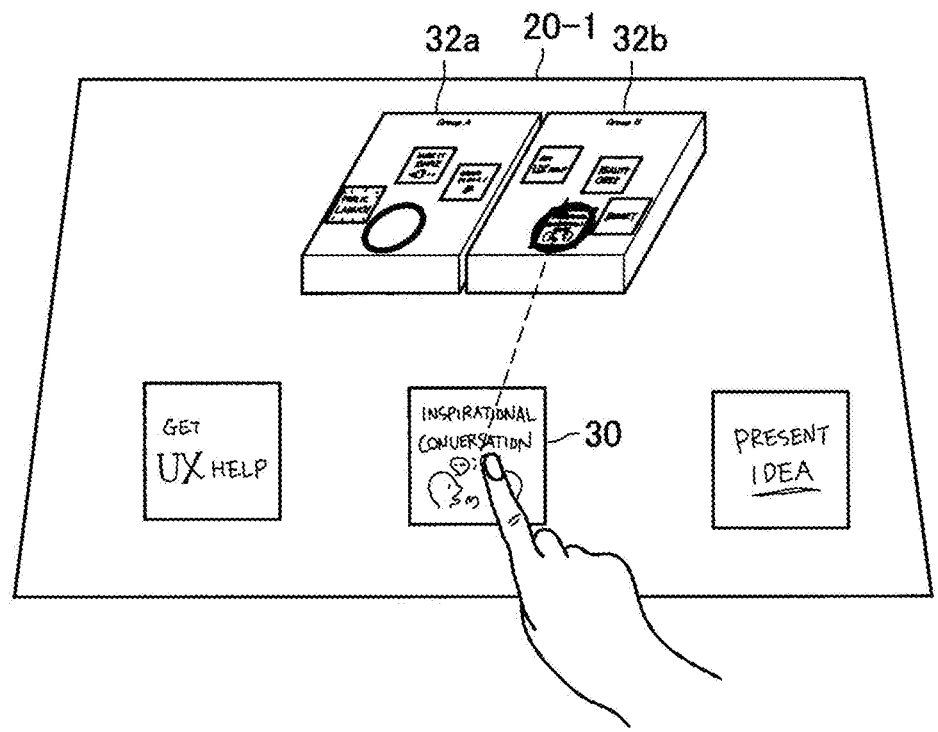

FIG.15
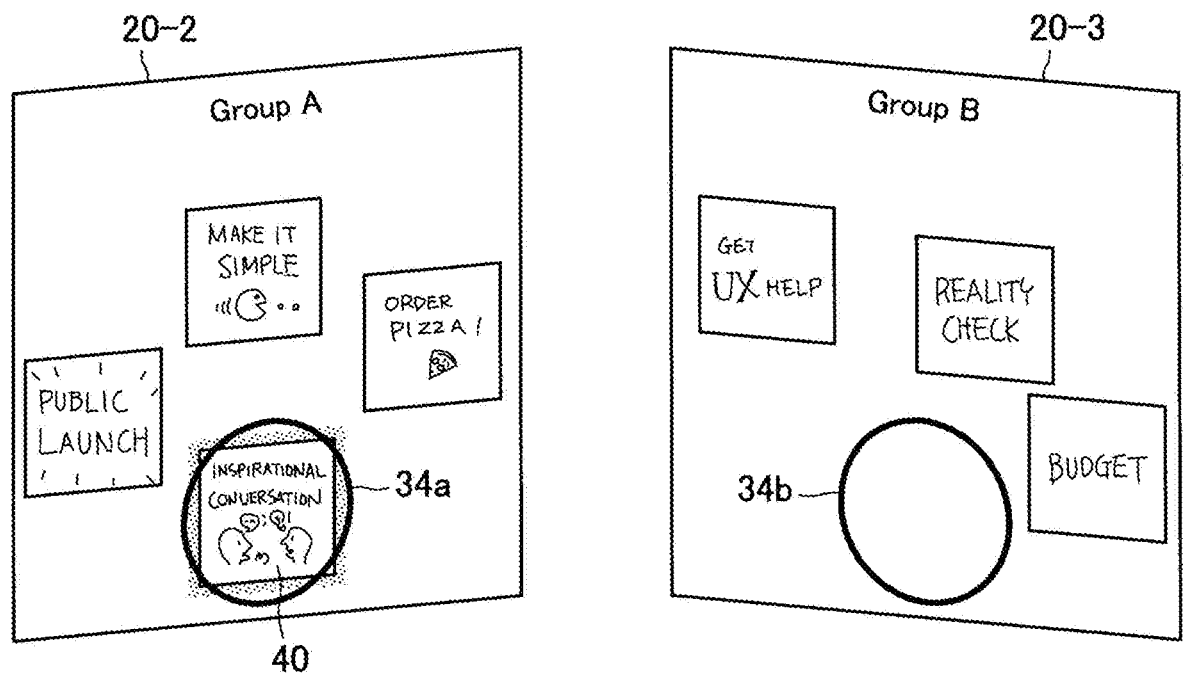
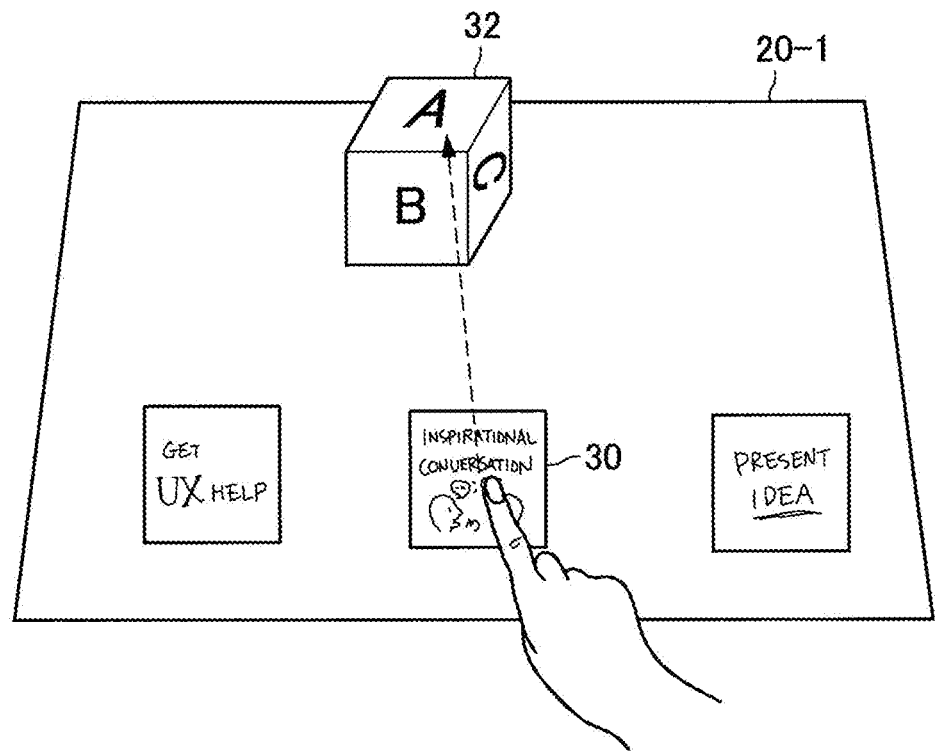

FIG.16
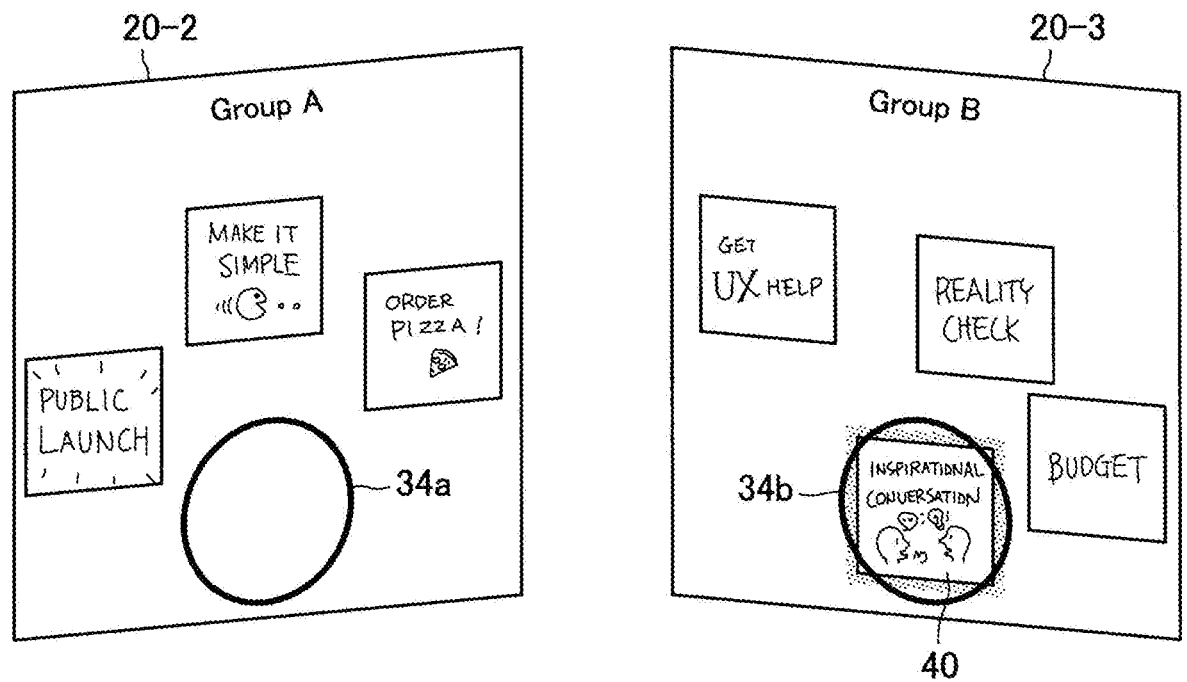
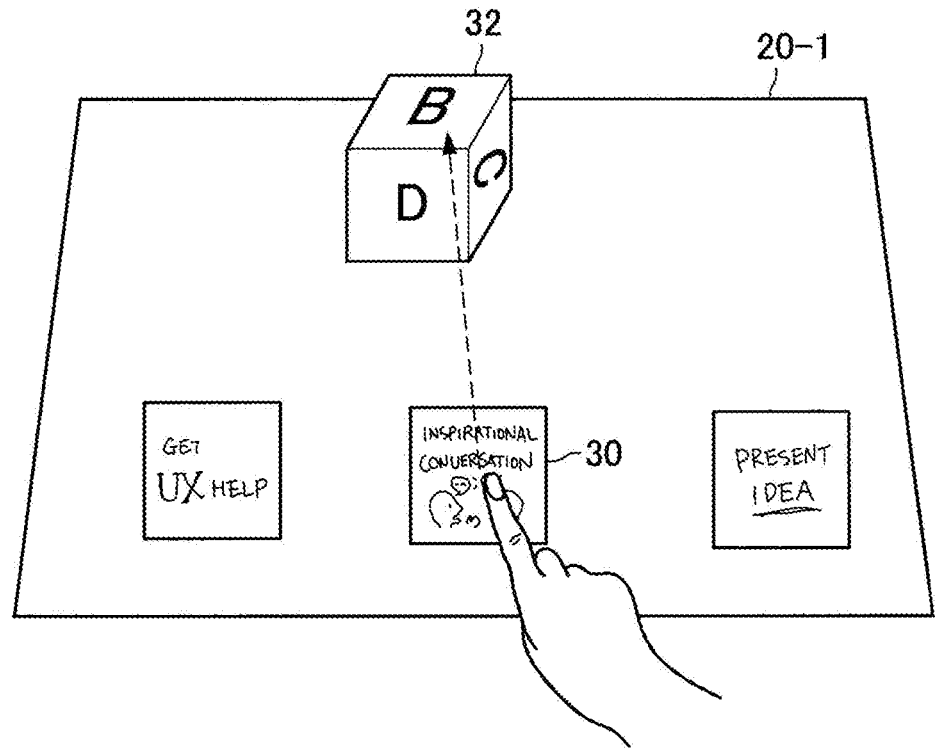

FIG.17
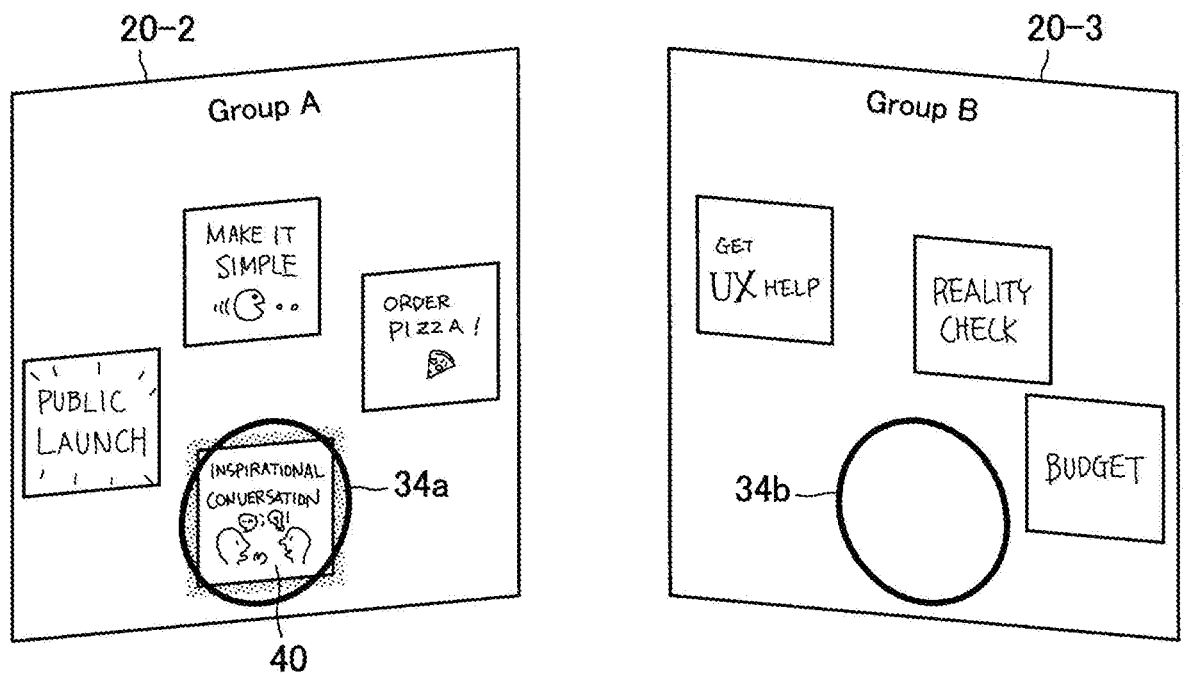
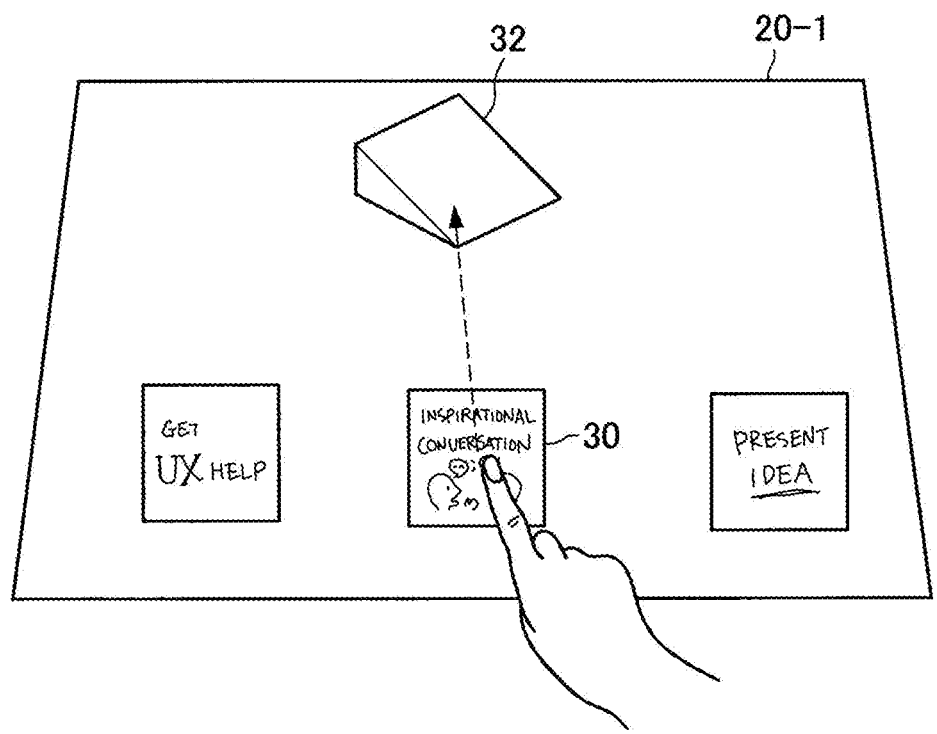

FIG.18
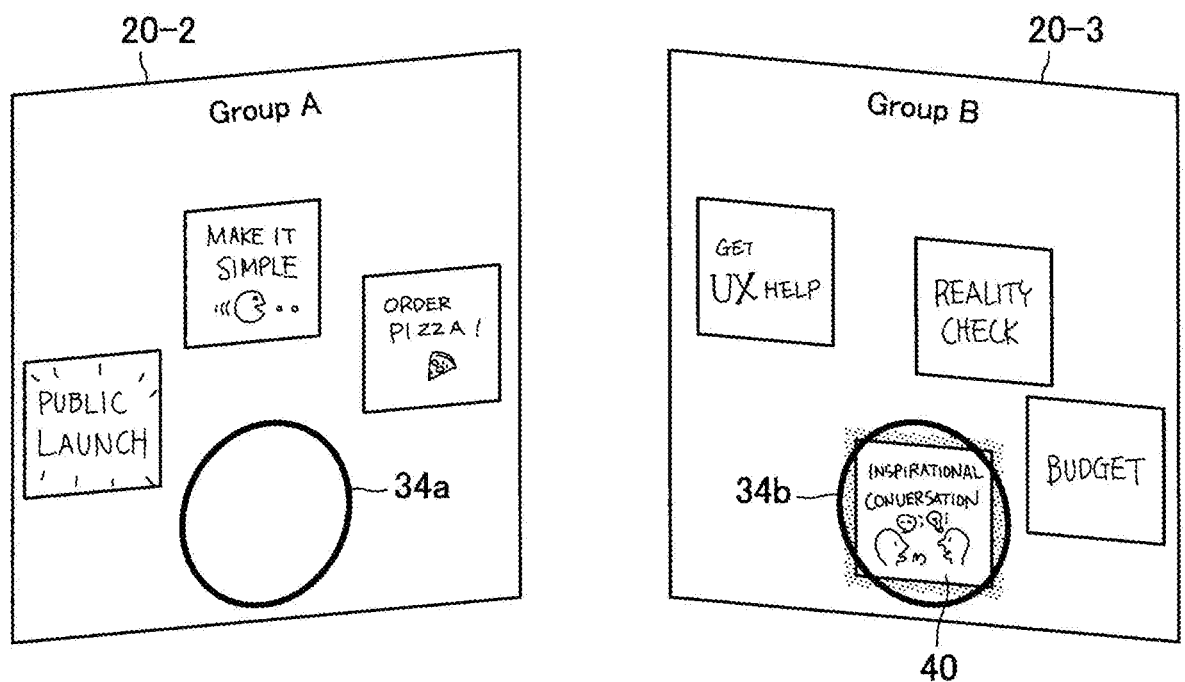
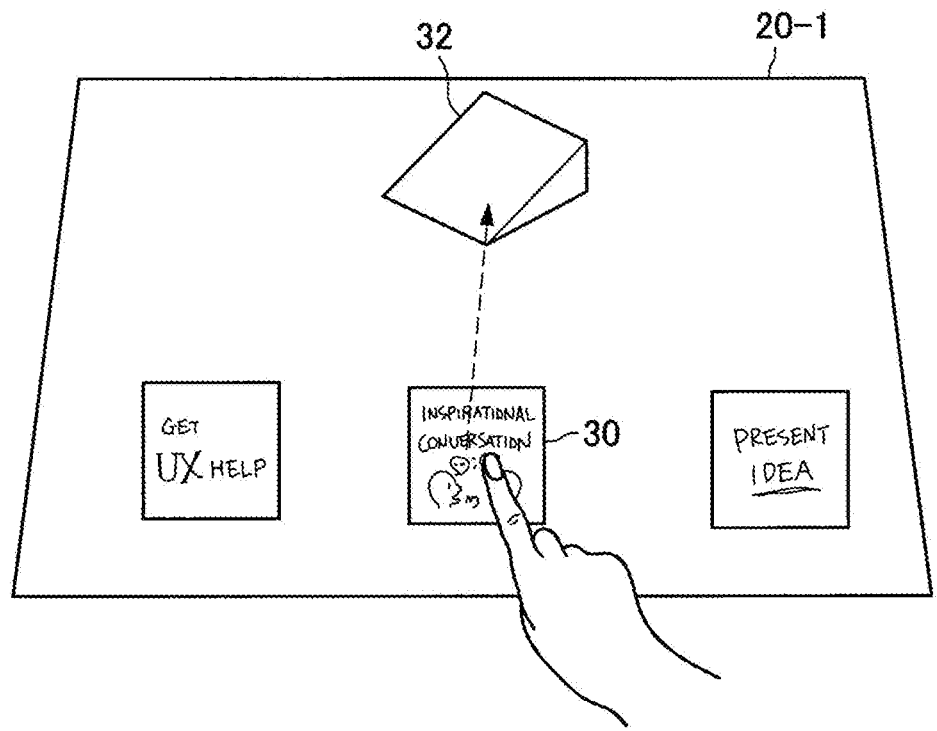

| No | TYPE OF SURFACE | DIRECTION OF GRAVITY | SURFACE ATTRIBUTE MATCHING PROCESSING |
|---|---|---|---|
| 1 | TABLE 1 | — | CONVERT CHARACTER STRING INTO JAPANESE |
| 2 | TABLE 2 | — | CONVERT CHARACTER STRING INTO ENGLISH |

128

| No | TYPE OF SURFACE | DIRECTION OF GRAVITY | SURFACE ATTRIBUTE MATCHING PROCESSING |
|---|---|---|---|
| 1 | SMARTPHONE | DOWNWARD | DISPLAY CHARACTER STRING AS IT IS |
| 2 | NOTICE BOARD 1 | DOWNWARD | DISPLAY CHARACTER STRING AS IT IS |
| 3 | NOTICE BOARD 2 | DOWNWARD | CONVERT AND DISPLAY CHARACTER STRING INTO HIRAGANA |

INFORMATION PROCESSING SYSTEM, INFORMATION PROCESSING METHOD, AND PROGRAM FOR OBJECT TRANSFER BETWEEN DEVICES

CROSS REFERENCE TO PRIOR APPLICATION

This application is a National Stage Patent Application of PCT International Patent Application No. PCT/JP2018/041786 (filed on Nov. 12, 2018) under 35 U.S.C. § 371, which claims priority to Japanese Patent Application No. 2017-242317 (filed on Dec. 19, 2017), which are all hereby incorporated by reference in their entirety.

FIELD

The present disclosure relates to an information processing system, an information processing method, and a program.

BACKGROUND

Conventionally, various technologies related to augmented reality (AR) have been developed. In AR, additional information associated with an object in an environment where a user is positioned can be presented to a user.

For example, Patent Literature 1 below describes a technology for detecting a marker by analyzing a captured image and calling a function associated with the detected marker.

CITATION LIST

Patent Literature

Patent Literature 1: JP 2015-90524 A

SUMMARY

Technical Problem

However, in the technology described in Patent Literature 1, when an operation of moving an object in a certain display surface with respect to a transfer object is detected, it is not considered to adaptively control the display on the display surface in response to the operation.

Therefore, the present disclosure provides a new and improved information processing system, information processing method, and program capable of adaptively controlling a display on the display surface in response to an operation of moving an object in a certain display surface with respect to a transfer object.

Solution to Problem

According to the present disclosure, an information processing system is provided that includes: a processing unit that performs, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface, and changes a display state of the second display surface based on a detection result of a second operation by the first user after the first operation.

Moreover, according to the present disclosure, an information processing method is provided that includes: performing, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface; and changing, by a processor, a display state of the second display surface based on a detection result of a second operation by the first user after the detection of the first operation.

Moreover, according to the present disclosure, a program is provided that executes a computer to function as a processing unit that performs, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface, and changes a display state of the second display surface based on a detection result of a second operation by the first user after the detection of the first operation.

Advantageous Effects of Invention

As described above, according to the present disclosure, it is possible to adaptively control the display on the display surface in response to the operation of moving the object in a certain display surface with respect to the transfer object. Note that the effects described here are not necessarily limited, and may be any of the effects described in the present disclosure.

BRIEF DESCRIPTION OF DRAWINGS

FIG. 10A is a diagram illustrating another example of the function of the surface attribute matching processing unit 104 according to the embodiment.

FIG. 10B is a diagram illustrating still another example of the function of the surface attribute matching processing unit 104 according to the embodiment.

FIG. 13 is a diagram illustrating an example of transferring an image corresponding to an object according to a first application example of the present embodiment.

FIG. 14 is a diagram illustrating another example of transferring the image corresponding to the object according to the first application example.

FIG. 15 is a diagram illustrating an example of transferring an image corresponding to an object according to a second application example of the present embodiment.

FIG. 16 is a diagram illustrating another example of transferring the image corresponding to the object according to the second application example.

FIG. 17 is a diagram illustrating an example of transferring an image corresponding to an object according to a third application example of the present embodiment.

FIG. 18 is a diagram illustrating another example of transferring the image corresponding to the object according to the third application example.

DESCRIPTION OF EMBODIMENTS

Figure 1:
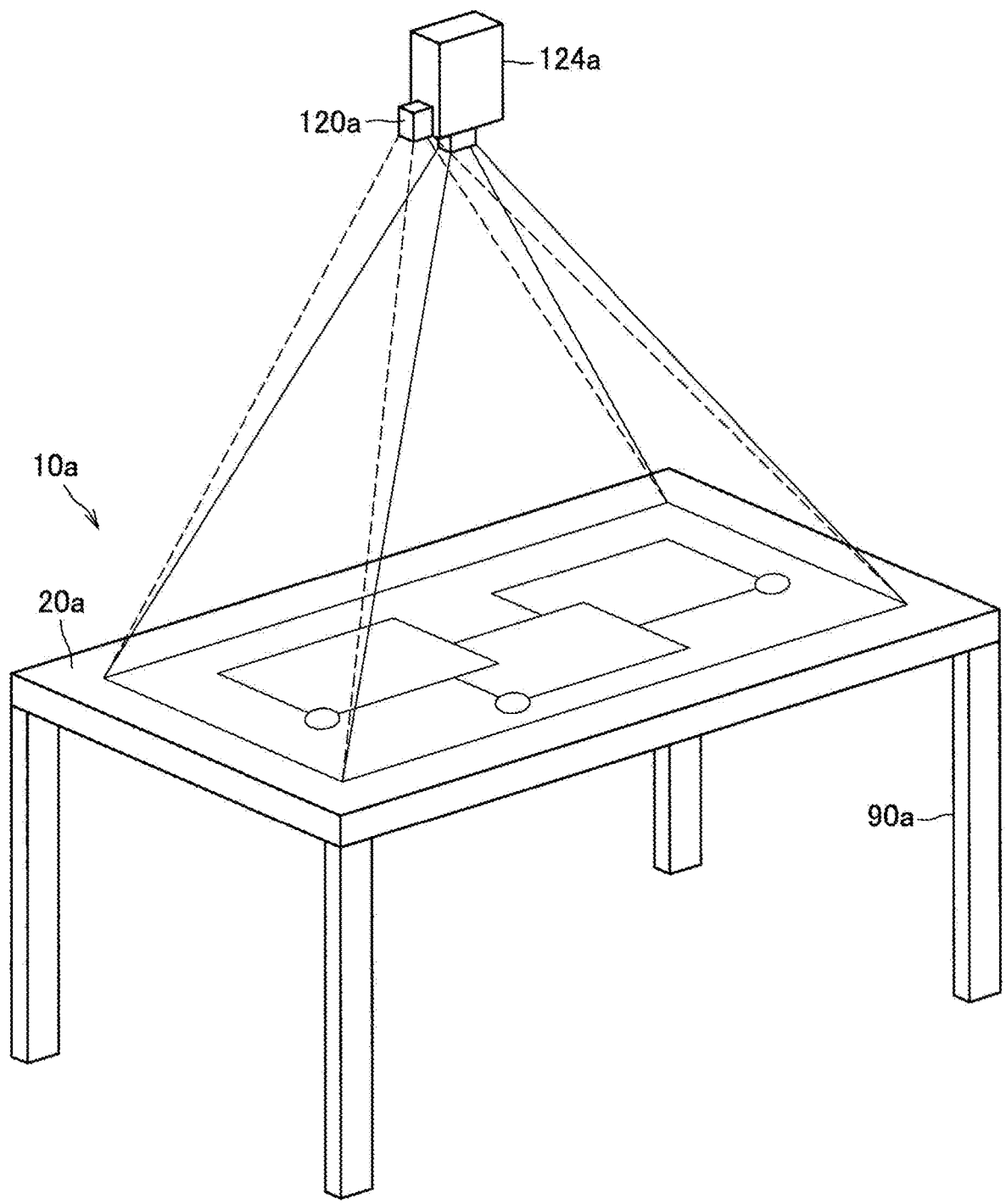
FIG. 1 is a diagram illustrating a configuration example of an information processing system 10 according to an embodiment of the present disclosure.

Hereinafter, preferred embodiments of the present disclosure will be described in detail with reference to the accompanying drawings. Note that in the present specification and drawings, components having substantially the same functional configuration will be denoted by the same reference numerals, and a redundant description thereof will be omitted.

In this specification and the drawings, a plurality of components having substantially the same functional configuration may be distinguished by adding different alphabets after the same reference numeral. For example, a plurality of components having substantially the same functional configuration are distinguished as necessary, such as a table 90a and a table 90b. However, when there is no need to particularly distinguish each of the plurality of components having substantially the same functional configuration, the components are denoted by only the same reference numeral. For example, when there is no need to particularly distinguish between the table 90a and the table 90b, the table 90a and the table 90b are simply referred to as a table 90.

In addition, the "embodiment for carrying out the invention" will be described in the order of items below.
1. Configuration of Information Processing System
2. Detailed Description of Embodiment
3. Application Example
4. Hardware Configuration
5. Modified Example

1. CONFIGURATION OF INFORMATION PROCESSING SYSTEM

First, a configuration example of an information processing system according to an embodiment of the present disclosure will be described with reference to FIG. 1. Note that in this specification, the system can mean a configuration for executing predetermined processing. The system may be constituted by one device, or may be constituted by a plurality of devices. In addition, the information processing system 10 according to the present embodiment may also be configured to be able to execute predetermined processing as a whole, and may be arbitrary which configuration in the information processing system 10 is regarded as one device.

FIG. 1 is a diagram illustrating a configuration example of the information processing system 10. Referring to FIG. 1, an information processing system 10a according to the present embodiment includes an input unit 120a and an output unit 124a.

1-1. Output Unit 124

An output unit 124a can be configured to include an output device 162 described later. The output unit 124a displays various information on a table 90a. The output unit 124a can be a projection unit (projector). For example, as illustrated in FIG. 1, the output unit 124a can be arranged above the table 90a at a predetermined distance from the table 90a while being suspended from a ceiling. In this case, the output unit 124a can project information on a top surface of the table 90a. For example, the output unit 124a may be a pendant light or a desk stand light. Such a method of displaying information on a top surface of a table 90a from above is also referred to as "projection type". In the following, the top surface of the table 90 may be referred to as display surface 20. The display surface 20 includes a surface (screen) to be projected by an output unit 124.

For example, the output unit 124a displays a virtual display object according to control of a display processing unit 122 described later. The display object is, for example, a window, a user interface (UI) object, or the like. The UI object is a predetermined image (still image or moving image) that receives various operations (selection, input, or the like) by a user. For example, the UI object is an image including graphical user interface (GUI) components (for example, a button, a slider, a check box, a text box, a software keyboard, and the like). In addition, the UI object can be arranged in the window.

1-2. Input Unit 120

An input unit 120a can be configured to include an input device 160 described later. The input unit 120a includes, for example, a camera that captures an image of the table 90a with one lens. Alternatively, the input unit 120a can include a stereo camera capable of recording information in a depth direction by capturing the image of the table 90a with two lenses. As the stereo camera, for example, a visible light camera, an invisible light camera capable of detecting invisible light such as infrared light, or the like can be used. In addition, the input unit 120a can further include a voice input device such as a microphone that collects a voice uttered by a user or environmental sound of the surrounding environment.

When the above-described camera is used as the input unit 120a, the information processing system 10a analyzes an image (captured image) captured by the camera, thereby detecting a position of an object (for example, a user's hand or the like) positioned on the display surface 20. Note that in this specification and the drawings, the term "hand" can be mainly used as an expression meaning a hand itself. However, the present invention is not limited to such an example, and this description may be used as an expression meaning a finger, an arm, or two or more (for example, an upper limb or the like) of these parts.

In addition, when the stereo camera is used as the input unit 120a, the information processing system 10a analyzes the image captured by the stereo camera, thereby acquiring depth information of the object in addition to position information of an object positioned on the display surface 20. The information processing system 10a can detect touch or approach of the user's hand to the display surface 20 and separation of the hand from the display surface 20, based on the depth information. Note that the input unit 120a may have another type of depth sensor (for example, a time-of-flight type sensor, a structured light type sensor, or the like) instead of the stereo camera. In this case, the depth sensor can acquire the depth information of the object positioned on the display surface 20.

In the present embodiment, a position of an operation tool (for example, a user's hand, various operating members such as a stylus) on the display surface 20 can be detected based on an image captured by the input unit 120*a*, and various information can be input based on the detected position of the operation tool. That is, the user can perform various operation inputs by moving the operation tool on the display surface 20. For example, the touch of the user's hand to the window or the UI object is detected, and as a result, the operation input to the window or the UI object is performed.

In addition, the camera included in the input unit 120*a* can not only photograph the top surface of the table 90*a*, but also photograph a user existing around the table 90*a*. In this case, the information processing system 10*a* can detect the position of the user around the table 90*a* based on the image captured by the input unit 120*a*. In addition, the information processing system 10*a* may perform personal recognition of a user by detecting physical characteristics (such as a size of a face or a body) of each user based on the captured image.

Note that an operation input of a user is not limited to the example described above, and may be executed by another method. For example, the input unit 120*a* may be arranged as a touch panel on the top surface (display surface 20*a*) of the table 90*a*, and the operation input of the user may also be detected by a touch of the user's finger or the like on the touch panel. Alternatively, a gesture operation of the user may be photographed by a camera included in the input unit 120*a*, and the operation input of the user may be detected based on the photographed image.

1-3. Modified Example

Figure 3:
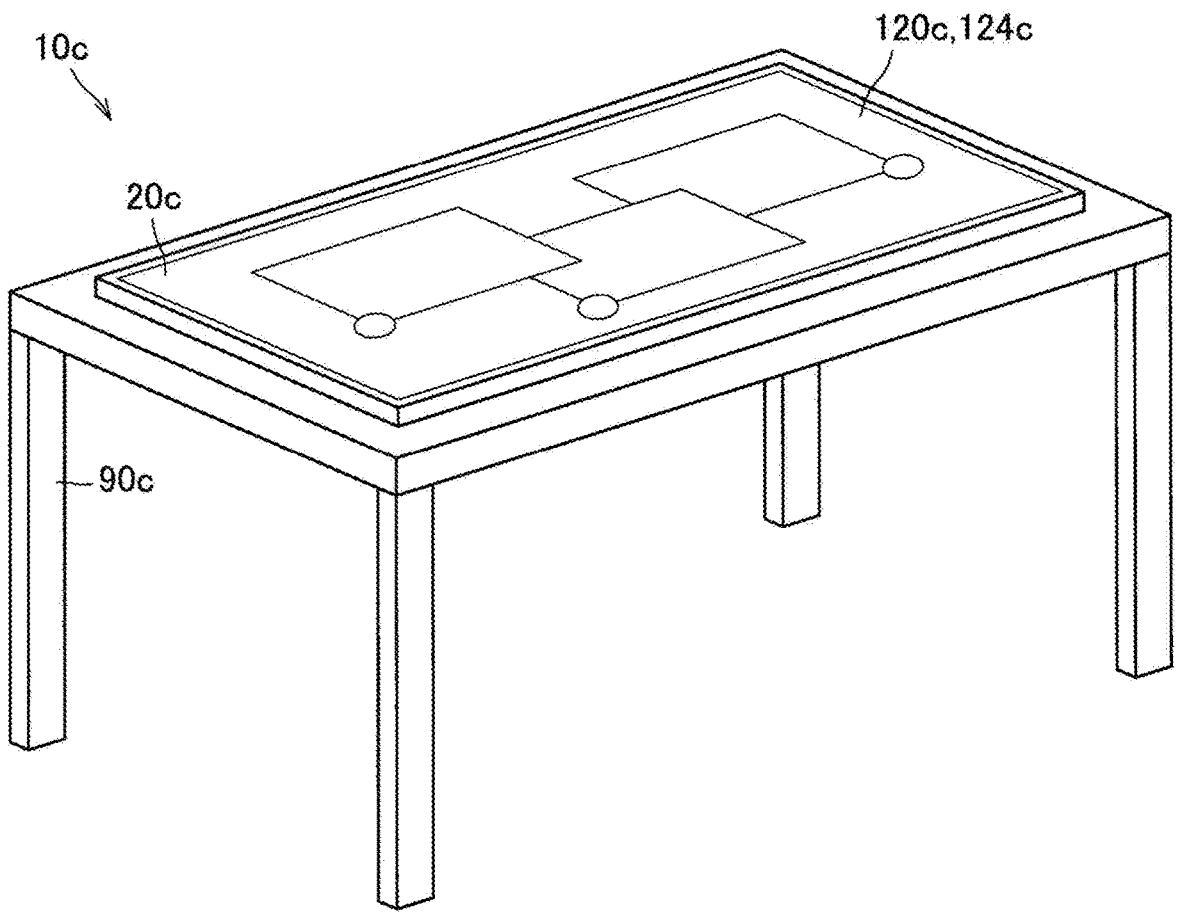
FIG. 3 is a diagram illustrating still another configuration example of the information processing system 10 according to the embodiment.
Figure 4:
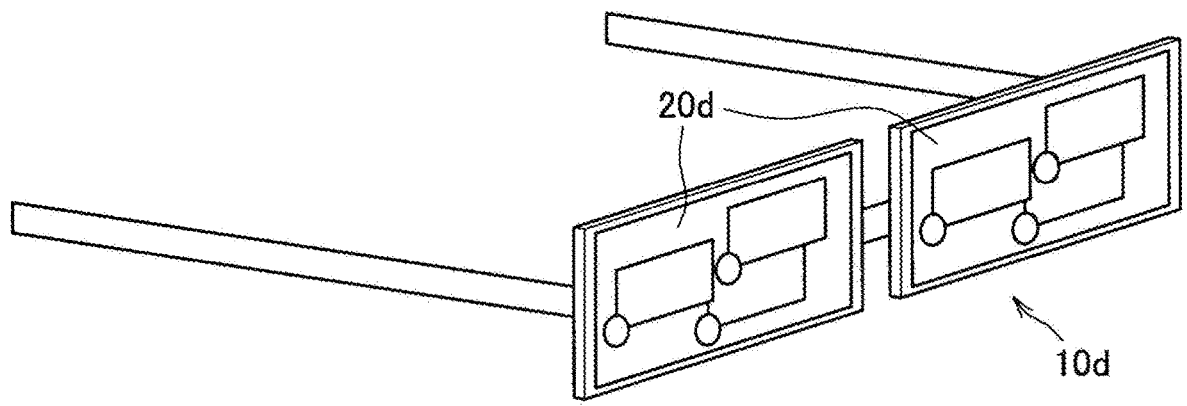
FIG. 4 is a diagram illustrating yet another configuration example of the information processing system 10 according to the embodiment.

The configuration of the information processing system 10*a* according to the present embodiment has been described above. Note that the configuration of the information processing system 10 according to the present embodiment is not limited to the example illustrated in FIG. 1. The information processing system 10 may have another configuration as illustrated in FIGS. 2 to 4, for example.

1-3-1. First Modified Example

Figure 2:
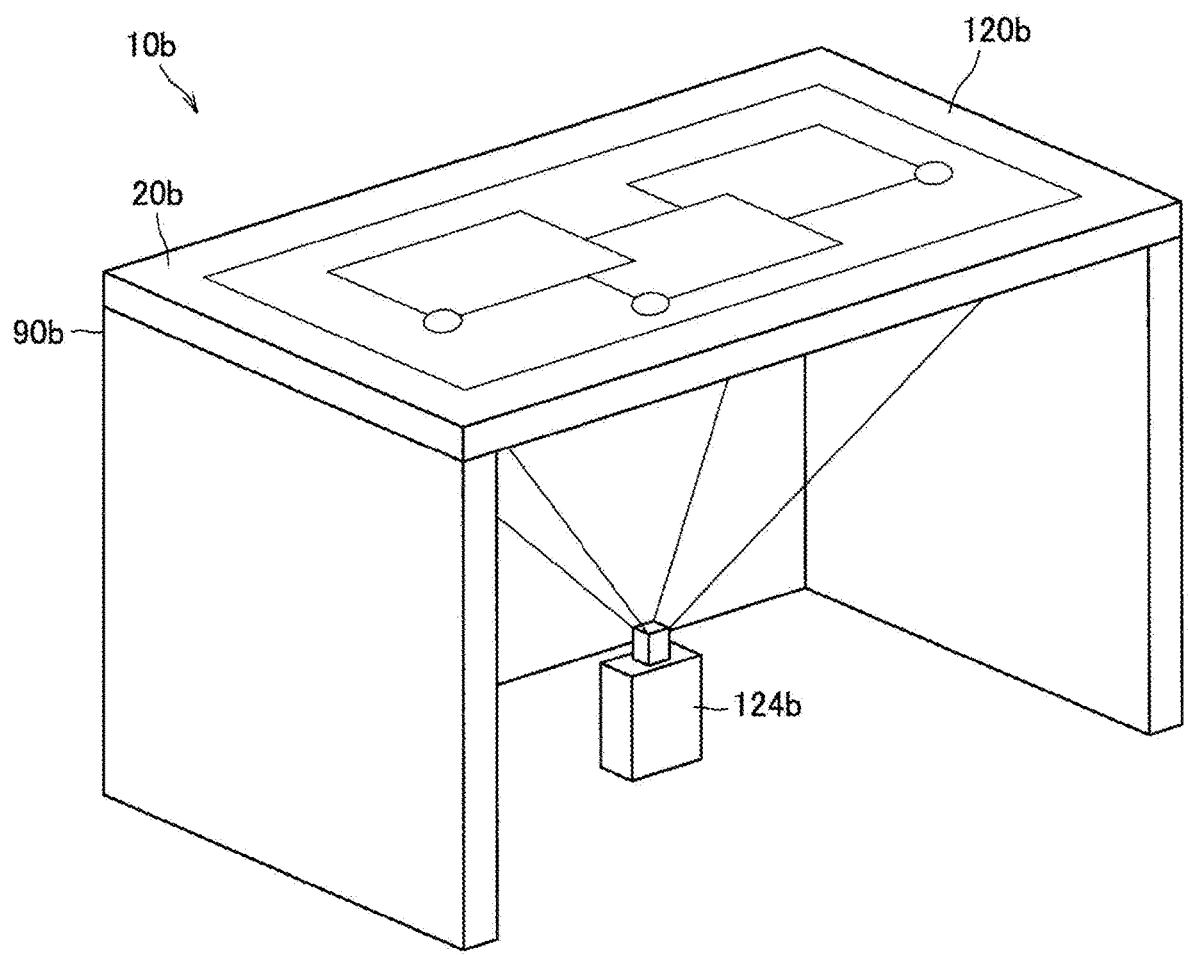
FIG. 2 is a diagram illustrating another configuration example of the information processing system 10 according to the embodiment.

FIG. 2 is a diagram illustrating another configuration example (information processing system 10*b*) of the information processing system 10 according to the present embodiment. As illustrated in FIG. 2, in the information processing system 10*b*, the output unit 124*b* is arranged below the table 90*b*. The output unit 124*b* is, for example, a projector, and projects information from below the table 90*b* toward a tabletop of the table 90*b*. For example, the tabletop of the table 90*b* is formed of a transparent material such as a glass plate or a transparent plastic plate. Then, the information projected by the output unit 124*b* is displayed on the top surface (display surface 20*b*) of the table 90*b* (through the tabletop). The method of displaying information on the display surface 20*b* by projecting the information from below the table 90*b* to the output unit 124*b* in this way is also referred to as "rear projection type".

In addition, in the example illustrated in FIG. 2, the input unit 120*b* is provided on the display surface 20*b*. For example, the input unit 120*b* is constituted by a touch panel. In this case, the touch of the operation tool to the display surface 20*b* is detected by the touch panel, so that the operation input of the user can be received. However, the present invention is not limited to such an example, and the input unit 120*b* may be arranged below the table 90*b* while being separated from the table 90*b*, similarly to the information processing system 10*a* illustrated in FIG. 2. In this case, the input unit 120*b* can include a camera, and the camera can photograph the operation tool positioned on the display surface 20*b* over the tabletop of the table 90*b*. Then, the position of the operation tool can be detected based on the photographed image.

1-3-2. Second Modified Example

FIG. 3 is a diagram illustrating still another configuration example (information processing system 10*c*) of the information processing system 10 according to the present embodiment. As illustrated in FIG. 3, in the information processing system 10*c*, a touch panel type display is arranged on the table 90*c* with the display surface facing upward. In the information processing system 10*c*, the input unit 120*c* and the output unit 124*c* can be integrally configured as the touch panel type display. In other words, various information can be displayed on a display screen (display surface 20*c*) of the display, and the operation input of the user can be received by detecting the touch of the operation tool on the display screen of the display by the touch panel.

Even in the information processing system 10*c*, the camera (an example of the input unit 120*c*) may be arranged above the output unit 124*c*, as in the information processing system 10*a* illustrated in FIG. 1. In this case, individual users positioned around the table 90*c* can be detected based on the image photographed by the camera.

1-3-3. Third Modified Example

FIG. 4 is a diagram illustrating yet another configuration example (information processing system 10*d*) of the information processing system 10 according to the present embodiment. As illustrated in FIG. 4, the information processing system 10*d* can be constituted as a head mounted type device (for example, a glasses type device or the like) such as a head mounted display (HMD)). The head mounted type device can include the input unit 120*d* (not illustrated) and the output unit 124*d* (not illustrated). The output unit 124*d* may be constituted as a transmission type display device. In this case, the output unit 124*d* can project an image to at least some areas of each of a right-eye lens and a left-eye lens (or goggle type lens), that are included in the head mounted type device, as a projection surface (display surface 20*d*).

Alternatively, the output unit 124*d* may be constituted as a non-transmission type display device. For example, the output unit 124*d* can be configured to include a liquid crystal display (LCD), an organic light emitting diode (OLED), or the like. Further, the input unit 120*d* can include a camera. In this case, the camera may photograph an image in front of a user wearing the head mounted type device, and the output unit 124*d* may sequentially display the photographed image. Thereby, the user can see a scene in front of the user via an image displayed on the output unit 124*d*.

1-3-4. Fourth Modified Example

Figure 5:
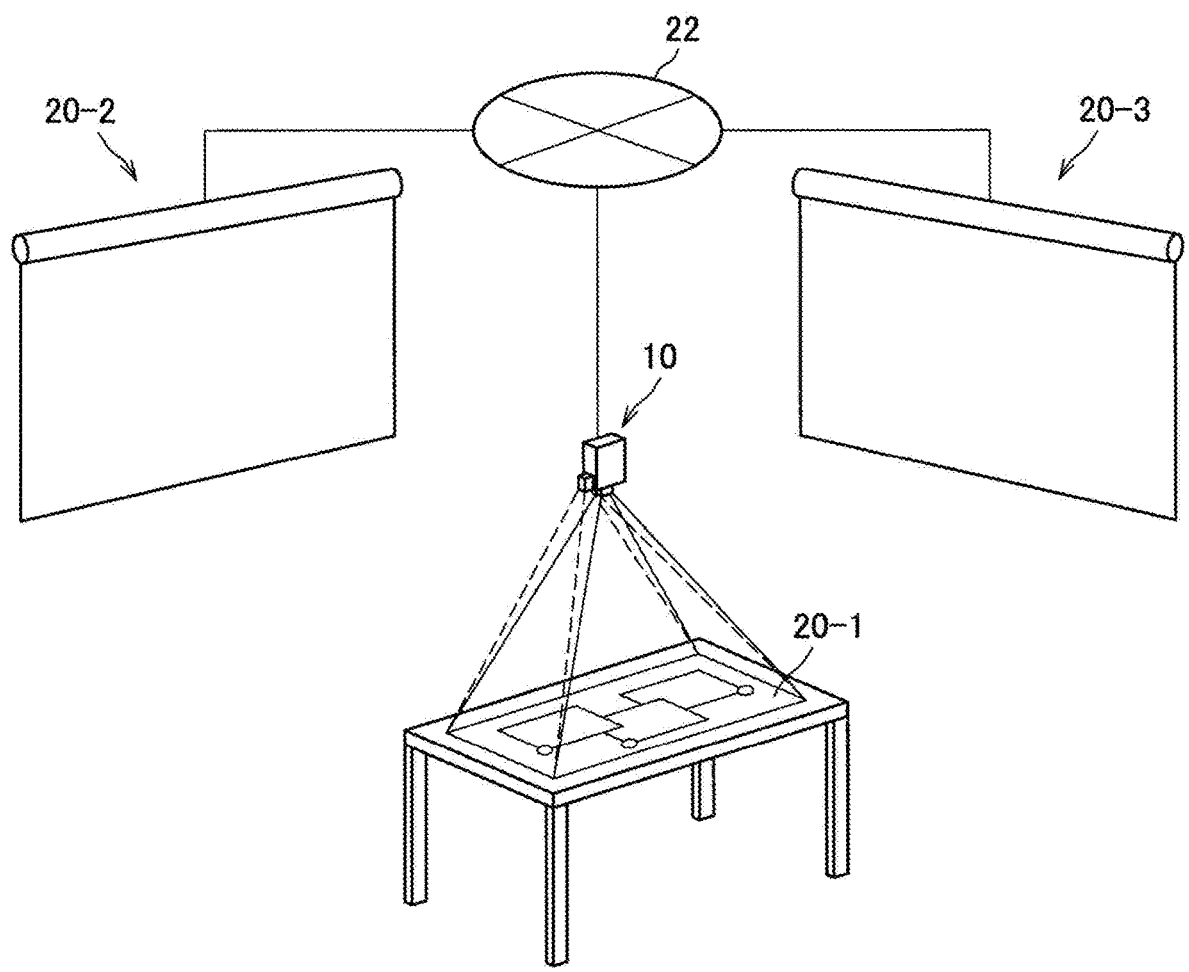
FIG. 5 is a diagram illustrating another configuration example of the system according to the embodiment.

Next, another configuration example of the system according to the present embodiment will be described with reference to FIG. 5. FIG. 5 is a diagram illustrating a configuration example of the system. As illustrated in FIG. 5, any one of the information processing systems 10*a* to 10*d* described above and one or more different display surfaces 20 may be connected via, for example, a communication network 22. Here, the other display surface 20 may be, for example, a whiteboard, a top surface of the table such as the display surface 20a or the display surface 20b, a predetermined device such as the display surface 20c, or a predetermined surface such as the display surface 20d included in the head mounted type device.

The communication network 22 is a wired or wireless transmission path of information transmitted from a device connected to the communication network 22. For example, the communication network 22 may include a public line network such as a telephone line network, the Internet, and a satellite communication network, various local area networks (LANs) including Ethernet (registered trademark), a wide area network (WAN), and the like. In addition, the communication network 22 may include a dedicated line network such as an internet protocol-virtual private network (IP-VPN).

Hereinafter, a description will be mainly given a case where the configuration example of the system according to the present embodiment has a configuration as illustrated in FIG. 5, for example.

The configuration of the information processing system 10 according to the present embodiment has been described above. As will be described later, according to the present embodiment, in a scene in which information corresponding to an object positioned in a certain display surface is transferred to another display surface, among all objects positioned in the display surface of the transfer source, only information corresponding to an object selected by the user can be displayed on the display surface of the transfer destination.

In the present specification and the drawings, when different display surfaces 20 are separately described, for example, different numbers are given after the "display surface 20", such as display surfaces 20-1 and 20-2. Further, in the present specification and the drawings, real objects arranged on the display surface 20 and display objects displayed on the display surface 20 may be collectively described to as the "objects positioned on the display surface 20". Hereinafter, contents of the present embodiment will be described in more detail.

2. DETAILED DESCRIPTION OF EMBODIMENT

<2-1. Configuration>

Figure 6:
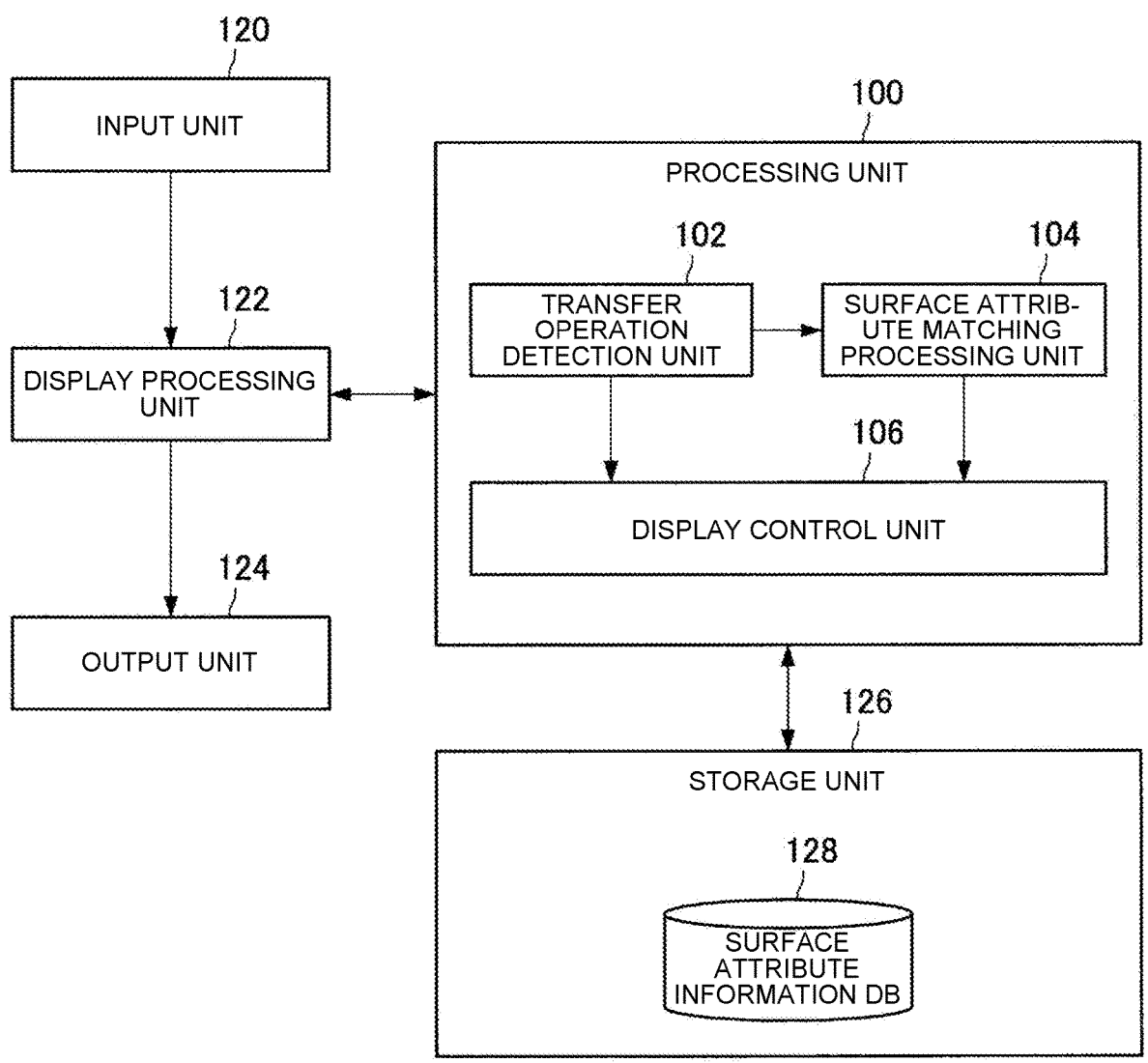
FIG. 6 is a block diagram illustrating an example of a functional configuration of the information processing system 10 according to the embodiment.

First, a functional configuration of the information processing system 10 according to the present embodiment will be described in detail. FIG. 6 is a block diagram illustrating an example of a functional configuration of the information processing system 10. As illustrated in FIG. 6, the information processing system 10 includes a processing unit 100, the input unit 120, the display processing unit 122, the output unit 124, and a storage unit 126. In the following, description of the same contents as those described above will be omitted.

{2-1-1. Display Processing Unit 122}

The display processing unit 122 can be configured to include one or a plurality of processing circuits (for example, a central processing unit (CPU), a graphics processing unit (GPU), or the like). The display processing unit 122 performs processing related to graphics that can be displayed by the output unit 124, based on input information acquired by the input unit 120. For example, the display processing unit 122 performs drawing processing of a display object such as a window, and outputs the processed result to the output unit 124. As an example, the display processing unit 122 performs the drawing processing of these display objects according to a user operation on individual display objects.

In addition, the display processing unit 122 can acquire the input information (for example, a captured image, or the like) acquired by the input unit 120 from the input unit 120, and output the input information to the processing unit 100. Further, the display processing unit 122 can also receive the information processed by the processing unit 100 from the processing unit 100, and perform the drawing processing based on the information.

{2-1-2. Processing Unit 100}

The processing unit 100 can be configured to include one or a plurality of processing circuits (for example, a CPU 150, a GPU, or the like described below). The processing unit 100 performs various processing based on the input information acquired by the input unit 120.

Further, as illustrated in FIG. 5, the processing unit 100 has a transfer operation detection unit 102, a surface attribute matching processing unit 104, and a display control unit 106.

{2-1-3. Transfer Operation Detection Unit 102}

The transfer operation detection unit 102 detects a transfer operation for transferring one object positioned in the display surface 20-1 to another display surface 20-2 based on the input information acquired from the input unit 120. For example, when an operation (for example, approach) for a certain user to move one object positioned on the display surface 20-1 to a detection area having a predetermined positional relationship with one or more predetermined transfer objects positioned in the display surface 20-1 is detected, the transfer operation detection unit 102 detects the operation as the transfer operation. Here, the detection area may be the same as the predetermined transfer object. Alternatively, the detection area may be an area that includes all or some of the object areas where the predetermined transfer object is positioned on the display surface 20-1 and is within a predetermined distance from a contour of the object area. Note that the "transfer area" described later is an example of the detection area. In addition, the transfer operation is an example of a first operation according to the present disclosure.

Figure 7:
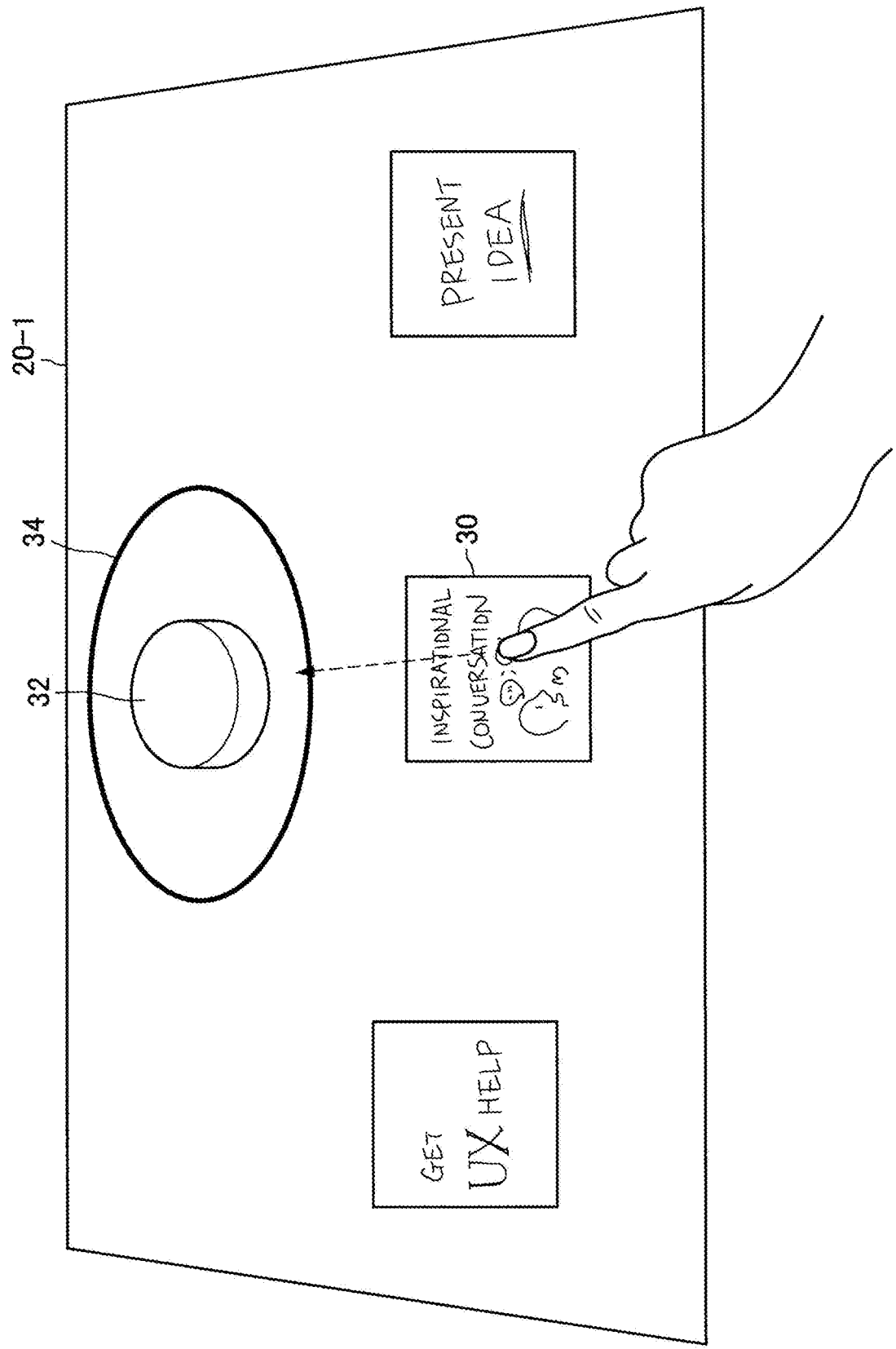
FIG. 7 is a diagram illustrating an example of a transfer operation for transferring information corresponding to an object to another display surface according to the embodiment.

Further, the predetermined transfer object may be a predetermined real object (for example, a predetermined transfer base 32 or the like as illustrated in FIG. 7) or a predetermined display object. For example, when the predetermined transfer base is arranged on the display surface 20-1 and an operation of making one object positioned on the display surface 20-1 approach the transfer base 32 is detected, the transfer operation detection unit 102 may detect the operation as the transfer operation.

Alternatively, as illustrated in FIG. 7, when the transfer base 32 is arranged on the display surface 20-1, the processing unit 100 can set, for example, a circular transfer area 34 around the transfer base 32, and display the transfer area 34 on the display surface 20-1. In this case, when an operation for a user to drag one object (tag 30 in the example illustrated in FIG. 7) positioned on the display surface 20-1 from an outside of the transfer area 34 to an inside of the transfer area 34 is detected, the transfer operation detection unit 102 may detect the operation as the transfer operation. Here, the transfer area 34 is an example of the above detection area. Note that the present embodiment is not limited to the example illustrated in FIG. 7, and the processing unit 100 may set the transfer area 34 in a location where the transfer base 32 is not arranged.

{2-1-4. Surface Attribute Matching Processing Unit 104}

Figure 8:
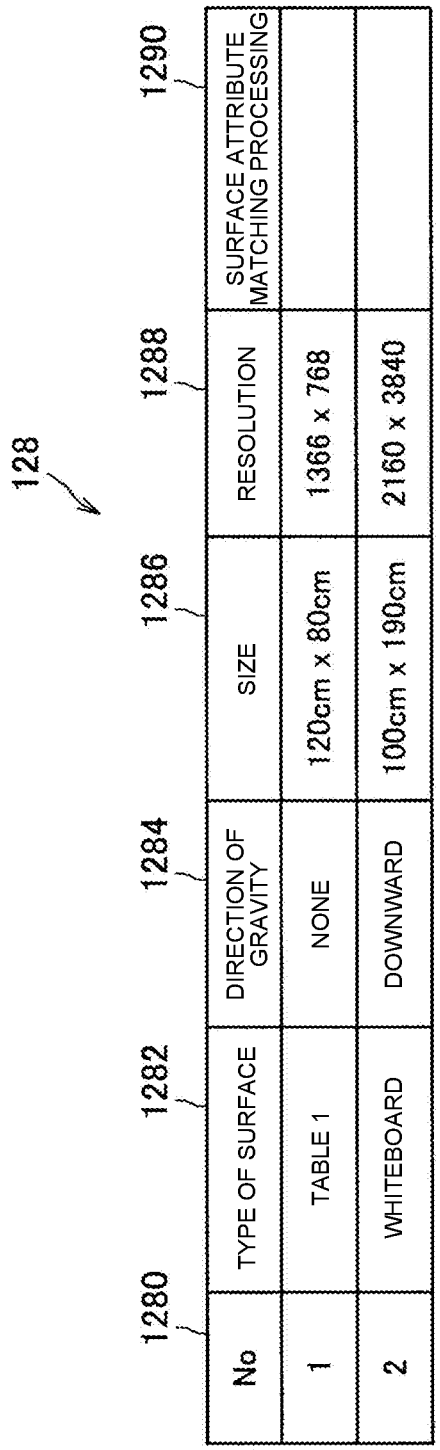
FIG. 8 is a diagram illustrating a configuration example of a surface attribute information DB 128 according to the embodiment.

When the transfer operation is detected by the transfer operation detection unit 102, the surface attribute matching processing unit 104 determines display setting of information corresponding to the object to be transferred, which is displayed on the display surface of the transfer destination, based on the information associated with the display surface of the transfer destination and the information associated with the display surface of the transfer source. For example, the surface attribute matching processing unit 104 determines the display setting of the object to be transferred information, which is displayed on the display surface of the transfer destination, based on the information associated with the display surface of the transfer destination that is stored in the surface attribute information DB 128 as illustrated in FIG. 8. Here, the display setting of the information of the object to be transferred can include, for example, a display size, a display direction, a display content, and the like of the information in the display surface of the corresponding transfer destination. The display surface before the transfer is an example of the first display surface according to the present disclosure. In addition, the display surface of the transfer destination is an example of the second display surface according to the present disclosure.

2-1-4-1. Surface Attribute Information DB 128

The surface attribute information DB 128 is a database that stores information (attribute information and the like) associated with each display surface. Here, the information associated with the display surface, for example, screen characteristics (for example, physical size, resolution, aspect ratio, and the like) of the display surface, and layout characteristics (for example, direction of gravity with respect to the display surface, and the like) of the relevant display surface. The surface attribute information DB 128 can be implemented, for example, in a form such as a relational database or a lookup table.

FIG. 8 is a diagram illustrating a configuration example of the surface attribute information DB 128. As illustrated in FIG. 8, in the surface attribute information DB 128, for example, No. 1280, a type of surface 1282, a direction of gravity 1284, a size 1286, a resolution 1288, and a surface attribute matching process 1290 are associated. Here, the type of surface 1282 stores a type of the corresponding display surface. In addition, the direction of gravity 1284 stores a direction of gravity with respect to the corresponding display surface. For example, when the corresponding display surface is a vertically arranged plane, the direction of gravity 1284 stores "downward". When the image of the object (that is, object to be transferred) positioned on the display surface of the transfer source is displayed on the display surface, the display direction of the image is automatically determined based on the information stored in the direction of gravity 1284. In addition, the size 1286 stores a size of the display surface. The resolution 1288 stores a resolution of the display surface. In addition, when the information is transferred from another display surface to the corresponding display surface, the surface attribute matching process 1290 stores contents of predetermined processing for matching the information to the display surface.

2-1-4-2. First Processing Example

Figure 9A:
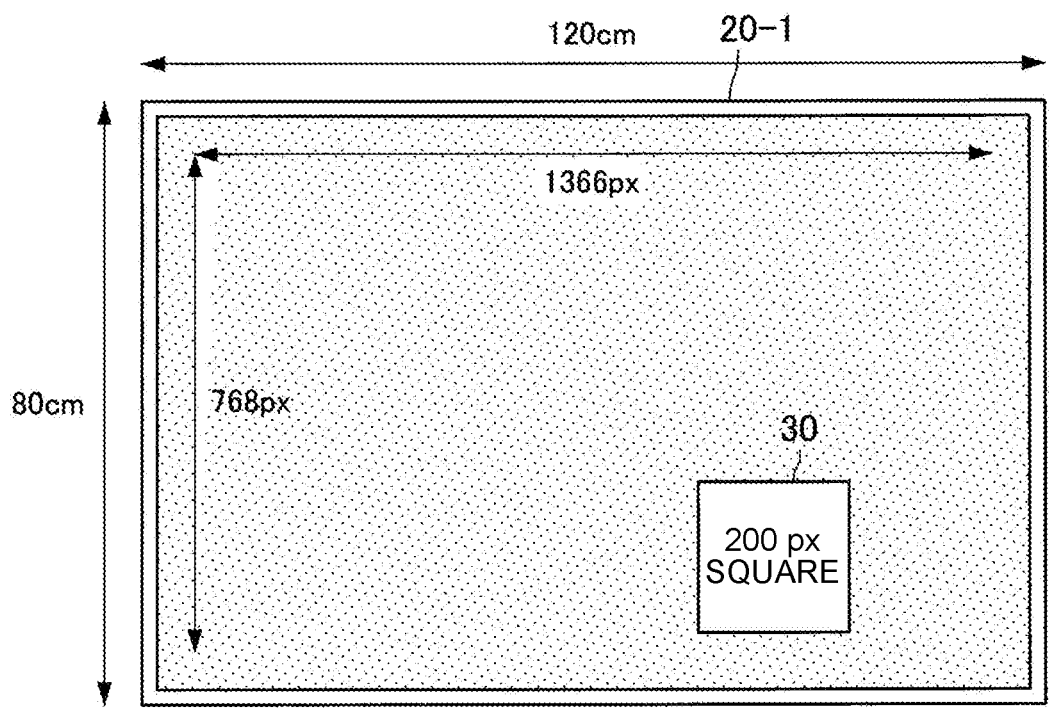
FIG. 9A is a diagram illustrating an example of a function of a surface attribute matching processing unit 104 according to the embodiment.
Figure 9B:
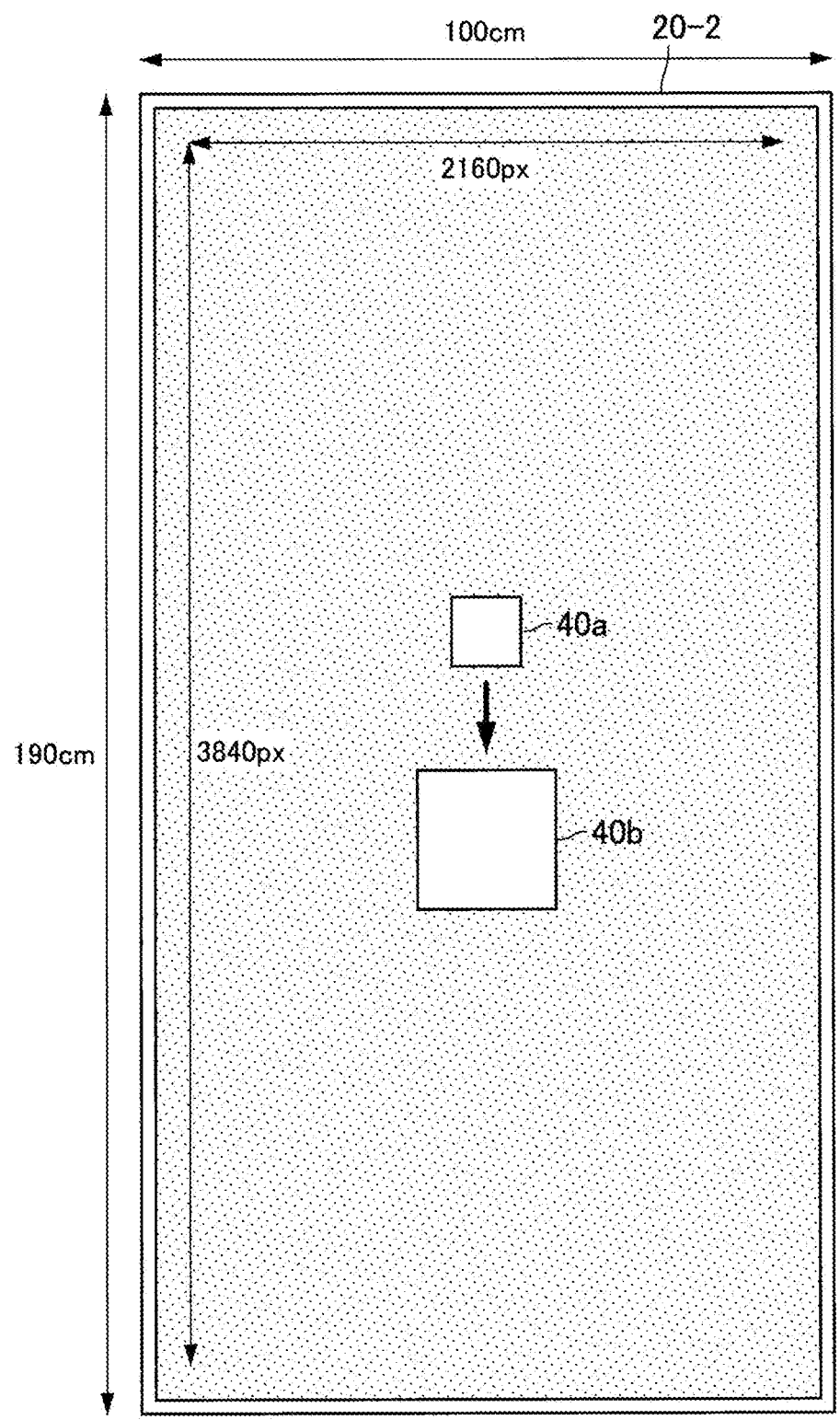
FIG. 9B is a diagram illustrating an example of the function of the surface attribute matching processing unit 104 according to the embodiment.

Here, a specific example of the function of the above-described surface attribute matching processing unit 104 will be described with reference to FIGS. 9A and 9B. FIG. 9A is a diagram illustrating a configuration example of the display surface 20-1 (table surface 20-1) in which No. in the surface attribute information DB 128 illustrated in FIG. 8 is "1" In addition, FIG. 9B is a diagram illustrating a configuration example of the display surface 20-2 (whiteboard 20-2) in which No. in the surface attribute information DB 128 illustrated in FIG. 8 is "2". In the example illustrated in FIGS. 8 and 9A, the table surface 20-1 has a width of 120 cm and a height of 80 cm, and, for example, an image having a resolution of 1366×768 is projected to the table surface 20-1 by the output unit 124. Further, as illustrated in FIG. 9A, the tag 30 having a size of 200 pixels square is arranged on the table surface 20-1. In addition, in the example illustrated in FIGS. 8 and 9B, the whiteboard 20-2 has a width of 100 cm and a height of 190 cm, and, for example, an image having a resolution of 2160×3840 is projected by a projector corresponding to the whiteboard 20-2.

When the image corresponding to the tag 30 illustrated in FIG. 9A is transferred to the whiteboard 20-2, if no special processing is performed (in other words, if the attribute information of the whiteboard 20-2 is not considered), the image is projected in a size different from that of the tag 30 on the table surface 20-1, as in a tag image 40a illustrated in FIG. 9B. The surface attribute matching processing unit 104 may determine to increase the size of the image corresponding to the tag 30 according to a difference between dots per inch (dpi) (specifically 29 dpi) of the table surface 20-1 that is the surface of the transfer source, and dpi (specifically 51 dpi) of the whiteboard 20-2 that is the surface of the transfer destination. Thereby, an image 40b of the determined size can be displayed on the whiteboard 20-2 under the control of the display control unit 106 described later. According to the above determination example, the tag 30 can be displayed even on the whiteboard 20-2 in full size. Therefore, a user using the table surface 20-1 and a user using the whiteboard 20-2 can more smoothly perform communication (discussion and the like) associated with the tag 30.

2-1-4-3. Processing Example 2

Next, a specific example of the function of the above-described surface attribute matching processing unit 104 will be described with reference to FIGS. 10A and 10B. FIGS. 10A and 10B are diagrams illustrating an example in which the image corresponding to the tag 30 on the table surface 20-1 is transferred to the whiteboard 20-2 and displayed. Here, it is assumed that the table surface 20-1 is a horizontally arranged plane, and the whiteboard 20-2 is a vertically arranged plane. For example, as illustrated in FIG. 8, in the surface attribute information DB 128, the direction of gravity is not set on the table surface 20-1, and the "downward" is set on the whiteboard 20-2 as the direction of gravity.

As illustrated in FIG. 10A, in order to transfer the image corresponding to the tag 30 to the whiteboard 20-2, for example, the user using the table surface 20-1 drags the tag 30 from the outside of the transfer area 34 displayed in the table surface 20-1 to the inside of the transfer area 34. In this case, the surface attribute matching processing unit 104 determines the display direction of the image 40 (tag image 40) corresponding to the tag 30 as, for example, the "downward" in the whiteboard 20-2, based on the information of the "direction of gravity" associated with the whiteboard 20-2 in the surface attribute information DB 128. Thereby, as illustrated in FIG. 10B, the tag image 40 can be displayed on the whiteboard 20-2 in the determined display direction.

{2-1-5. Display Control Unit 106}

The display control unit 106 controls display of various types of information on the output unit 124.

Further, when the transfer operation is detected by the transfer operation detection unit 102, the display control unit 106 can control the information corresponding to the object to be transferred to be displayed on the display surface of the transfer destination. For example, when the transfer operation is detected, the display control unit 106 displays the image corresponding to the corresponding object to be transferred on the display surface of the transfer destination with the display setting determined by the surface attribute matching processing unit 104. For example, when the transfer operation is detected, the display control unit 106 displays the image corresponding to the corresponding object to be transferred in the transfer area set in the display surface of the transfer destination with the display setting determined by the surface attribute matching processing unit 104.

{2-1-6. Storage Unit 126}

The storage unit 126 can be configured to include a storage device 164 described later. The storage unit 126 stores various data such as the surface attribute information DB 128 and various software.

<2-2. Processing Flow>

The configuration according to the present embodiment has been described above. Next, the processing flow according to the present embodiment will be described.

Figure 11:
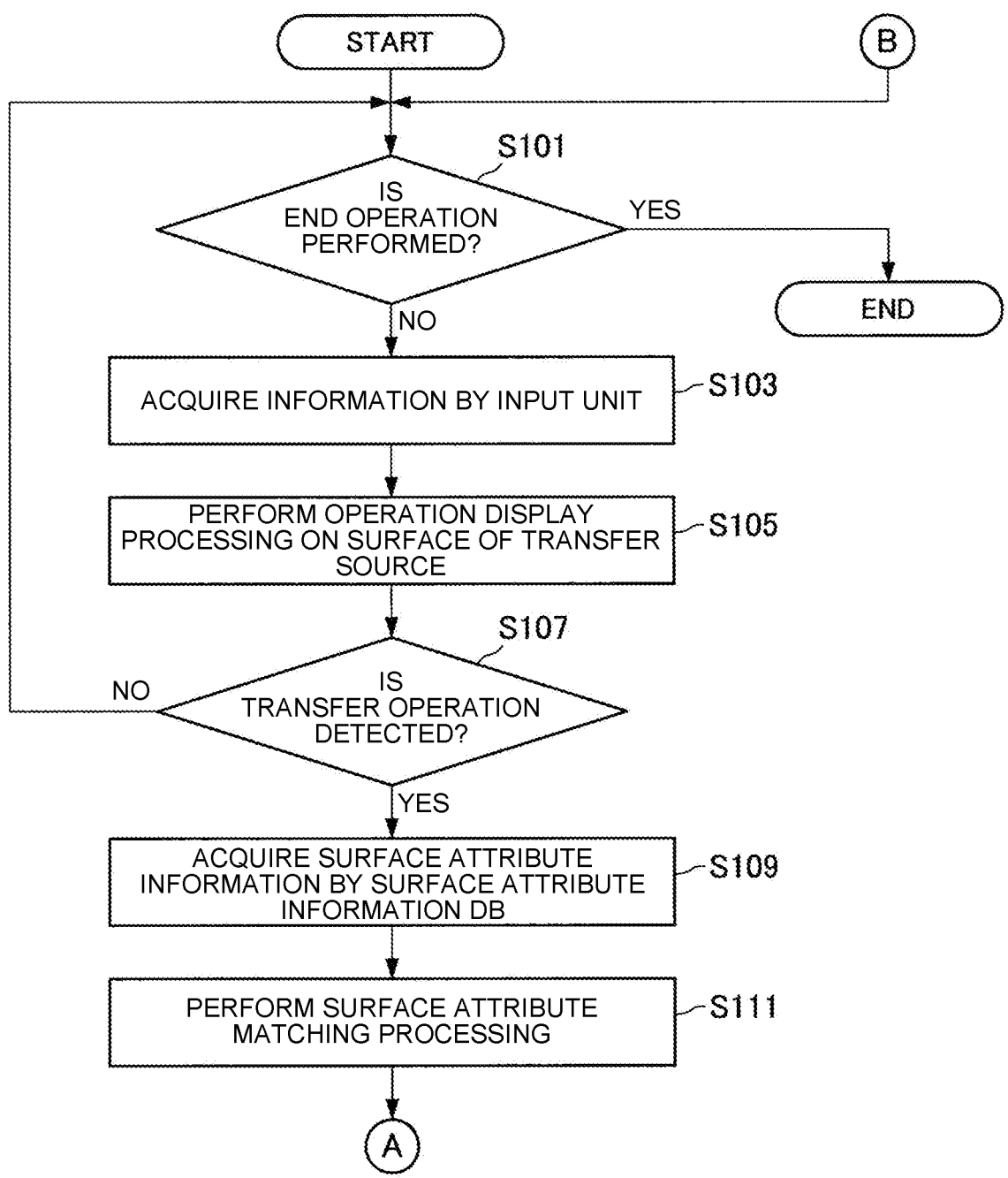
FIG. 11 is a flowchart illustrating a part of a processing flow according to the embodiment.
Figure 12:
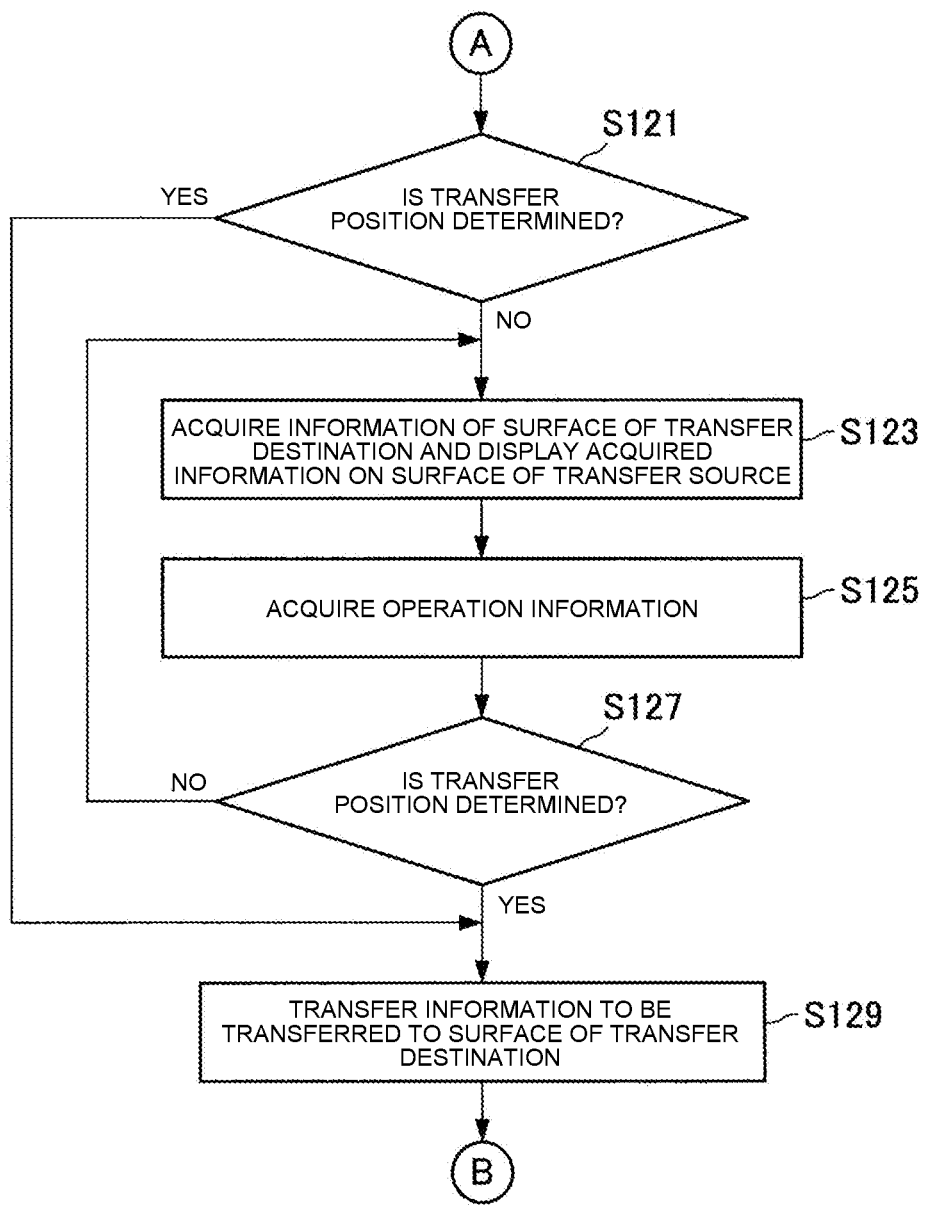
FIG. 12 is a flowchart illustrating a part of the processing flow according to the embodiment.

FIGS. 11 and 12 are flowcharts each illustrating a part of the processing flow according to the present embodiment. As illustrated in FIG. 11, unless a user's end operation is detected (S101: No), the processing unit 100 repeats steps of S103 to S129 described below. When it is detected that the user has performed the end operation (S101: Yes), the processing flow ends.

Specifically, first, the processing unit 100 acquires the input information (various sensing results and the like) acquired by the input unit 120 from the input unit 120 (S103).

Subsequently, the processing unit 100 controls outputs of various types of information by the output unit 124 to the display surface 20 (hereinafter, sometimes referred to as the display surface of the transfer source) corresponding to the output unit 124, based on the input information acquired in S103 (S105). For example, the processing unit 100 determines the operation contents (for example, whether or not the operation contents are a drag operation and the like) of the user based on the movement of the user's hand indicated by the acquired input information. When it is determined that the operation contents of the user are the drag operation, next, the processing unit 100 compares a position (for example, coordinates) indicated by the drag operation in the display surface of the transfer source with positions (for example, coordinates) of each object positioned on the display surface of the transfer source, thereby determining whether or not the drag operation indicates any object on the display surface of the transfer source. Then, when it is detected that the drag operation indicates any object, the processing unit 100 can change the display position of the object according to the drag operation.

Thereafter, the transfer operation detection unit 102 determines whether or not a transfer operation is performed on any object in the display surface of the transfer source based on the information acquired by the input unit 120 (S107). While the transfer operation is not detected (S107: No), the processing unit 100 performs steps after the S101 again.

On the other hand, when the transfer operation is detected (S107: Yes), the surface attribute matching processing unit 104 extracts the attribute information of the display surface of the transfer destination from the surface attribute information DB 128 (S109). Then, the surface attribute matching processing unit 104 determines the display setting of the information corresponding to the object to be transferred, which is displayed on the display surface of the transfer destination, based on the extracted attribute information (S111).

Here, the processing flow after S111 will be described with reference to FIG. 12. As illustrated in FIG. 12, after S111, when the transfer position of the object to be transferred on the display surface of the transfer destination is determined (S121: Yes), the display control unit 106 performs S129 described later.

On the other hand, when the transfer position of the object to be transferred is not determined (S121: No), the display control unit 106 first acquires one or more pieces of display information currently displayed on the display surface of the transfer destination, for example, from the display surface of the transfer destination. Then, the display control unit 106 controls the output unit 124 so that the acquired one or more pieces of display information are displayed on the display surface of the transfer source (S123).

Thereafter, the input unit 120 acquires the information on the operation input of the user for the display surface of the transfer source (S125).

Subsequently, the display control unit 106 determines whether or not the transfer position of the object to be transferred on the display surface of the transfer destination is determined based on the input information acquired in S125 (S127). When the transfer position of the object to be transferred is not determined (S127: No), the display control unit 106 performs steps after S123 again.

On the other hand, when the transfer position of the object to be transferred is determined (S127: Yes), the display control unit 106 displays the information (such as an image) corresponding to the object to be transferred at the determined transfer position in the display surface of the transfer destination (S129).

Thereafter, the processing unit 100 repeats steps after S101 again.

<2-3. Effect>

{2-3-1. First Effect}

As described above, when the transfer operation for a certain user to move one object to a detection area related to a predetermined positional relationship with one or more predetermined transfer objects positioned in the display surface of the transfer source is detected, the processing unit 100 according to the present embodiment displays the information corresponding to the object on the display surface of the transfer destination. Therefore, in the scene in which information corresponding to a certain object positioned on a certain display surface is transferred to another display surface, among all objects positioned in the display surface of the transfer source, only information corresponding to an object selected by the user can be displayed on the display surface of the transfer destination.

As a result, for example, a plurality of users positioned around the display surface of the transfer source have a sporadic discussion, and only objects (for example, tags and the like) corresponding to good opinions obtained as a result of the discussion can be seamlessly intensive on the display surface of the transfer destination. Then, during the discussion, a task of arranging objects corresponding to good opinions and objects corresponding to bad opinions becomes easy. Therefore, the plurality of users can continue the discussion without stopping the flow of creating ideas.

{2-3-1. Second Effect}

Further, according to the present embodiment, for example, the object to be transferred can be appropriately displayed on the display surface of the transfer destination according to the attribute information of the display surface of the transfer destination. As a result, communication (discussion and the like) associated with the object to be transferred can be more smoothly performed between the user using the display surface of the transfer source and the user using the display surface of the transfer destination. For example, it is possible to reduce the trouble of optimizing the object on the display surface of the transfer destination, such as making the user of the transfer destination seamlessly use the corresponding object transferred. Therefore, these users can focus on the discussion.

3. APPLICATION EXAMPLE

The present embodiment is not limited to the above-described example, and various application examples are applicable. Next, application examples of the present embodiment will be described in "3-1. First Application Example" to "3-13. Thirteenth Application Example". Note that each component included in the information processing system 10 according to each application example is the same as the example illustrated in FIG. 6. Hereinafter, only components having functions different from those of the above-described embodiment will be described, and description of the same contents will be omitted.

3-1. First Application Example

First, a first application example according to the present embodiment will be described. According to the first application example, a display surface of a transfer destination of an object to be transferred can be determined adaptively to a state of a plurality of predetermined transfer objects positioned on a display surface of a transfer source. In the first application example, an example in which the plurality of predetermined transfer objects are real objects is assumed.

{3-1-1. Transfer Operation Detection Unit 102}

When it is detected that a user places a certain object, which is positioned on the display surface of the transfer source, on one of the plurality of predetermined transfer objects, a transfer operation detection unit 102 according to the first application example detects the operation as a transfer operation for transferring information corresponding to the object to another display surface.

{3-1-2. Display Control Unit 106}

When the transfer operation is detected by the transfer operation detection unit 102, a display control unit 106 according to the first application example determines at least one display surface serving as a transfer destination of information corresponding to the object to be transferred from among a plurality of display surfaces corresponding to the display surface of the transfer source based on information indicating a state of a plurality of predetermined transfer objects positioned on the display surface of the transfer source and a detection result of the transfer operation. For example, each of the plurality of predetermined transfer objects is associated with one display surface different from each other among the plurality of display surfaces. Then, when the transfer operation is detected, the display control unit 106 determines at least one display surface serving as the transfer destination of the information corresponding to the object to be transferred based on whether a distance between any two transfer objects of the plurality of predetermined transfer objects is equal to or less than a predetermined threshold and whether an arrangement of any two transfer objects is a predetermined arrangement.

Here, the above functions will be described in more detail with reference to FIGS. 13 and 14. In the examples illustrated in FIGS. 13 and 14, a transfer base 32a of the two transfer bases 32 is associated with a whiteboard 20-2, and a transfer base 32b is associated with a whiteboard 20-3. For example, the whiteboard 20-2 is a display surface used by a plurality of users belonging to group A for discussion. In addition, the whiteboard 20-3 is a display surface used by a plurality of users belonging to group B for discussion. Note that the transfer base 32 illustrated in FIGS. 13 and 14 is an example of the above-described predetermined transfer object.

For example, as illustrated in FIG. 13, two transfer bases 32 are arranged apart from each other on the display surface 20-1 (table surface 20-1) of the transfer source by a distance larger than a predetermined distance. Then, as illustrated in FIG. 13, the user using the table surface 20-1 places the tag 30 on the transfer base 32b, as the transfer operation of the image corresponding to the tag 30 positioned on the table surface 20-1. In this case, as illustrated in FIG. 13, the display control unit 106 transfers and displays an image 40 corresponding to the tag 30 only to the whiteboard 20-3 associated with the transfer base 32b of the two whiteboards.

Further, as illustrated in FIG. 14, it is assumed that two transfer bases 32 are adjacently arranged on the display surface 20-1 (table surface 20-1) of the transfer source. Then, the user using the table surface 20-1 places the tag 30 on the transfer base 32b, as the transfer operation of the image corresponding to the tag 30 positioned on the table surface 20-1 (as in the example illustrated in FIG. 13). In this case, as illustrated in FIG. 14, the display control unit 106 transfers and displays the image 40 corresponding to the tag 30 only to both of the two whiteboards.

3-2. Second Application Example

The first application example has been described above. Next, a second application example according to the present embodiment will be described. According to the second application example, a display surface of a transfer destination of an object to be transferred can be determined adaptively to postures of a predetermined transfer object positioned on a display surface of a transfer source.

In the second application example, an example can be assumed in which the predetermined transfer object is a real object having a plurality of surfaces as illustrated in FIG. 15. Furthermore, it is assumed that each of the plurality of surfaces of the predetermined transfer object is associated with a different display surface among the plurality of display surfaces other than the display surface of the transfer source.

{3-2-1. Transfer Operation Detection Unit 102}

When it is detected that a user mounts a certain object, which is positioned on the display surface of the transfer source, on any of a plurality of surfaces having the predetermined transfer objects, the transfer operation detection unit 102 according to the first application example detects the operation as a transfer operation for transferring information corresponding to the object to another display surface.

{3-2-2. Display Control Unit 106}

When the transfer operation is detected by the transfer operation detection unit 102, the display control unit 106 according to the second application example determines one display surface associated with a surface on which the object to be transferred is arranged among the plurality of surfaces having the predetermined transfer object as the display surface of the transfer destination of the information corresponding to the object.

Here, the above functions will be described in more detail with reference to FIGS. 15 and 16. In the example illustrated in FIGS. 15 and 16, each of the plurality of surfaces of the transfer base 32 is associated with a different display surface among a plurality of display surfaces (for example, whiteboard 20-2 and whiteboard 20-3). For example, a surface described as "A" among the plurality of surfaces of the transfer base 32 is associated with the whiteboard 20-2. Further, a surface described as "B" among the plurality of surfaces is associated with the whiteboard 20-3. Note that the transfer base 32 illustrated in FIGS. 15 and 16 is an example of the above-described predetermined transfer object.

For example, as illustrated in FIG. 15, the transfer base 32 is arranged on the table surface 20-1 (that is, a surface associated with the whiteboard 20-2) so that an upper surface of the transfer base 32 is the surface described as "A". Then, the user using the table surface 20-1 places the tag 30 on the upper surface of the transfer base 32, as the transfer operation of the image corresponding to the tag 30 positioned on the table surface 20-1. In this case, as illustrated in FIG. 15, the display control unit 106 transfers and displays an image 40 corresponding to the tag 30 only to the whiteboard 20-2 (associated with the surface described as "A") among the two whiteboards.

As another example, as illustrated in FIG. 16, the transfer base 32 is arranged on the table surface 20-1 so that an upper surface of the transfer base 32 is a surface described as "B" (that is, a surface associated with the whiteboard 20-3). Then, the user using the table surface 20-1 places the tag 30 on the upper surface of the transfer base 32, as the transfer operation of the image corresponding to the tag 30 positioned on the table surface 20-1. In this case, as illustrated in FIG. 16, the display control unit 106 transfers and displays an image 40 corresponding to the tag 30 only to the whiteboard 20-3 (associated with the surface described as "B") among the two whiteboards.

3-3. Third Application Example

The second application example has been described above. Next, a third application example according to the present embodiment will be described. According to the third application example, the display surface of the transfer destination of the object to be transferred can be determined adaptively in a direction in which the predetermined transfer object positioned on the display surface of the transfer source is directed.

In the third application example, an example can be assumed in which the predetermined transfer object is a real object having at least one inclined surface, for example, as illustrated in FIGS. 17 and 18.

{3-3-1. Transfer Operation Detection Unit 102}

When it is detected that the user arranges a certain object on any of at least one inclined surface of the predetermined transfer object, the transfer operation detection unit 102 according to the third application example detects the operation as the transfer operation for transferring the information corresponding to the object to another display surface.

{3-3-2. Display Control Unit 106}

When the operation (transfer operation described above) of arranging the object to be transferred on any of the at least one inclined surface is detected, the display control unit 106 according to the third application example determines, for example, the display surface positioned in the direction in which the predetermined transfer object is directed as the display surface of the transfer destination of the information corresponding to the objected to be transferred, from among the plurality of display surfaces corresponding to the display surface of the transfer source.

Here, the above functions will be described in more detail with reference to FIGS. 17 and 18. In the example illustrated in FIGS. 17 and 18, the transfer base 32 has only one inclined surface. In addition, in the examples illustrated in FIGS. 17 and 18, the information processing system 10 can specify a positional relationship between the table surface 20-1, the whiteboard 20-2, and the whiteboard 20-3 in real time. For example, it is assumed that the processing unit 100 can acquire information indicating relative directions of the whiteboard 20-2 and the whiteboard 20-3 with respect to the table surface 20-1 in real time. Note that the transfer base 32 illustrated in FIGS. 17 and 18 is an example of the above-described predetermined transfer object.

For example, as illustrated in FIG. 17, it is assumed that the transfer base 32 is arranged on the table surface 20-1 in the state in which the transfer base 32 is directed in the direction of the whiteboard 20-2 with respect to the table surface 20-1. Then, the user using the table surface 20-1 places the tag 30 on the inclined surface of the transfer base 32, as the transfer operation of the image corresponding to the tag 30 positioned on the table surface 20-1. In this case, as illustrated in FIG. 17, the display control unit 106 transfers and displays the image 40 corresponding to the tag 30 only to the whiteboard 20-2 in which the transfer base 32 is directed among the two whiteboards.

As another example, as illustrated in FIG. 18, it is assumed that the transfer base 32 is arranged on the table surface 20-1 in the state in which the transfer base 32 is directed in the direction of the whiteboard 20-3 with respect to the table surface 20-1. Then, the user using the table surface 20-1 places the tag 30 on the inclined surface of the transfer base 32, as the transfer operation of the image corresponding to the tag 30 positioned on the table surface 20-1. In this case, as illustrated in FIG. 18, the display control unit 106 transfers and displays the image 40 corresponding to the tag 30 only to the whiteboard 20-3 in which the transfer base 32 is directed among the two whiteboards.

3-4. Fourth Application Example

The third application example has been described above. Next, a fourth application example according to the present embodiment will be described. According to the fourth application example, an images corresponding to an object to be transferred can be displayed on a display surface of a transfer destination, adaptively to a relationship between a display surface of a transfer source and a posture of a predetermined transfer object. In the fourth application example, an example in which the predetermined transfer object is a real object is assumed.

{3-4-1. Transfer Operation Detection Unit 102}

When it is determined that an operation for a user to make a certain object approach and touch (for example, be arranged on) the predetermined transfer object arranged on the display surface of the transfer source, the transfer operation detection unit 102 according to the fourth application example detects this series of operations as a transfer operation for transferring information corresponding to the object to another display surface.

{3-4-2. Display Control Unit 106}

When the above series of operations is detected as the transfer operation by the transfer operation detection unit 102, the display control unit 106 according to the fourth application example controls an image corresponding to the object to be transferred to be displayed on a display surface of a transfer destination based on a detection result of a moving progress of the object to be transferred during the transfer operation and a detection result of a posture of the predetermined transfer object during the transfer operation. For example, in this case, when the image corresponding to the object to be transferred is displayed on the display surface of the transfer destination, the display control unit 106 continuously changes the display position of the image based on the detection result of the moving progress of the object to be transferred during the transfer operation and the detection result of the posture of the predetermined transfer object during the transfer operation.

Here, the above functions will be described in more detail with reference to FIGS. 19A and 19B. In the example illustrated in FIGS. 19A and 19B, it is assumed that the same transfer base 32 is arranged on the display surface 20-1 (table surface 20-1) of the transfer source and the display surface 20-2 (table surface 20-2) of the transfer destination, respectively. Note that the transfer base 32 illustrated in FIGS. 19A and 19B is an example of the above-described predetermined transfer object.

Figure 19A:
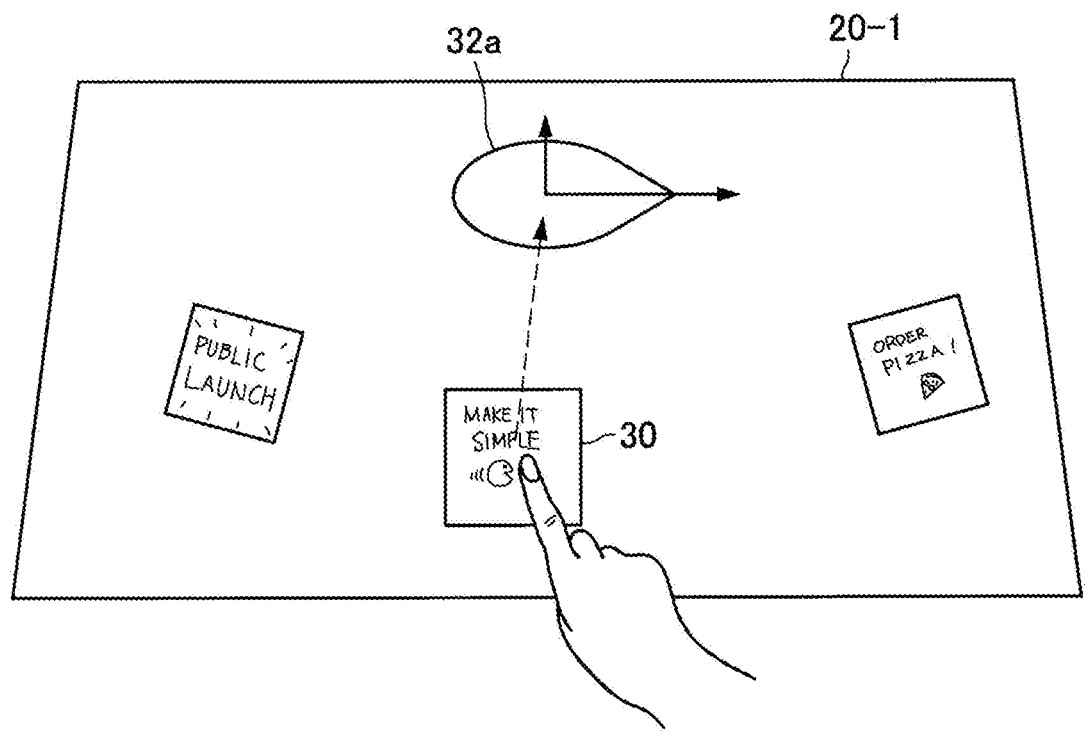
FIG. 19A is a diagram illustrating an example of a transfer operation of an image corresponding to an object according to a fourth application example of the present embodiment.
Figure 19B:
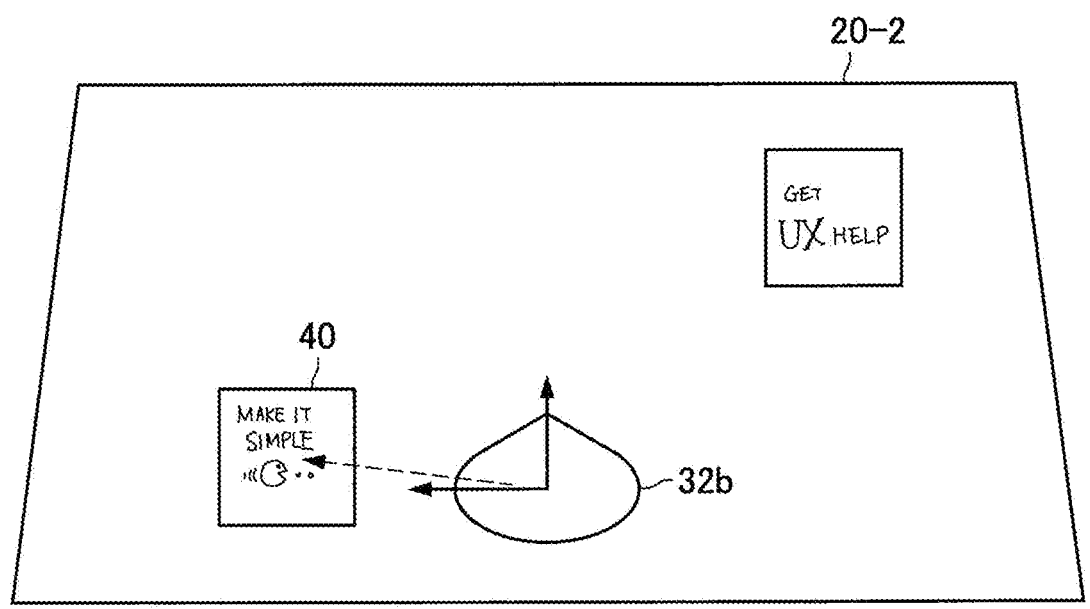
FIG. 19B is a diagram illustrating an example of transferring an image corresponding to the object according to the fourth application example.

For example, as illustrated in FIG. 19A, the user using the table surface 20-1 makes the tag 30 approach the transfer base 32a on the table surface 20-1 (transfer operation of the image corresponding to the tag 30) by a flick operation and arranges the tag 30 on the transfer base 32a. In this case, as illustrated in FIG. 19B, first, the display control unit 106 displays the image 40 corresponding to the tag 30 at the position of the transfer base 32b on the table surface 20-2. Then, the display control unit 106 continuously changes the display position of the image 40 based on the relationship between the position and posture of the transfer base 32a on the table surface 20-1 and the position and posture of the transfer base 32b on the table surface 20-2 so that the image 40 moves relatively identically with the moving progress (for example, change in speed during movement, change in acceleration during movement, movement path, and the like) of the tag 30 with respect to the transfer base 32a during the transfer operation. According to this display example, it is possible to reproduce the movement of the tag 30 during the transfer operation while maintaining the relative positional relationship on the display surface 20-2 of the transfer destination.

3-5. Fifth Application Example

The fourth application example has been described above. Next, a fifth application example according to the present embodiment will be described. According to the fifth application example, a character string included in an object to be transferred can be adaptively converted into a location (or a user who uses the display surface of the transfer destination) where a display surface of a transfer destination is positioned and displayed.

{3-5-1. Display Control Unit 106}

When the transfer operation is detected by the transfer operation detection unit 102, the display control unit 106 according to the fifth application example generates an image corresponding to the object to be transferred and displays the image on the display surface of the transfer destination based on a conversion rule of the character string registered in the surface attribute information DB 128 in association with the display surface of the transfer destination. For example, the display control unit 106 first converts the character string included in the object to be transferred using the conversion rule of the character string registered in the surface attribute information DB 128 in association with the display surface of the transfer destination. Then, the display control unit 106 generates the image corresponding to the object to be transferred so as to include the converted character string (instead of the character string included in the object to be transferred).

Figures 20, 21A:
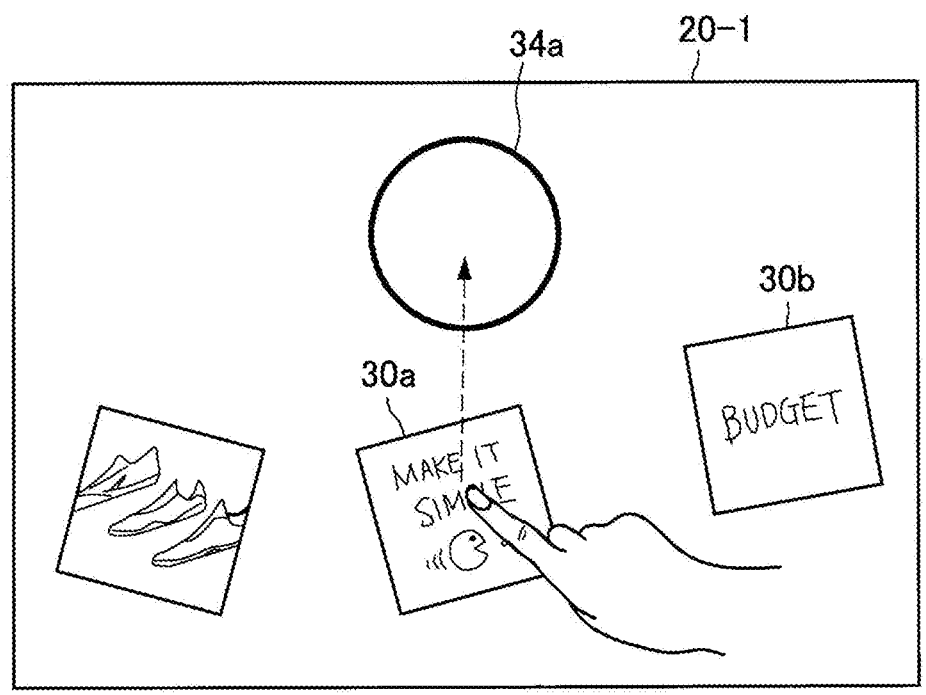
FIG. 20 is a diagram illustrating a configuration example of a surface attribute information DB 128 according to a fifth application example of the present embodiment.
FIG. 21A is a diagram illustrating an example of a transfer operation of an image corresponding to an object according to the fifth application example.
Figure 21B:
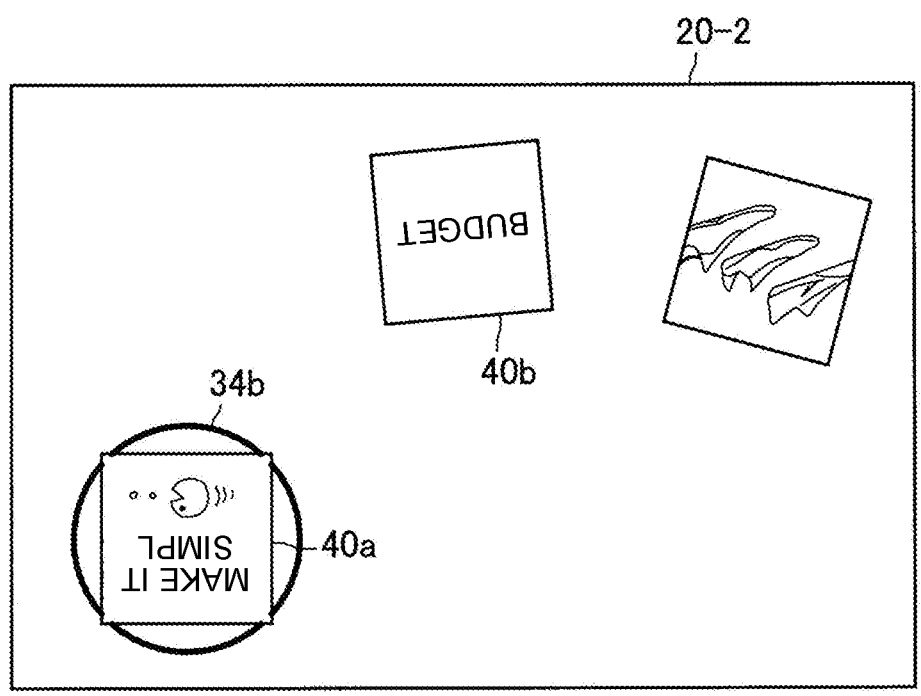
FIG. 21B is a diagram illustrating an example in which an image corresponding to an object to be transferred according to the fifth application example is converted and displayed according to a display surface of a transfer destination.

Here, the above functions will be described in more detail with reference to FIGS. 20 and 21B. FIG. 20 is a diagram illustrating a configuration example of the surface attribute information DB 128 according to the fifth application example. As illustrated in FIG. 20, for example, a translation rule of the character string included in the object at the time of displaying the image corresponding to the object to be transferred can be predefined for each type of display surface.

In addition, FIG. 21A is a diagram schematically illustrating the display surface 20-1 (table surface 20-1) in which No. in the surface attribute information DB 128 illustrated in FIG. 20 is "1". FIG. 21B is a diagram schematically illustrating the display surface 20-2 (table surface 20-2) in which No. in the surface attribute information DB 128 illustrated in FIG. 8 is "2". In the example illustrated in FIGS. 21A and 21B, a scene is assumed in which one or more users using the display surface 20-1 positioned in the United States of America and one or more users using the display surface 20-2 positioned in Japan are brainstorming.

For example, as illustrated in FIG. 21A, it is assumed that the transfer operation of moving the tag 30a positioned on the display surface 20-1 to the transfer area 34a displayed in the display surface 20-1 is detected. In this case, the display control unit 106 first specifies all the character strings included in the tag 30a by using, for example, optical character recognition (OCR) and the like. Next, the display control unit 106 converts all the character strings included in tag 30a into Japanese based on the translation rule stored in the surface attribute information DB 128 in association with the display surface 20-2 (which is the display surface of the transfer destination of the image corresponding to the tag 30a). Next, the display control unit 106 generates the image 40 corresponding to the tag 30a so as to include the converted character string (that is, Japanese character string). Then, as illustrated in FIG. 21B, the display control unit 106 displays the image 40 on the transfer area 34b defined in the display surface 20-2.

3-6. Sixth Application Example

The fifth application example has been described above. Next, a sixth application example according to the present embodiment will be described. According to the sixth application example, a character string included in an object to be transferred can be adaptively converted into a location (or a user who uses the display surface of the transfer destination) where a display surface of a transfer destination is positioned and displayed.

{3-6-1. Configuration of System}

Figure 22:
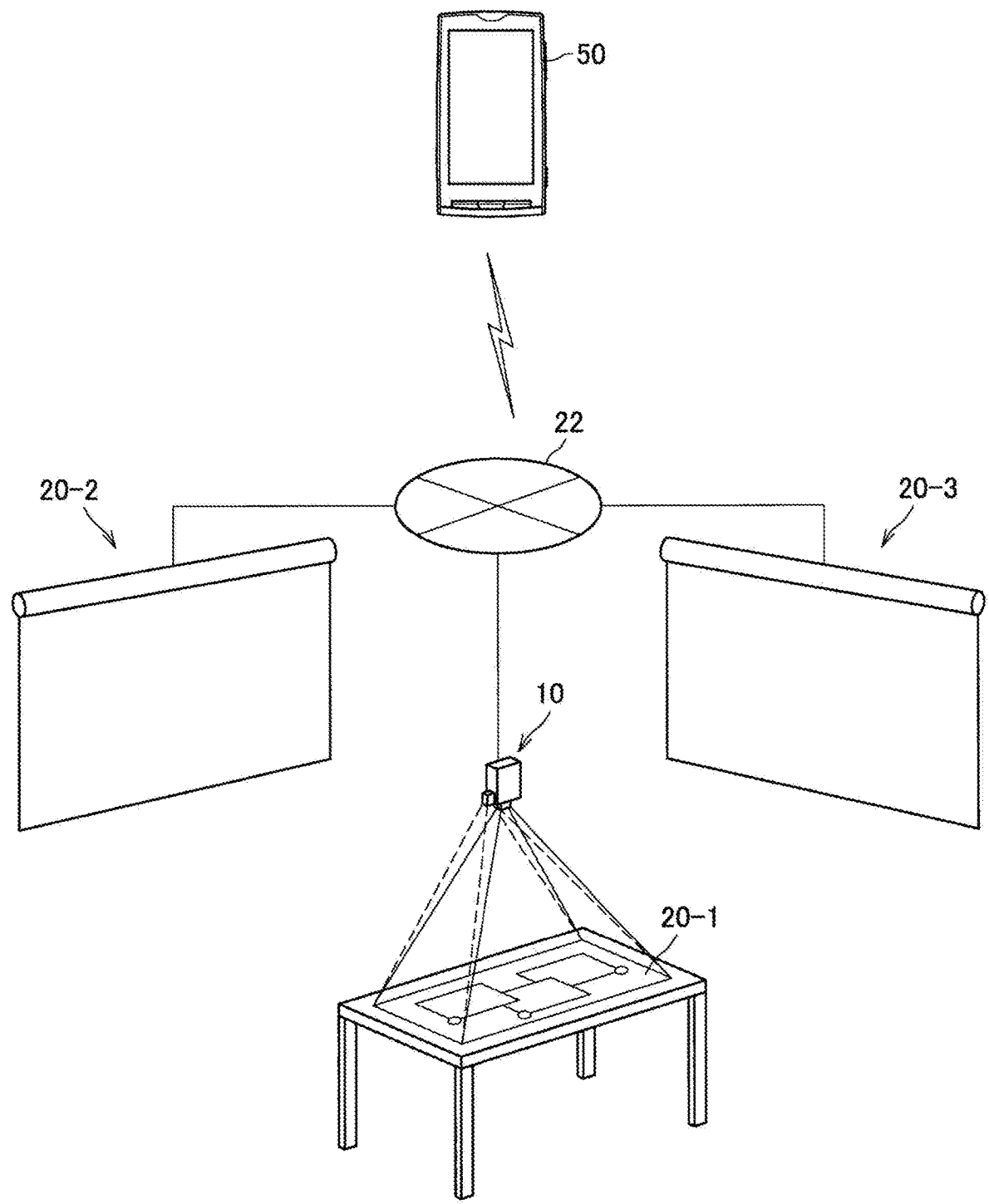
FIG. 22 is a diagram illustrating a configuration example of a system according to a sixth application example of the present embodiment.

First, a configuration of a system according to the sixth application example will be described with reference to FIG. 22. FIG. 22 is a diagram illustrating a configuration example of a system according to the sixth application example. As illustrated in FIG. 22, the system further includes a smartphone 50 as compared with the configuration example of the system according to the above-described embodiment illustrated in FIG. 5, for example. For example, the smartphone 50 is configured to be connectable to a communication network 22 by wireless communication. The smartphone 50 can transmit and receive various types of information to and from the information processing system 10 or other display surfaces (the display surface 20-2 and the display surface 20-3) via the communication network 22.

{3-6-2. Transfer Operation Detection Unit 102}

Figure 24A:
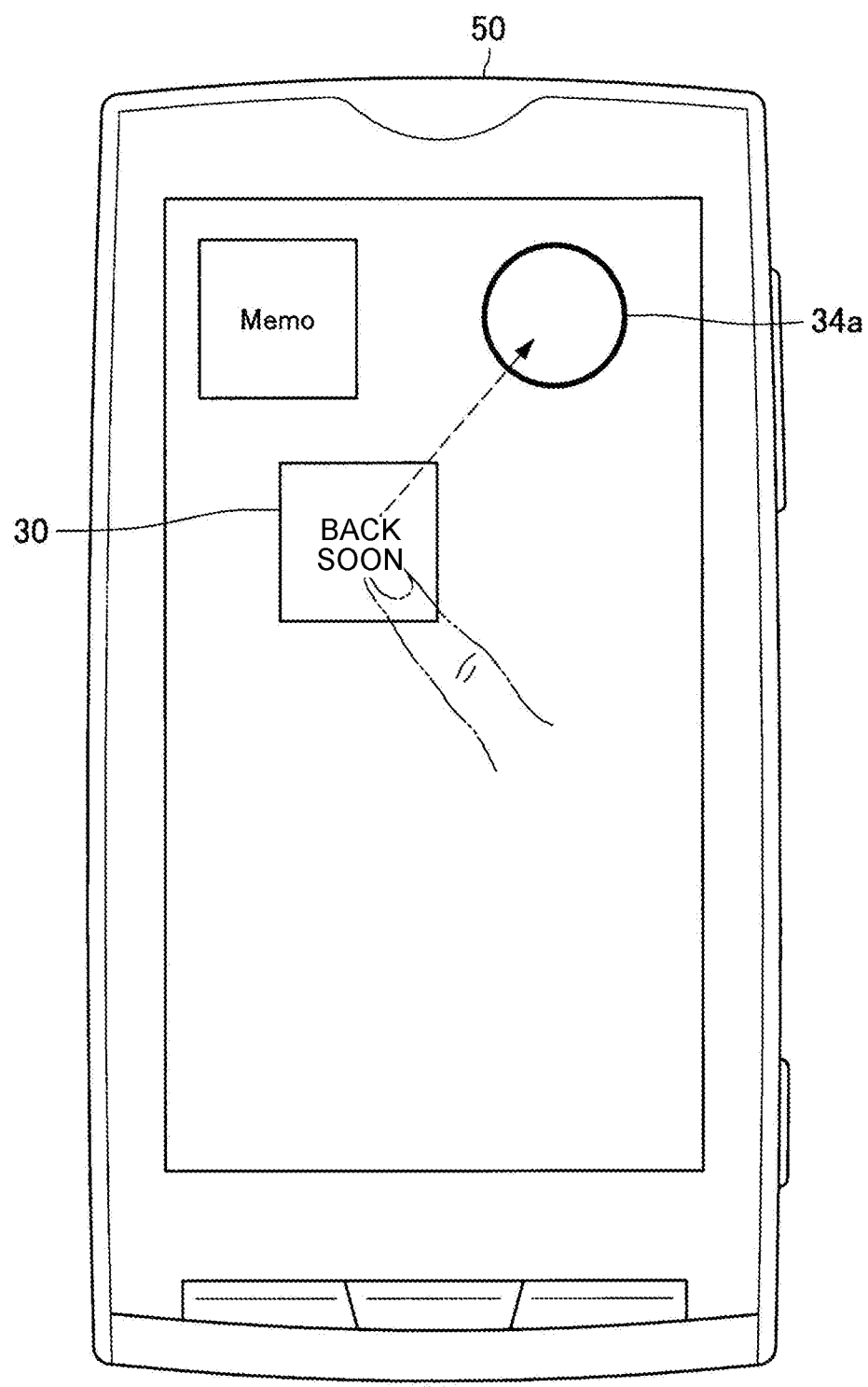
FIG. 24A is a diagram illustrating an example of a transfer operation of an image corresponding to an object with respect to a display screen of a smartphone 50 according to the sixth application example.

For example, as illustrated in FIG. 24A, when the detection result of the operation for the user to move a certain object displayed on the smartphone 50 to the transfer area displayed on the smartphone 50 is received from the smartphone 50, the transfer operation detection unit 102 according to the sixth application example detects the operation of the user as the transfer operation for transferring the object from the smartphone 50 to another display surface.

{3-6-3. Display Control Unit 106}

When the transfer operation on the smartphone 50 is detected by the transfer operation detection unit 102, the display control unit 106 according to the sixth application example generates an image corresponding to the object to be transferred and displays the image on the display surface of the transfer destination based on a conversion rule of the character string registered in the surface attribute information DB 128 in association with the display surface of the transfer destination.

Figure 23:
FIG. 23 is a diagram illustrating a configuration example of a surface attribute information DB 128 according to the sixth application example.
Figure 24B:
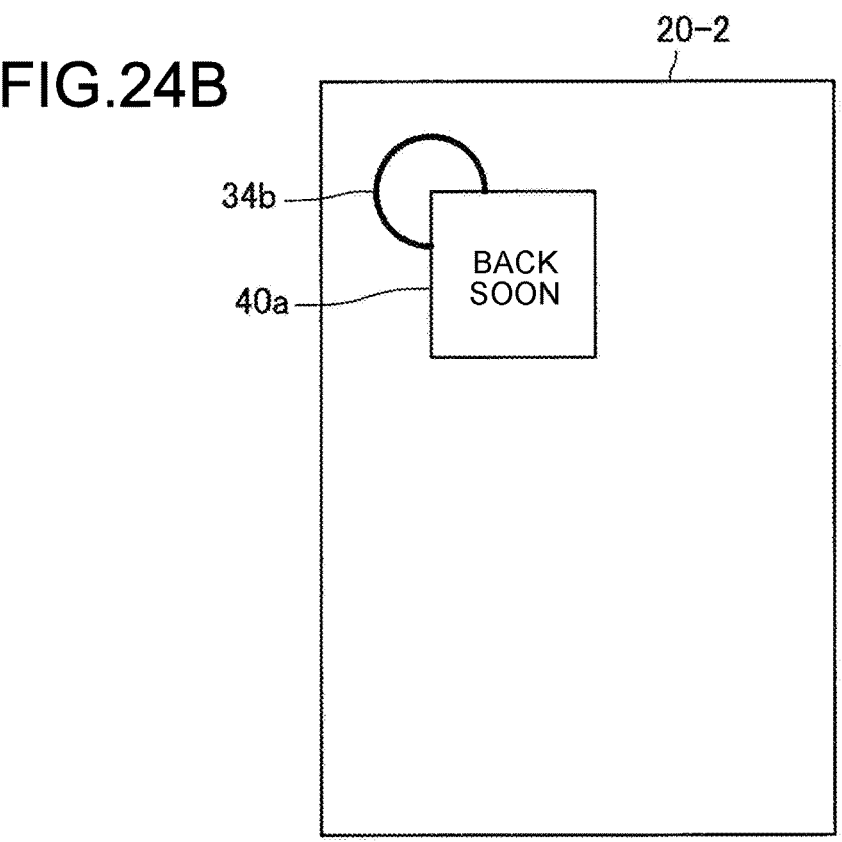
FIG. 24B is a diagram illustrating an example in which an image corresponding to an object to be transferred according to the sixth application example is converted and displayed according to a display surface of a transfer destination.
Figure 24C:
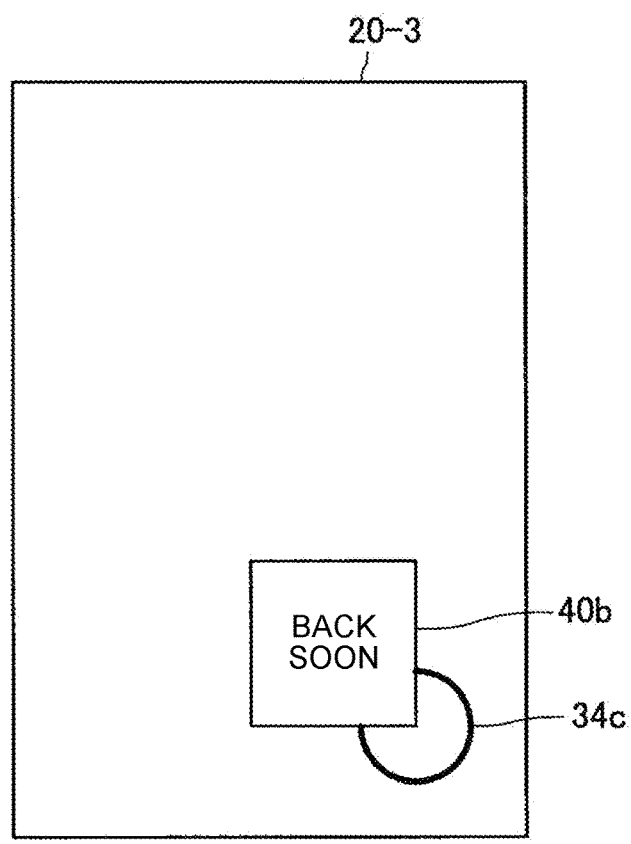
FIG. 24C is a diagram illustrating an example in which the image corresponding to the object to be transferred according to the sixth application example is converted and displayed according to the display surface of the transfer destination.

Here, the above functions will be described in more detail with reference to FIGS. 23 to 24C. FIG. 23 is a diagram illustrating a configuration example of the surface attribute information DB 128 according to the sixth application example. In addition, FIG. 24A is a diagram schematically illustrating the display surface (that is, display surface of the smartphone 50) in which No. in the surface attribute information DB 128 illustrated in FIG. 23 is "1". FIG. 24B is a diagram schematically illustrating the display surface 20-2 (notice board 20-2) in which No. in the surface attribute information DB 128 illustrated in FIG. 23 is "2". FIG. 24C is a diagram schematically illustrating the display surface 20-2 (notice board 20-3) in which No. in the surface attribute information DB 128 illustrated in FIG. 23 is "3". In the example illustrated in FIGS. 23 to 24C, the smartphone 50 is used by a father of a certain family, the notice board 20-2 is placed in a living room of a house where the family lives, and the notice board 20-3 is placed in a children's room of the house.

As illustrated in FIG. 23, in the surface attribute information DB 128, the conversion rule of the character string included in the object at the time of displaying the image corresponding to the object to be transferred can be predefined for each type of display surface. It is assumed that an adult user (for example, a mother) using the notice board 20-2 can easily understand the character string even if the character string includes Chinese character. Therefore, in the surface attribute information DB 128, "not converting the character string included in the object to be transferred" is associated with the notice board 20-2 as the conversion rule of the character string. On the other hand, it is assumed that a child using the notice board 20-3 has difficulty in understanding the character string when the character string includes Chinese character. Therefore, in the surface attribute information DB 128, "converting the character string included in the object to be transferred to Hiragana" is associated with the notice board 20-3 as the conversion rule of the character string.

For example, as illustrated in FIG. 24A, it is assumed that a transfer operation for the father to moving the displaying tag 30 to the transfer area 34a displayed on the smartphone 50 is detected. As illustrated in FIG. 24A, the tag 30 includes a character string including Chinese character ("back soon"). In this case, the display control unit 106 of the information processing system 10 first specifies the character string included in the tag 30 based on the detection result of the operation received from the smartphone 50. Next, the display control unit 106 determines not to convert the character string included in the tag 30 by referring to the conversion rule stored in the surface attribute information DB 128 in association with the notice board 20-2. Next, the display control unit 106 generates an image 40a corresponding to the tag 30 including the character string included in the tag 30 as it is. Then, as illustrated in FIG. 24B, the display control unit 106 displays the image 40a on the notice board 20-2.

Further, the display control unit 106 determines to convert all the character strings included in the tag 30 into "Hiragana" by referring to the conversion rule stored in the surface attribute information DB 128 in association with the notice board 20-3. Next, the display control unit 106 generates an image 40b corresponding to the tag 30 so as to include the converted character string. Then, as illustrated in FIG. 24C, the display control unit 106 displays the image 40b on the notice board 20-3.

3-7. Seventh Application Example

The sixth application example has been described above. Next, a seventh application example according to the present embodiment will be described. According to the seventh application example, a format (or layout) of an image corresponding to an object to be transferred can be adaptively converted and displayed on a display surface of a transfer destination.

{3-7-1. Display Control Unit 106}

When a transfer operation is detected by a transfer operation detection unit 102, a display control unit 106 according to the seventh application example first determines a format of an image corresponding to the object to be transferred based on a conversion rule of a format (or layout) of an image registered in a surface attribute information DB 128 in association with a display surface of a transfer destination. Then, the display control unit 106 displays the image of the determined format on the display surface of the transfer destination as an image corresponding to the object.

Figure 25:
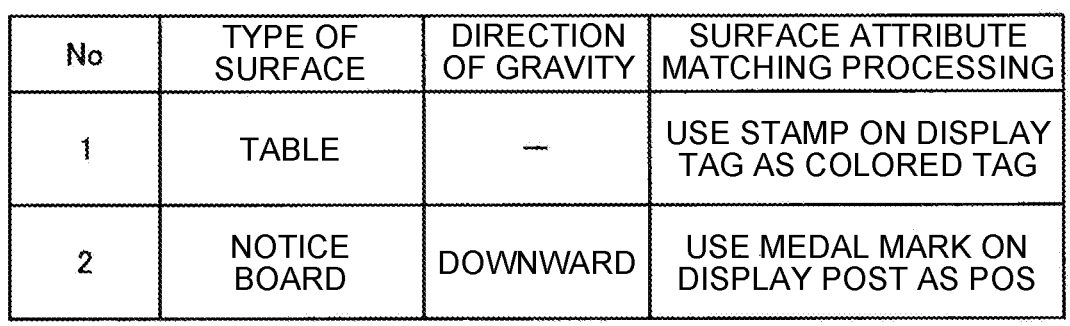
FIG. 25 is a diagram illustrating a configuration example of a surface attribute information DB 128 according to a seventh application example of the present embodiment.
Figure 26A:
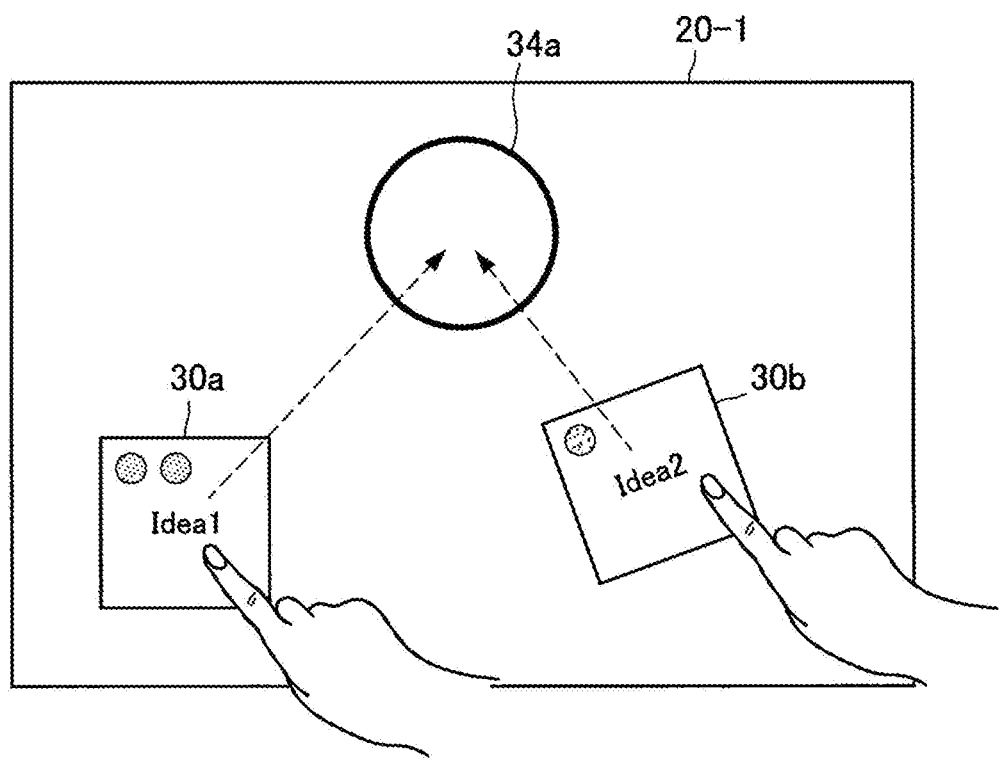
FIG. 26A is a diagram illustrating an example of a transfer operation of an image corresponding to an object according to the seventh application example.
Figure 26B:
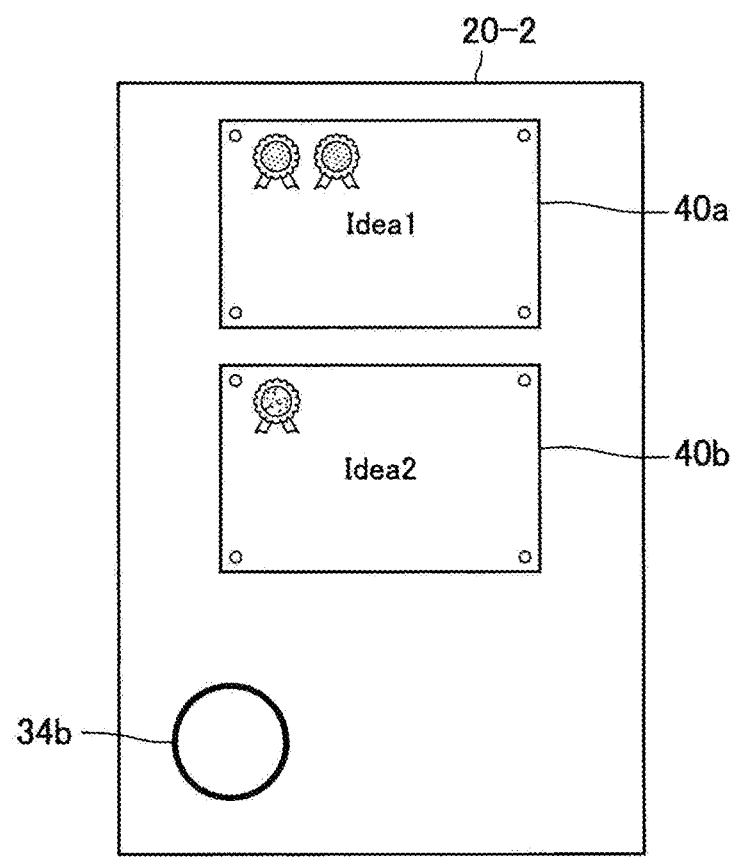
FIG. 26B is a diagram illustrating an example in which an image corresponding to an object to be transferred according to the seventh application example is converted and displayed according to a display surface of a transfer destination.

Here, the above functions will be described in more detail with reference to FIGS. 25 to 26B. FIG. 25 is a diagram illustrating a configuration example of the surface attribute information DB 128 according to the seventh application example. As illustrated in FIG. 25, for example, a conversion rule of a format (or layout) of an image corresponding to the object at the time of displaying the image corresponding to the object to be transferred can be predefined for each type of display surface. In addition, FIG. 26A is a diagram schematically illustrating the display surface 20-1 (table surface 20-1) in which No. in the surface attribute information DB 128 illustrated in FIG. 25 is "1". FIG. 26B is a diagram schematically illustrating the display surface 20-2 (notice board 20-2) in which No. in the surface attribute information DB 128 illustrated in FIG. 25 is "2".

For example, as illustrated in FIG. 26A, it is assumed that the transfer operation of moving the two tags 30 positioned on the display surface 20-1 to the transfer area 34a displayed in the display surface 20-1 one by one is detected. In this case, the display control unit 106 first refers to the conversion rule of the format that is stored in the surface attribute information DB 128 in association with the notice board 20-2 (which is the display surface of the transfer destination of the image corresponding to the two tags 30). Next, the display control unit 106 determine to convert shapes of images corresponding to each tag 30 into shapes of "posts", respectively, and convert "stamps" included in each tag 30 into "medal marks", respectively. Next, the display control unit 106 converts each format of each tag 30 by the conversion rule determined for each tag 30, respectively, to generate each image 40 (image 40*a* and image 40*b*) corresponding to each tag 30. Then, as illustrated in FIG. 26B, the display control unit 106 displays the image 40*a* and the image 40*b* on the notice board 20-2.

According to this display example, the image of the "post" including the same number of "medal marks" as the number of "stamps" (which was a measure of importance on the table surface 20-1) can be displayed on the notice board 20-2 as the image 40 corresponding to the tag 30.

3-8. Eighth Application Example

The seventh application example has been described above. Next, an eighth application example according to the present embodiment will be described. According to the eighth application example, the user using the display surface of the transfer source can display the image corresponding to the object to be transferred at a desired position in the display surface of the transfer destination by an intuitive operation.

{3-8-1. Display Control Unit 106}

3-8-1-1. Feedback Display of Transfer Operation Detection

When the transfer operation is detected by the transfer operation detection unit 102, the display control unit 106 according to the eighth application example performs, on the display surface of the transfer source, the predetermined display control indicating that the display information displayed on the display surface of the transfer destination is changed to be operable in the display surface of the transfer source. For example, the display control unit 106 displays, on the display surface of the transfer source, one or more pieces of display information in a target area on the display surface of the transfer destination as the predetermined display control. Here, the target area can be a partial area in the display surface of the transfer destination.

For example, when it is detected that a predetermined operation (hereinafter, sometimes referred to as a "subsequent operation") is performed following the transfer operation, the display control unit 106 first changes the target area from the predetermined area in the display surface of the transfer destination to another area corresponding to the detection result of the subsequent operation. Then, each time the target area is changed to another area, the display control unit 106 controls one or more pieces of display information in another area after the change as the display information in the display surface of the transfer destination displayed in the display surface of the transfer source to be sequentially displayed on the display surface of the transfer source.

Here, the subsequent operation is an example of a second operation according to the present disclosure. The subsequent operation can be an operation performed continuously on the transfer operation while maintaining the operation state for the object to be transferred in the predetermined operation state. For example, the transfer operation can be an operation of dragging the object to be transferred on the display surface of the transfer source to the predetermined transfer object. In this case, the subsequent operation may be an operation of continuously dragging the object while maintaining a state (for example, a state in which the object is touched) in which the object is pointed.

The second operation according to the present disclosure is not limited to the "subsequent operation" described above, and may be another type of operation performed by the user after the transfer operation. For example, the second operation may be an operation for the user to move the object to be transferred on the display surface of the transfer source after the information corresponding to the object to be transferred is transferred. As an example, the second operation may be an operation for the user to flick the object to be transferred on the display surface of the transfer source to the predetermined transfer object (for example, transfer base and the like).

As a modified example, the predetermined display control may change a display mode of the display surface of the transfer source. For example, the predetermined display control may change a display color or luminance of the display surface of the transfer source, or to additionally display a predetermined effect on the display surface of the transfer source.

3-8-1-2. Change of Display on Display Surface of Transfer Destination

Further, the display control unit 106 according to the eighth application example can change the display state of the display surface of the transfer destination based on the detection result of the subsequent operation. For example, the display control unit 106 displays the information corresponding to the object to be transferred on the display surface of the transfer destination based on the detection result of the subsequent operation. As an example, the display control unit 106 determines the display position of the image corresponding to the object to be transferred in the display surface of the transfer destination based on the detection result of the subsequent operation. For example, the subsequent operation may be a touch operation (drag operation and the like) for the object to be transferred. In this case, at timing when it is detected that a hand touching the object to be transferred is released from the display surface of the transfer source, the display control unit 106 displays the image corresponding to the object to be transferred at a position on the display surface of the transfer destination corresponding to the position touched immediately before the timing.

Here, the above functions will be described in more detail with reference to FIGS. 27A to 27D. FIGS. 27A to 27D are diagrams illustrating examples of the display control on the display surface 20-1 (table surface 20-1) of the transfer source and the display surface 20-2 (whiteboard 20-2) of the transfer destination according to the eighth application example.

Case 1

Figure 27A:
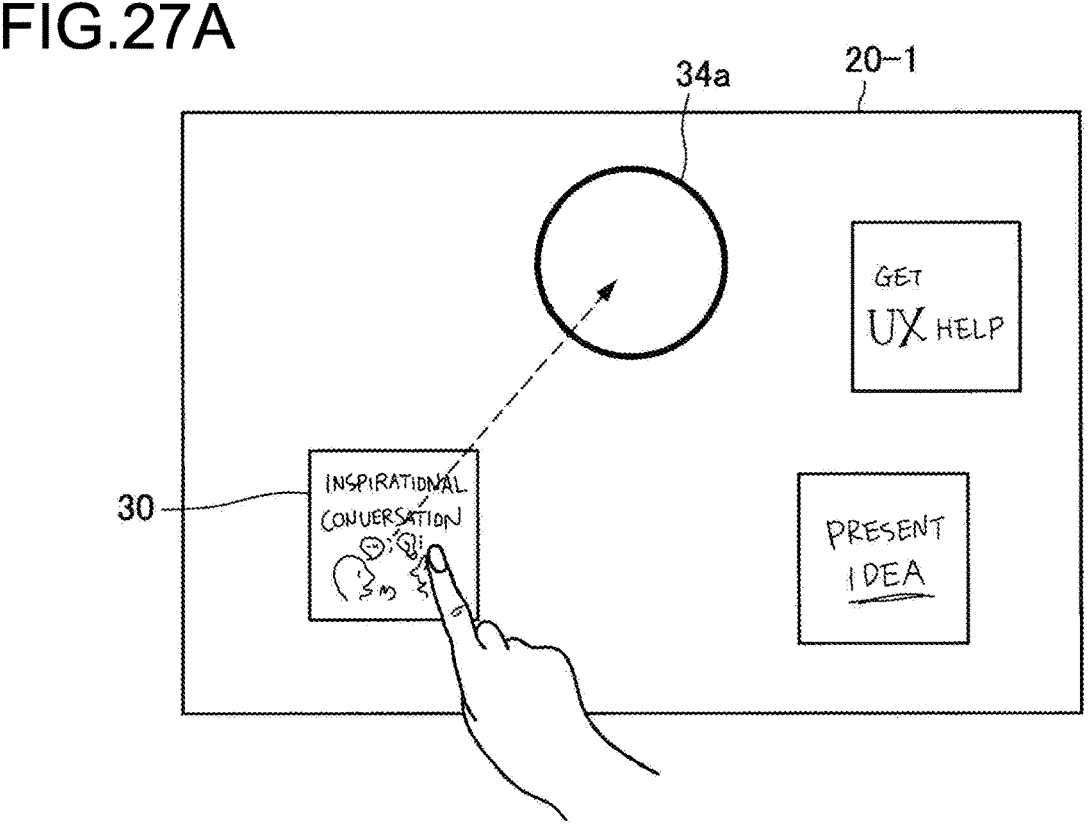
FIG. 27A is a diagram illustrating an example of a transfer operation of an image corresponding to an object according to an eighth application example of the present embodiment.
Figure 27B:
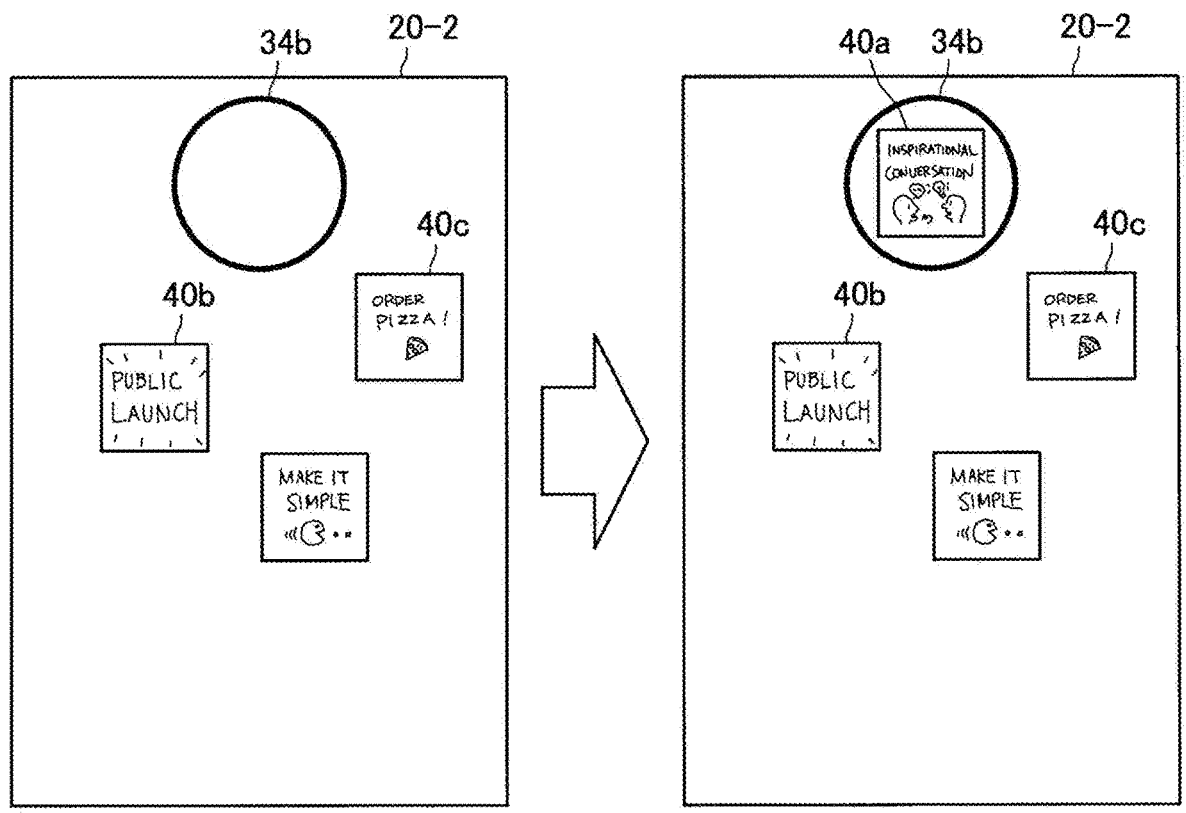
FIG. 27B is a diagram illustrating an example of transferring an image corresponding to the object according to the eighth application example.

For example, as illustrated in FIG. 27A, the user using the table surface 20-1 drags the tag 30 from the outside of the transfer area 34*a* displayed on the table surface 20-1 (as the transfer operation of the image corresponding to the tag 30) into the transfer area 34*a* with his/her hand, and releases his/her hand from the tag 30. In this case, at timing when the hand is released from the tag 30, as illustrated in FIG. 27B, the display control unit 106 displays the image 40 corresponding to the tag 30 in the transfer area 34*b* set on the whiteboard 20-2.

Case 2

On the other hand, the user drags the tag 30 from the outside of the transfer area 34a into the transfer area 34a with his/her hand, and maintains a state in which the user's hand is not released from the tag 30, for example, in a predetermined time or more (that is, keeps a hand on the tag 30). In this case, the display control unit 106 displays, on the table surface 20-1, all display information positioned within a clipping area 60 defined in the whiteboard 20-2. In other words, an image on the whiteboard 20-2 side can be changed to be displayed on the table surface 20-1. Here, the clipping area 60 is an example of a target area.

Figure 27C:
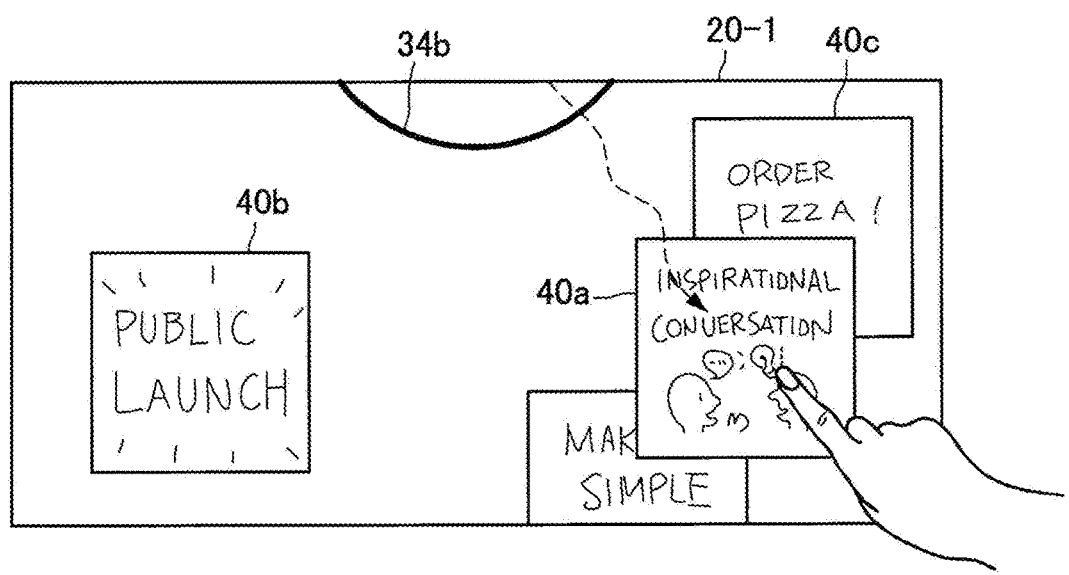
FIG. 27C is a diagram illustrating an example in which display information in a target area in the display surface of the transfer destination is displayed on a display surface of a transfer source according to the eighth application example.
Figure 27D:
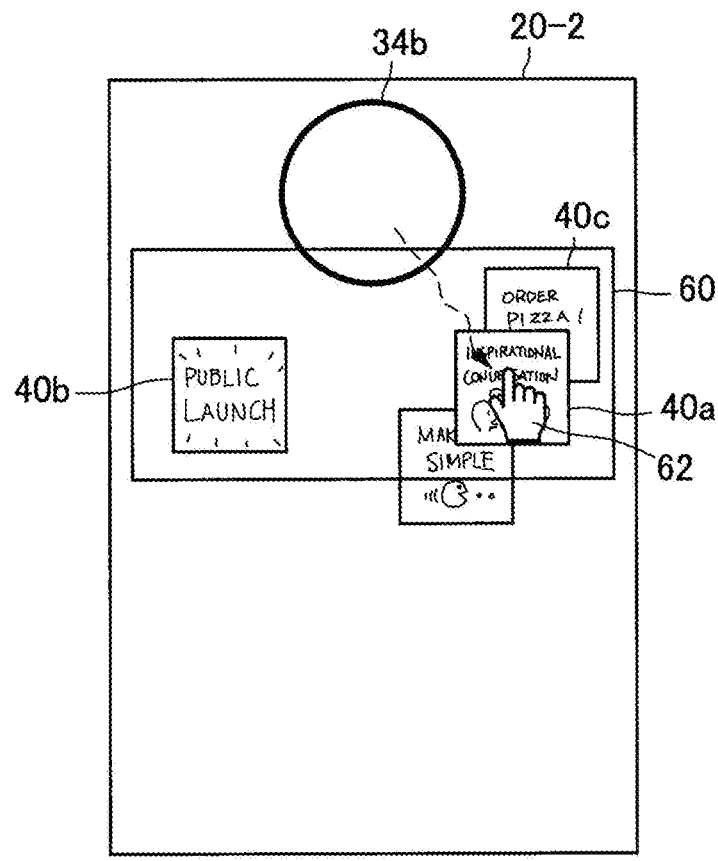
FIG. 27D is a diagram illustrating a display example of the display surface of the transfer destination at timing illustrated in FIG. 27C.

At the same time, as illustrated in FIG. 27D, the display control unit 106 displays a display (for example, a contour line and the like of the clipping area 60) indicating the clipping area 60 to be displayed on the whiteboard 20-2 in real time. Furthermore, the display control unit 106 displays an image 62 indicating a pointing position of the user at a position in the whiteboard 20-2 corresponding to the current position (pointing position) of the hand during the drag operation in the table surface 20-1. For example, each time the pointing position of the user is changed, the display control unit 106 sequentially changes the display position of the image 62 in the whiteboard 20-2.

Furthermore, after the timing when the user drags the tag 30 into the transfer area 34a, for example, as illustrated in FIG. 27C, the user drags the tag 30 on the table surface 20-1 without releasing his/her hand from the tag 30, and then releases his/her hand from the tag 30. In this case, the display control unit 106 transfers the image 40 corresponding to the tag 30 to the whiteboard 20-2. Then, the display control unit 106 displays the tag image 40 at the position of the whiteboard 20-2 corresponding to the position of the tag 30 on the table surface 20-1 at the timing when a hand is released from the tag 30.

Thereafter, the display control unit 106 returns the display state of the table surface 20-1 to an original display state. That is, instead of the display information in the clipping area 60, the display control unit 106 displays the display information displayed on the table surface 20-1 to be displayed on the table surface 20-1 again, for example, when the subsequent operation is detected.

{3-8-2. Effect}

As described above, according to the eighth application example, the user using the display surface of the transfer source can display the image corresponding to the object to be transferred at a desired position in the display surface of the transfer destination. Further, the user can determine the transfer position (display position) of the image corresponding to the object to be transferred on the display surface of the transfer destination by an intuitive operation such as a drag operation.

3-9. Ninth Application Example

The eighth application example has been described above. Next, a ninth application example according to the present embodiment will be described. According to the ninth application example, the user can easily scroll the target area defined on the display surface of the transfer destination.

{3-9-1. Display Control Unit 106}

The display control unit 106 according to the ninth application example moves the position of the target area in the display surface of the transfer destination based on the detection result of the subsequent operation while the state in which the user is pointing to the object to be transferred is maintained.

3-9-1-1. First Change Example of Target Area

Here, the above functions will be described in more detail with reference to FIGS. 28A and 28B. In the example illustrated in FIG. 28A, for example, as illustrated in FIG. 27C, it is assumed that the user using the table surface 20-1 drags the tag 30 into the transfer area 34a and then drags the tag 30 in the table surface 20-1 without releasing the hand from the tag 30.

Figure 28A:
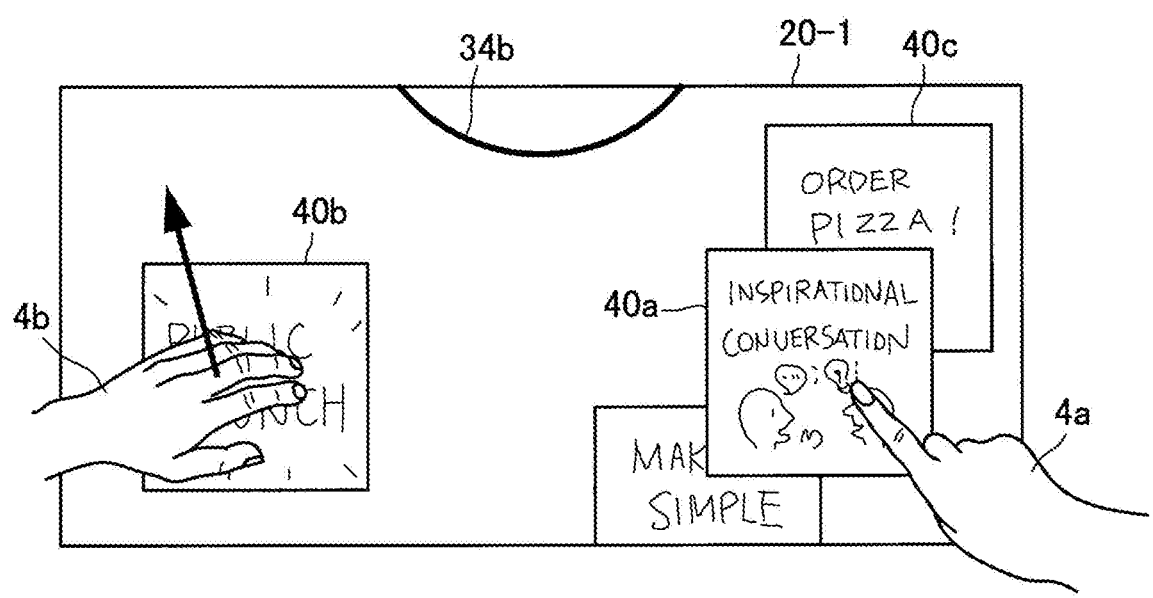
FIG. 28A is a diagram illustrating an example of an operation of a display surface of a transfer source for scrolling a target area in a display surface of a transfer destination according to a ninth application example of the present embodiment.
Figure 28B:
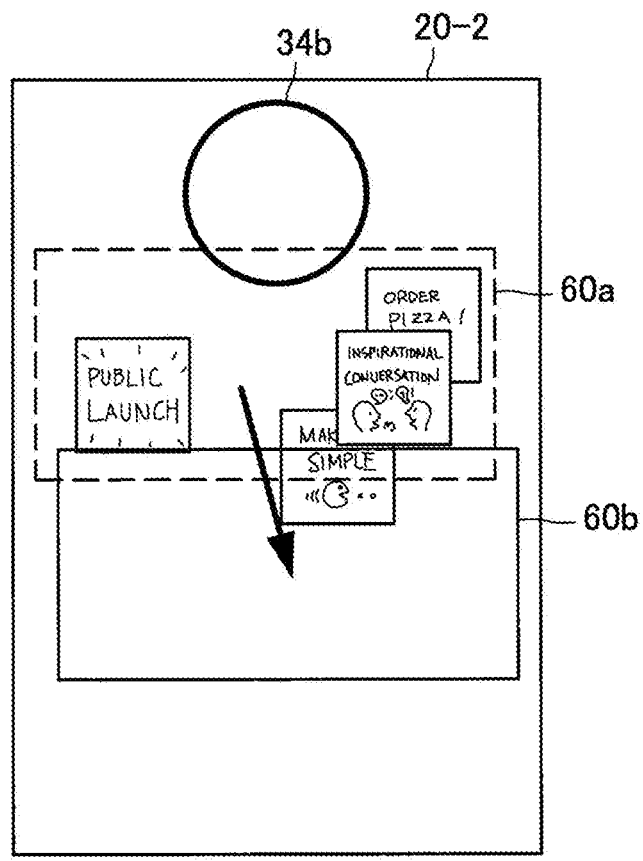
FIG. 28B is a diagram illustrating an example of movement of the target area based on the operation illustrated in FIG. 28A.

For example, as illustrated in FIG. 28A, it is assumed that an operation of sliding a left hand 4b on the table surface 20-1 is performed, for example, in a state in which for the left hand 4b is opened while maintaining the state in which the user touches the tag 30 with right hand 4a (that is, hand dragging the tag 30) on table surface 20-1. In this case, for example, as illustrated in FIG. 28B, the display control unit 106 continuously moves the position of the clipping area 60 in the whiteboard 20-2 according to the detection result of the movement (the moving distance and the moving direction) of the left hand 4b. That is, the display control unit 106 scrolls the clipping area 60 according to the detection result of the movement of the left hand 4b.

3-9-1-2. Second Change Example of Target Area

Next, another specific example of the above functions will be described in more detail with reference to FIGS. 29A and 29B. In the example illustrated in FIG. 29A, for example, it is assumed that the user using the table surface 20-1 (similar to the example illustrated in FIG. 28A) drags the tag 30 into the transfer area 34a and then drags the tag 30 in the table surface 20-1 without releasing the hand from the tag 30.

Figure 29A:
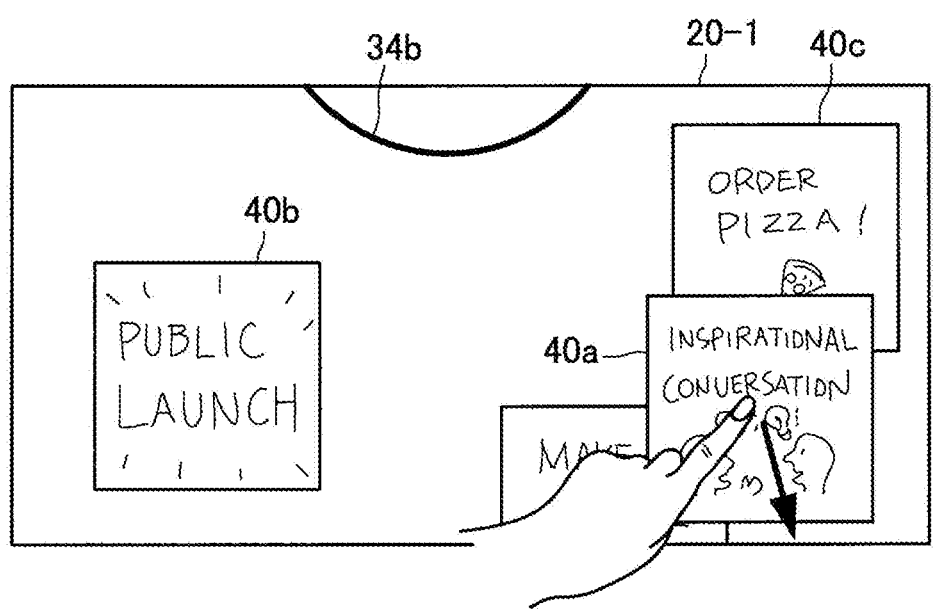
FIG. 29A is a diagram illustrating an example of another operation of a display surface of a transfer source for scrolling a target area in a display surface of a transfer destination according to the ninth application example.
Figure 29B:
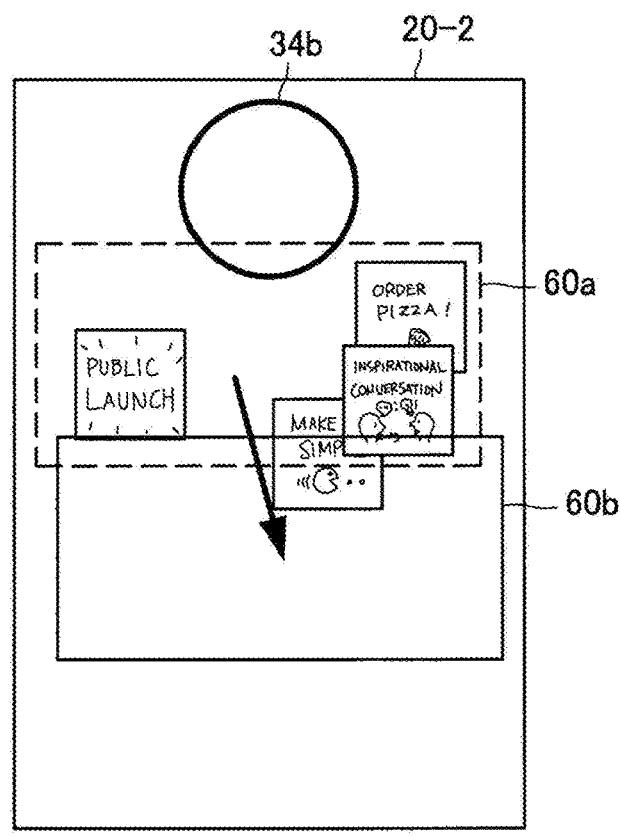
FIG. 29B is a diagram illustrating an example of the movement of the target area based on the operation illustrated in FIG. 28B.

For example, as illustrated in FIG. 29A, it is assumed that the user drags the image 40 corresponding to the tag 30 to any end of the table surface 20-1 with the right hand 4a. In this case, for example, while the right hand 4a is continuously positioned at the end, for example, as illustrated in FIG. 29B, the display control unit 106 continuously scrolls the clipping area 60 in the whiteboard 20-2 according to the position of the right hand 4a on the table surface 20-1. For example, while the right hand 4a is continuously positioned at the end, the display control unit 106 continuously scrolls the clipping area 60 to the direction of the whiteboard 20-2 corresponding to the direction in which the right hand 4a is dragged on the table surface 20-1.

According to these scroll examples, the user can easily change the clipping area 60 (that is, target area) in the display surface of the transfer destination, so the transfer position of the object to be transferred can be more easily determined. Therefore, even if the size of the display surface of the transfer source is significantly different from the size of the display surface of the transfer destination, the user can easily determine the transfer position of the object to be transferred.

3-10. Tenth Application Example

The ninth application example has been described above. Next, a tenth application example according to the present embodiment will be described. According to the tenth application example, an image indicating substantially the entire display surface of the transfer destination can be simultaneously displayed on the display surface of the transfer source, together with one or more pieces of display information within the target area on the display surface of the transfer destination.

{3-10-1. Display Control Unit 106}

The display control unit 106 according to the tenth application example displays a map image indicating all the display information displayed on almost the entire display surface of transfer destination on the display surface of the transfer source during the subsequent operation (that is, while the state in which the user is pointing to object to be transferred is maintained). For example, the display control unit 106 displays the map image in a smaller size than the display surface of the transfer source at a predetermined position in the display surface of the transfer source.

Figure 30A:
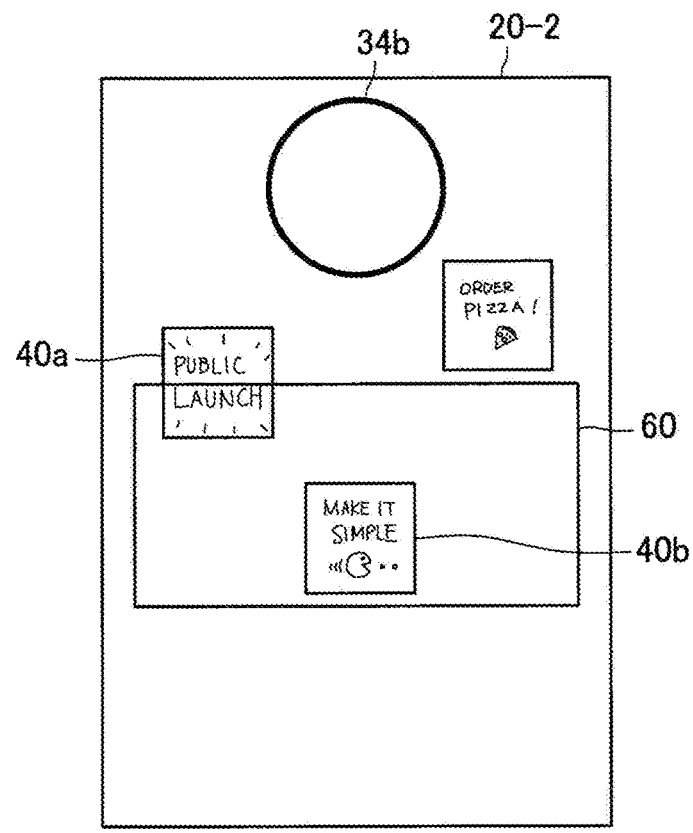
FIG. 30A is a diagram illustrating a display example of a display surface of a transfer destination according to a tenth application example of the present embodiment.
Figure 30B:
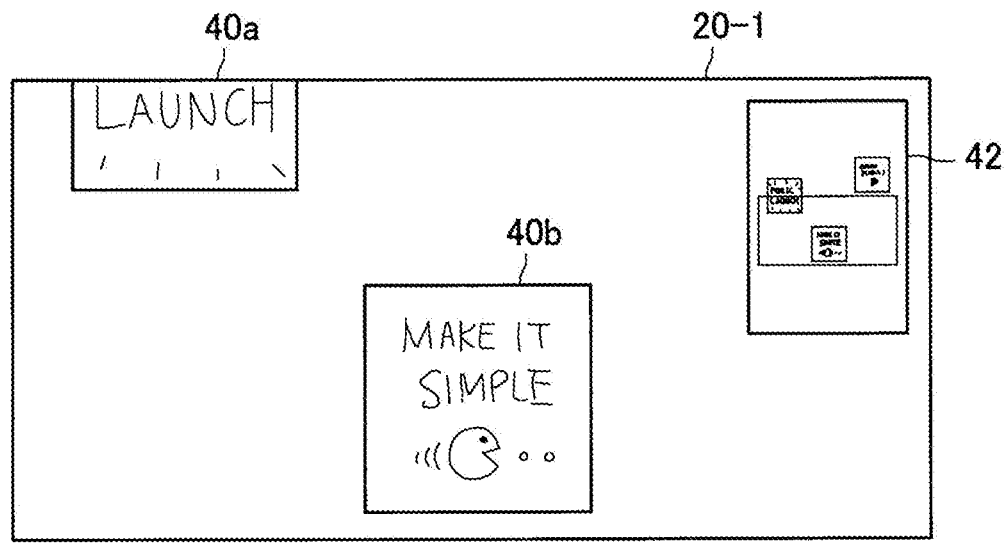
FIG. 30B is a diagram illustrating an example in which a map image indicating substantially the entire display surface of the transfer destination at timing illustrated in FIG. 30A is displayed on the display surface of the transfer source.

Here, the above functions will be described in more detail with reference to FIGS. 30A and 30B. For example, as described in the ninth application example, as illustrated in FIG. 30B, the display control unit 106 displays a map image 42 indicating all the display information displayed on substantially the entire display surface 20-2 of the transfer destination at a predetermined position in the display surface 20-1 of the transfer source during the scrolling of the clipping area 60 (that is, while the position of the clipping area 60 continuously moves). At this time, as illustrated in FIG. 30B, the map image 42 may include a display indicating the current clipping area 60. According to this display example, even if the size of the display surface of the transfer source is significantly different from the size of the display surface of the transfer destination, and even during the scrolling display, the user can grasp the positional relationship between the position of the current clipping area 60 and the entire display surface of the transfer destination in real time and easily.

3-11. Eleventh Application Example

The tenth application example has been described above. Next, an eleventh application example according to the present embodiment will be described.

{3-11-1. Display Control Unit 106}

The display control unit 106 according to the eleventh application example displays one or more pieces of display information on the display surface of the transfer destination and an operation image for moving the target area on the display surface of the transfer source during the subsequent operation (that is, while the state where the corresponding user is pointing to the object to be transferred is maintained).

Figure 31A:
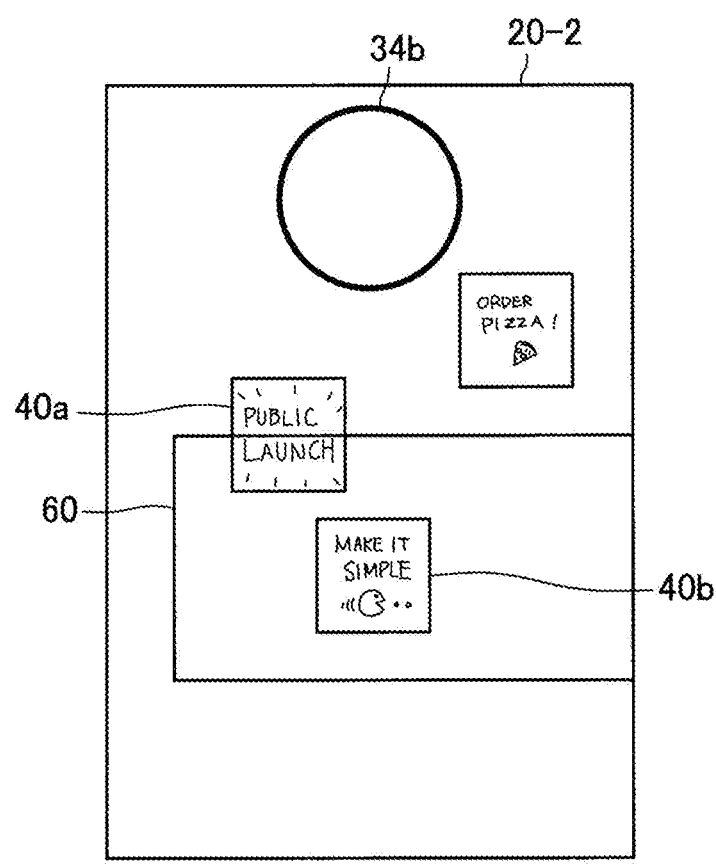
FIG. 31A is a diagram illustrating a display example of a display surface of a transfer destination according to an eleventh application example of the present embodiment.
Figure 31B:
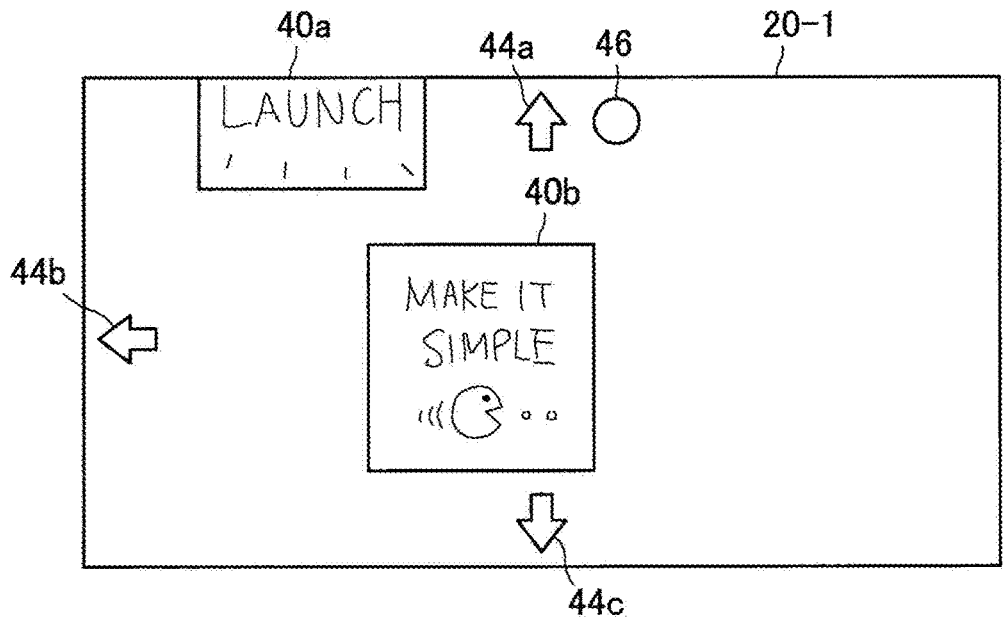
FIG. 31B is a diagram illustrating a display example of a display surface of a transfer source at timing illustrated in FIG. 31A according to the eleventh application example.

Here, the above functions will be described in more detail with reference to FIGS. 31A and 31B. FIG. 31A is a diagram illustrating a display example of the display surface 20-2 of the transfer destination at a certain timing. In addition, FIG. 31B is a diagram illustrating an example in which the display information included in the clipping area 60 set on the display surface 20-2 of the transfer destination is displayed on the display surface 20-1 of the transfer source as illustrated in FIG. 31A. As illustrated in FIG. 31B, for example, the display control unit 106 displays all the display information 40 included in the clipping area 60, and a plurality of scroll buttons 44 for scrolling the clipping area 60 in different directions on the display surface 20-1 of the transfer source. For example, the user can scroll the clipping area 60 in a direction corresponding to the scroll button 44 by touching each scroll button 44.

Furthermore, as illustrated in FIG. 31B, the display control unit 106 may further display an image 46 indicating the direction of the transfer area defined on the display surface 20-2 of the transfer destination on the display surface 20-1 of the transfer source. According to the display example, for example, even when the user moves the clipping area 60, the user can grasp the positional relationship between the current position of the clipping area 60 and the entire display surface of the transfer destination in real time and easily.

3-12. Twelfth Application Example

The eleventh application example has been described above. Next, a twelfth application example according to the present embodiment will be described. According to a twelfth application example, each user positioned at a different location from each other, which is remote from a location where a certain display surface is positioned, can easily perform co-editing on one or more pieces of display information displayed on a display surface.

In the twelfth application example, it is assumed that a location where at least three display surfaces are positioned are remote from each other (for example, separated by a predetermined distance or more). Furthermore, it is assumed that a first target area in one display surface 20-2 is displayed on another display surface 20-1, and a second target area in the display surface 20-2 is further displayed on another display surface 20-3. Here, the display surface 20-2 can be a display surface to be co-edited by one or more users using a display surface 20-1 and one or more users using a display surface 20-3.

{3-12-1. Display Control Unit 106}

A display control unit 106 according to the twelfth application example can display, on the display surface 20-1, a positional relationship between a first target area in the display surface 20-2 and a second target area in the display surface 20-2 while one or more pieces of the display information in the first target area in the display surface 20-2 are displayed on the display surface 20-1. At the same time, the display control unit 106 can display, on the display surface 20-3, a positional relationship between the first target area and the second target area while one or more pieces of display information within the second target area in the display surface 20-2 are displayed on the display surface 20-3.

Furthermore, the information processing system 10 can receive, from the display surface 20-3, second edition operation information of one or more users who are using the display surface 20-3, with respect to one or more pieces of display information within the second target area displayed on the display surface 20-3. In this case, while one or more pieces of display information within the first target area are displayed on the display surface 20-1, the display control unit 106 displays the operation content indicated by the second editing operation information on the display surface 20-1.

At the same time, the display control unit 106 can acquire the first editing operation information of one or more users who are using the display surface 20-1 for one or more pieces of display information in the first target area, and the operation content indicated by the first editing operation information can be displayed on the display surface 20-3.

3-12-1-1. Specific Example

Figure 32A:
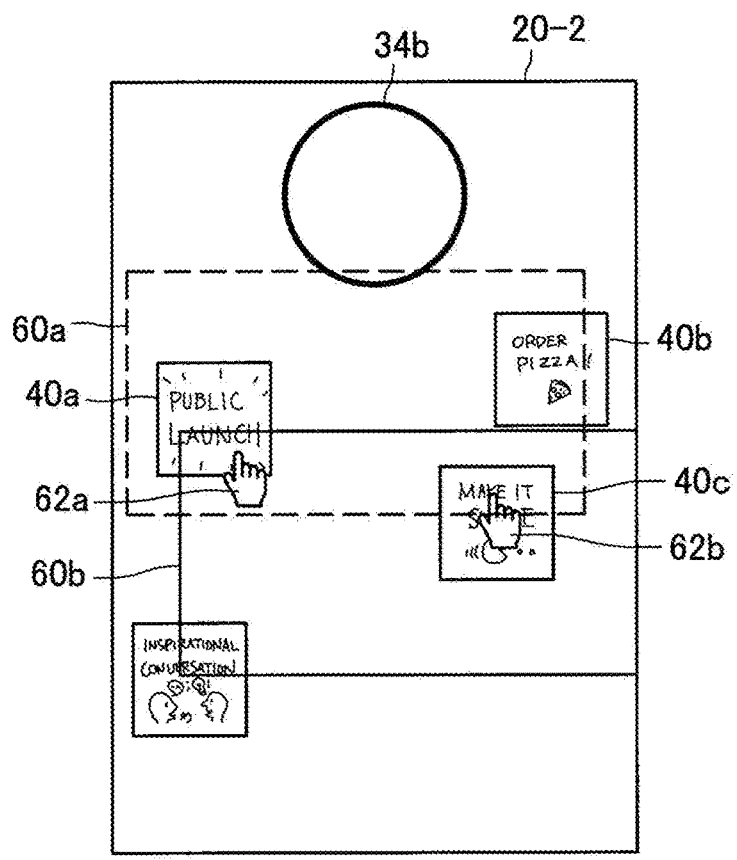
FIG. 32A is a diagram illustrating a display example of a whiteboard 20-2 when an editing task on a whiteboard 20-2 is simultaneously performed on a table surface 20-1 and a table surface 20-3, according to a twelfth application example of the present embodiment.

Here, the above functions will be described in more detail with reference to FIGS. 32A to 32C. In the example illustrated in FIGS. 32A to 32C, the whiteboard 20-2, the table surface 20-1, and the table surface 20-3 are positioned remote from each other. Then, all display information within the clipping area 60a in the whiteboard 20-2 is displayed on the table surface 20-1, and all the display information within the clipping area 60*b* in the whiteboard 20-2 is displayed on the table surface 20-3.

Figure 32B:
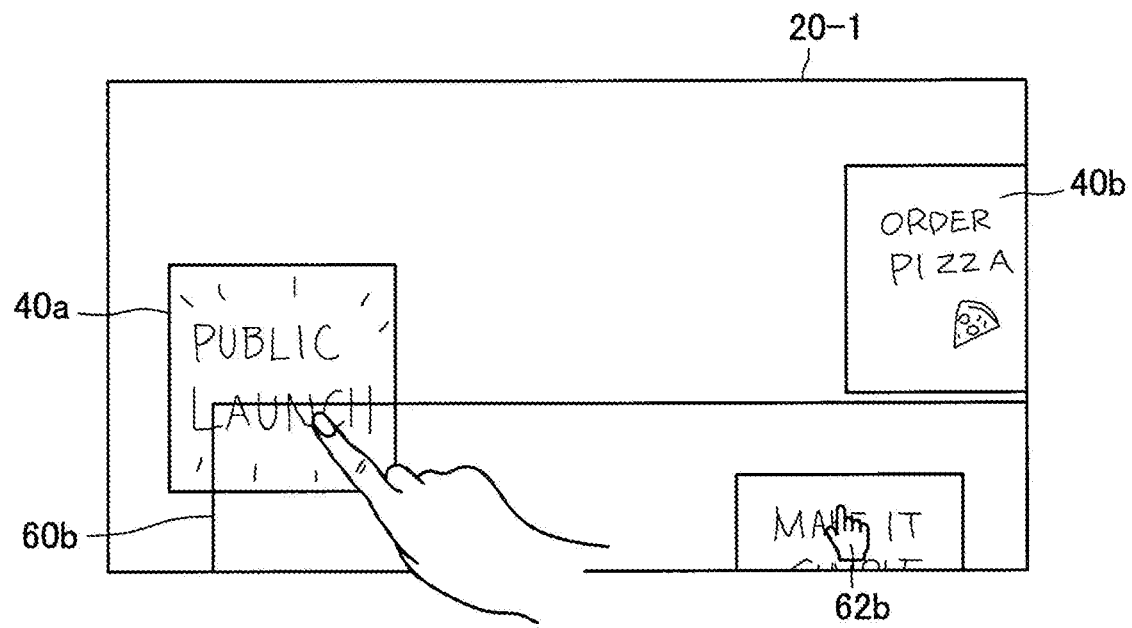
FIG. 32B is a diagram illustrating a display example of the table surface 20-1 at timing illustrated in FIG. 32A.

For example, as illustrated in FIG. 32B, the display control unit 106 displays all the display information 40 within the clipping area 60*a* on the table surface 20-1. At the same time, the display control unit 106 displays an image (for example, a contour line and the like of the clipping area 60*b*) indicating the clipping area 60*b* at a relative position of the clipping area 60*b* with respect to the position of the clipping area 60*a* on the table surface 20-1. Furthermore, the display control unit 106 displays an image 62*b* indicating the pointing position at a position on the table surface 20-1 corresponding to a pointing position (finger position or the like) of the user using the table surface 20-3 with respect to the position of the clipping area 60*a*.

Figure 32C:
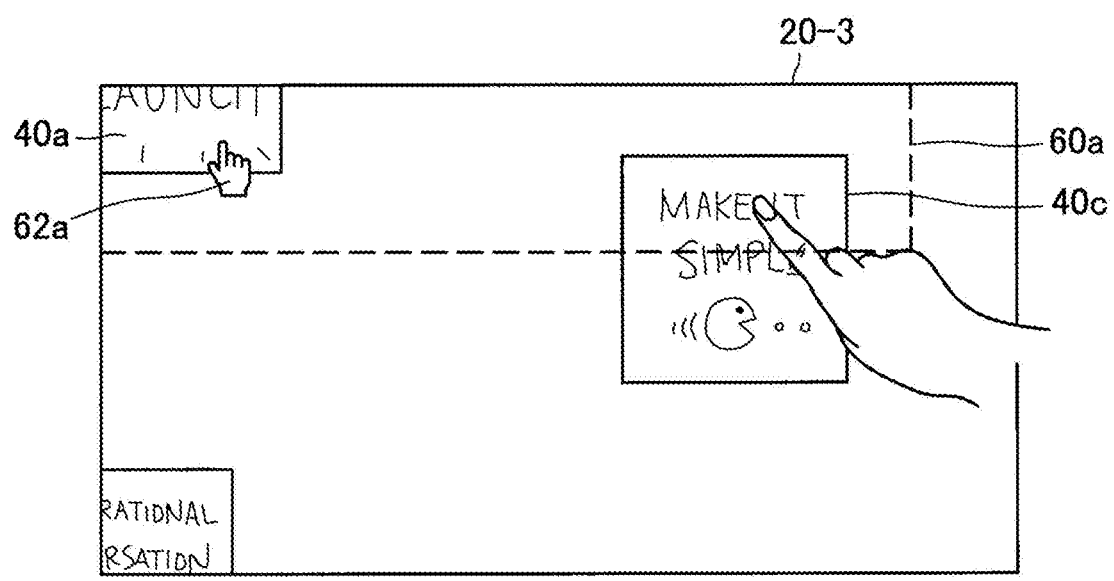
FIG. 32C is a diagram illustrating a display example of the table surface 20-3 at the timing illustrated in FIG. 32A.

Similarly, as illustrated in FIG. 32C, the display control unit 106 displays all the display information 40 within the clipping area 60*b* on the table surface 20-3. At the same time, the display control unit 106 displays, on the display surface 20-3, the image (for example, a contour line and the like of the clipping area 60*a*) indicating the clipping area 60*a* at a relative position of the clipping area 60*a* with respect to the position of the clipping area 60*b*. Furthermore, the display control unit 106 displays an image 62*a* indicating the pointing position at a position on the table surface 20-3 corresponding to the pointing position (finger position or the like) of the user using the table surface 20-1 with respect to the position of the clipping area 60*b*.

Further, as illustrated in FIG. 31A, the display control unit 106 displays the image indicating the position of the clipping area 60*a*, the image indicating the position of the clipping area 60*b*, the image 62*a* indicating the pointing position of the user using the table surface 20-1, and the image 62*b* indicating the pointing position of the user using the table surface 20-3 on the whiteboard 20-2 simultaneously and in real time.

According to the above-described display example, the user who uses the table surface 20-1 and the user who uses the table surface 20-3, respectively, can refer to a pointing position of the other user and the clipping area on the other side within the whiteboard 20-2 simultaneously. Then, it is possible to know the content that the other user is editing in the whiteboard 20-2 in real time. Therefore, users at different points can easily perform a co-editing task for the whiteboard 20-2.

3-13. Thirteenth Application Example

The twelfth application example has been described above. Next, a thirteenth application example according to the present embodiment will be described. According to the thirteenth application example, the user can easily specify the transfer position of the object to be transferred on the display surface of the transfer destination while overlooking the entire display surface of the transfer destination.

{3-13-1. Display Control Unit 106}

When the above subsequent operation is detected (that is, while a state in which the user is pointing to the object to be transferred is maintained), a display control unit 106 according to the thirteenth application example displays, on a display surface of a transfer source, a map image indicating all display information displayed on substantially the entire display surface of the transfer destination according to a pointing position of the user. Further, when the user specifies a position in a map image, the display control unit 106 determines a position in the display surface of the transfer destination corresponding to a specified position as a transfer position of an image corresponding to the object to be transferred.

Figure 33A:
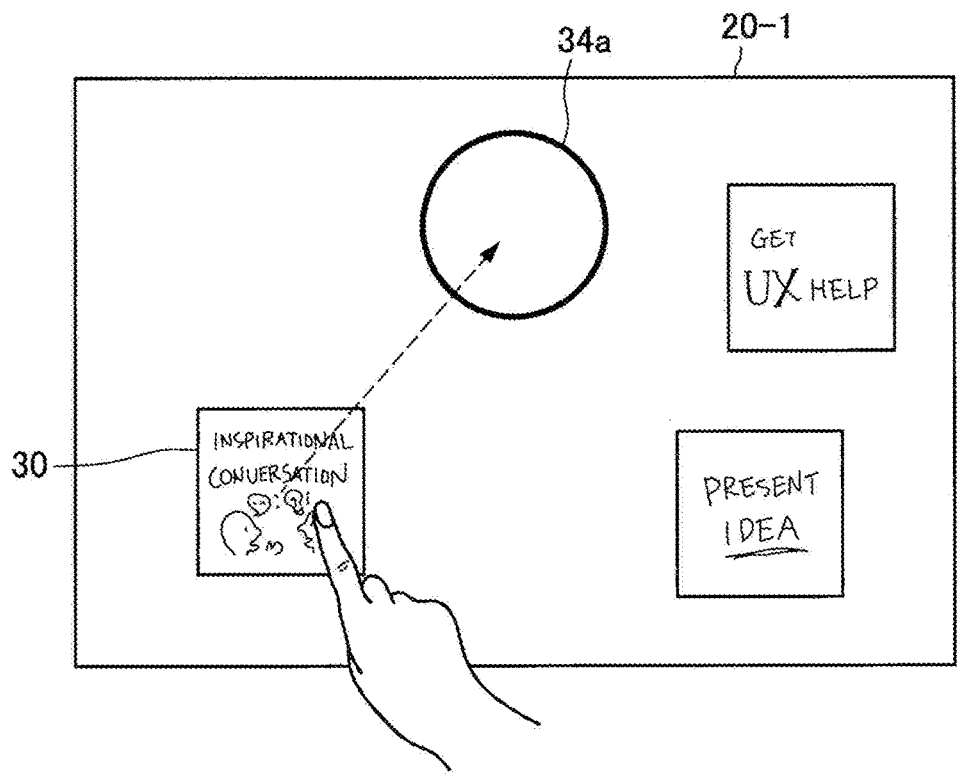
FIG. 33A is a diagram illustrating an example of an operation of moving an object to be transferred into a transfer area according to a thirteenth application example of the present embodiment.
Figure 33B:
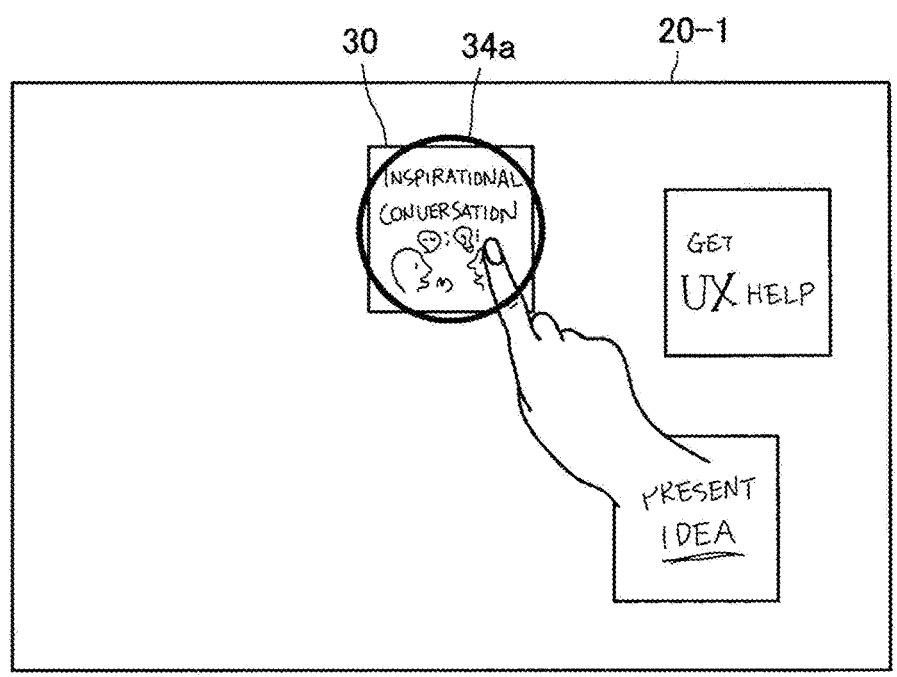
FIG. 33B is a diagram illustrating a state where a user continues to touch the object to be transferred after the timing illustrated in FIG. 33A.

Here, the above functions will be described in more detail with reference to FIGS. 33A to 33C. For example, as illustrated in FIG. 33A, the user using the display surface 20-1 drags the tag 30 positioned on the display surface 20-1 to the transfer area 34*a* displayed on the display surface 20-1. Thereafter, as illustrated in FIG. 33B, it is assumed that the user maintains the corresponding hand for a predetermined time or longer without releasing the hand from tag 30.

Figure 33C:
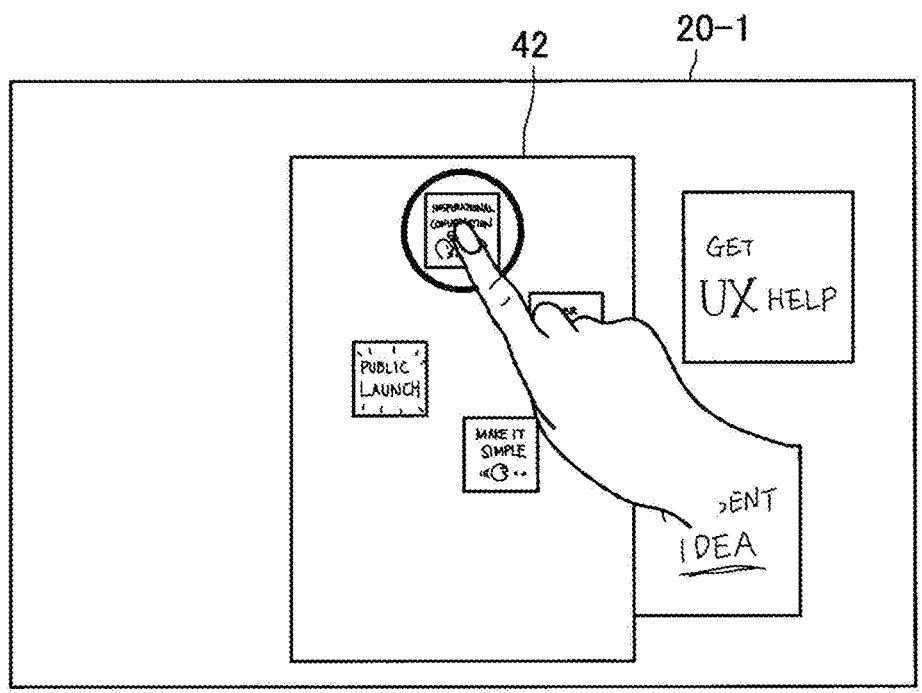
FIG. 33C is a diagram illustrating a display example of a map image displayed after the timing illustrated in FIG. 33B for specifying a transfer position of the corresponding object.

In this case, as illustrated in FIG. 33C, the display control unit 106 displays, on the display surface 20-1, the map image 42 indicating all the display information displayed on substantially the entire display surface 20-2 of the transfer destination with respect to a position of a finger touching the tag 30. Thereafter, the user specifies the transfer position of the image corresponding to the tag 30 by, for example, dragging the corresponding finger on the map image 42. In this case, the display control unit 106 can display, as the transfer position of the image 40 corresponding to the tag 30, the position of the display surface 20-2 of the transfer destination corresponding to the position touched by the finger in the map image 42 immediately before the finger is released from the tag 30.

According to the display example, the user can specify the transfer position of the image corresponding to the tag 30 while overlooking the entire display surface 20-2 of the transfer destination.

4. HARDWARE CONFIGURATION

Figure 34:
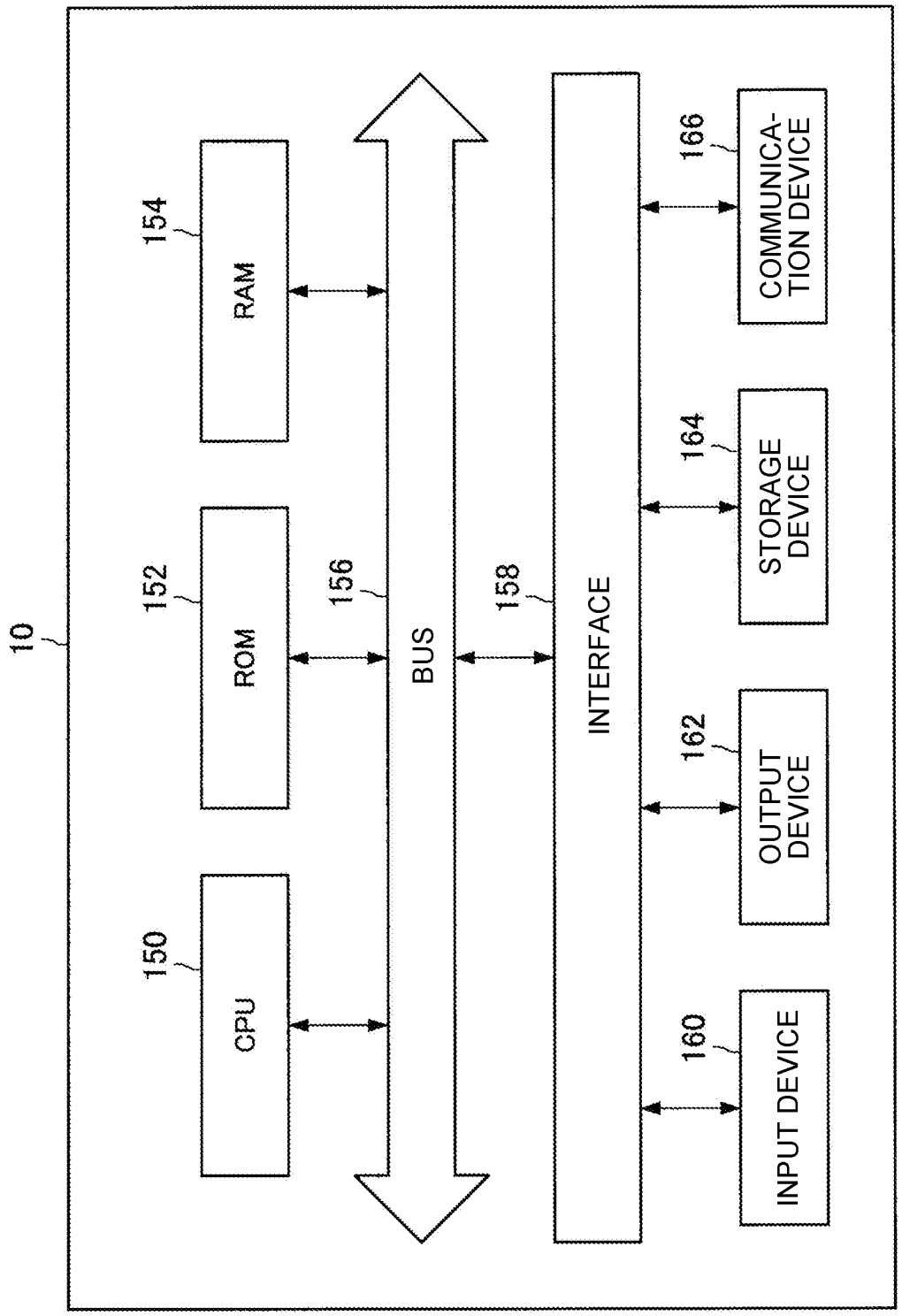
FIG. 34 is a diagram illustrating an example of a hardware configuration of the information processing system 10 according to the present embodiment.

Each application example according to the present embodiment has been described above. Next, a hardware configuration of the information processing system 10 according to the present embodiment will be described with reference to FIG. 34. As illustrated in FIG. 34, the information processing system 10 includes a CPU 150, a read only memory (ROM) 152, a random access memory (RAM) 154, a bus 156, an interface 158, an input device 160, an output device 162, a storage device 164, and a communication device 166.

The CPU 150 functions as an arithmetic processing device and a control device, and controls the overall operation of the information processing system 10 according to various programs. In addition, the CPU 150 can realize the functions of the processing unit 100 and the display processing unit 122 in the information processing system 10. The CPU 150 may be configured by a processor such as a microprocessor.

The ROM 152 stores programs used by the CPU 150, control data such as operation parameters, or the like.

The RAM 154 temporarily stores programs and the like executed by the CPU 150, for example.

The bus 156 includes a CPU bus and the like. The bus 156 connects the CPU 150, the ROM 152, and the RAM 154 to each other.

The interface 158 connects the input device 160, the output device 162, the storage device 164, and the communication device 166 to the bus 156.

The input device 160 includes an input unit (for example, a touch panel, a button, a switch, a dial, a lever, a microphone, or the like) for a user to input information. Further, the input device 160 includes an input control circuit that generates an input signal based on an input by a user and outputs the input signal to the CPU 150. The input device 160 can realize the function of the input unit 120 in the information processing system 10.

The output device 162 includes, for example, a display device such as a projector, a liquid crystal display device, an organic light emitting diode (OLED) device, or a lamp. In addition, the output device 162 includes a voice output device such as a speaker. The output device 162 can realize the function of the output unit 124 in the information processing system 10.

The storage device 164 is a device for storing data. The storage device 164 includes, for example, a storage medium, a recording device that records data on the storage medium, a reading device that reads data from the storage medium, a deletion device that deletes data recorded on the storage medium, and the like. The storage device 164 can realize the function of the storage unit 126 in the information processing system 10.

The communication device 166 is a communication interface including a communication device and the like that is connected to a communication network such as the Internet or a local area network (LAN). In addition, the communication device 166 may be a wireless LAN-compatible communication device, a long term evolution (LTE)-compatible communication device, or a wire communication device that performs wired communication.

5. MODIFIED EXAMPLES

As described above, the preferred embodiments of the present disclosure have been described in detail with reference to the accompanying drawings, but the present disclosure is not limited to such examples. It will be apparent to those skilled in the art to which the present disclosure belongs that various changes or modifications can be conceived within the scope of the technical idea described in the claims, and it is naturally understood that these changes or modifications fall within the technical scope of the present disclosure.

5-1. First Modified Example

For example, FIG. 6 illustrates an example in which the display processing unit 122 and the processing unit 100 are separately provided, but the present embodiment is not limited to this example. As the modified example, the display processing unit 122 and the processing unit 100 may be integrally configured.

5-2. Second Modified Example

Figure 35:
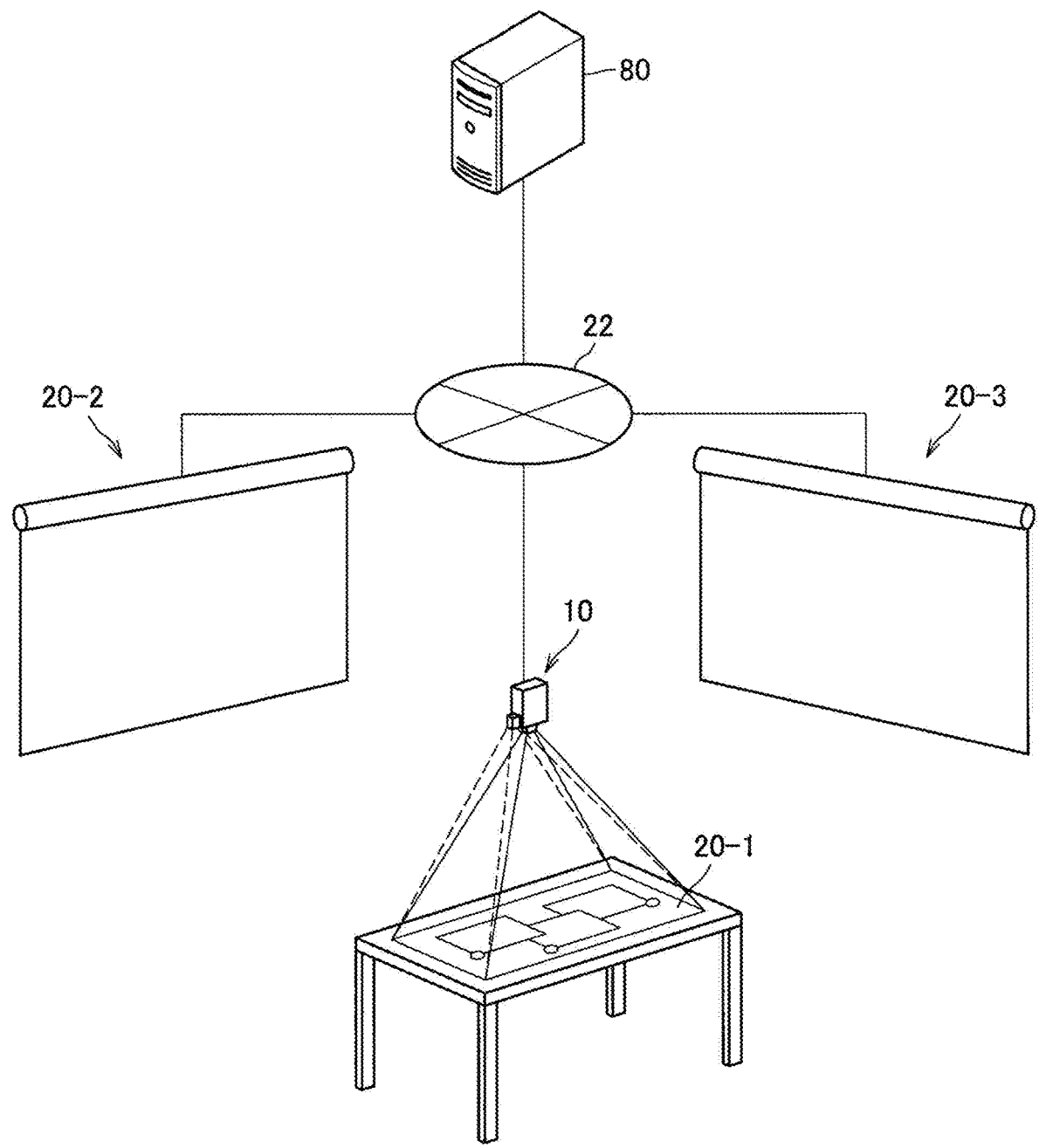
FIG. 35 is a diagram illustrating a configuration example of a system according to a modified example of the present embodiment.

The configuration example of the system according to the present embodiment is not limited to the above-described example. For example, as illustrated in FIG. 35, the server 80 including the processing unit 100 according to the above-described embodiment and each application example may be connected to the communication network 22. In this case, the server 80 can communicate with each display surface 20 connected to the communication network 22 via the communication network 22. Further, the server 80 can perform the display control substantially similar to the contents described in the above-described embodiment and each application example on each display surface 20. For example, the input unit 120, the display processing unit 122, and the output unit 124 described above may each be arranged at the positions (alternatively, on each display surface 20 itself) where each display surface 20 is positioned. In this case, the server 80 can receive the input information acquired by the input unit 120 corresponding to each display surface 20 from each display surface 20. Further, the server 80 may perform display control substantially the same as the contents described in the above-described embodiment and each application example on each display surface 20 based on the input information received from each display surface 20.

5-3. Third Modified Example

As another modified example, a device (information processing device) including the processing unit 100 according to the present embodiment may be a device including at least one of the input unit 120, the display processing unit 122, or the output unit 124 described above. For example, the information processing device may be a projector including the processing unit 100, the display processing unit 122, and the output unit 124.

Alternatively, the information processing device may be configured integrally with the table 90. Alternatively, the information processing device may be connected to at least one of the input unit 120, the display processing unit 122, and the output unit 124 via the communication network. For example, the information processing device may be a server, a general-purpose personal computer (PC), a tablet terminal, a game machine, a mobile phone such as a smartphone, a portable music player, a television receiver, a wearable device such as a head mounted display (HMD) or a smartwatch, or a robot (for example, a humanoid robot, a self-driving car, or the like).

5-4. Fourth Modified Example

Each step in the above-described processing flow may not be necessarily performed in the order described. For example, each step may be processed in an appropriately changed order. Further, each step may be partially concurrently or individually processed instead of being processed in time series. In addition, some of the described steps may be omitted, or another step may be further added.

In addition, according to each of the above-described embodiments, a computer program that causes hardware such as the CPU 150, the ROM 152, and the RAM 154 to perform functions equivalent to those of each component of the information processing system 10 (in particular, the processing unit 100) according to the above-described embodiment can also be provided. In addition, a storage medium on which the computer program is recorded is provided.

In addition, the effects described in the present specification are merely illustrative or exemplary, and are not limited to those described in the present specification. That is, the technology according to the present disclosure can exhibit other effects apparent to those skilled in the art from the description of the present specification, in addition to or instead of the effects described above.

The following configurations are also within the technical scope of the present disclosure.

(1)

An information processing system, comprising:

a processing unit that performs, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface, and changes a display state of the second display surface based on a detection result of a second operation by the first user after the first operation.

(2)

The information processing system according to (1), wherein the processing unit displays information corresponding to the first object on the second display surface based on the detection result of the second operation.

(3)

The information processing system according to (2), wherein the second operation is an operation that continuously performs the first operation while maintaining an operation state for the first object in a predetermined operation state.

(4)

The information processing system according to (3), wherein the predetermined display control includes displaying, on the first display surface, one or more pieces of display information within a first target area on the second display surface.

(5)

The information processing system according to (4), wherein the first target area is a partial area in the second display surface, the processing unit further changes the first target area from a first area in the second display surface to a second area in the second display surface based on the detection result of the second operation, and the processing unit switches display information displayed on the first display surface from one or more pieces of display information within the first area to the one or more pieces of display information within the second area when the first target area is changed from the first area to the second area.

(6)

The information processing system according to (4), wherein the first target area is substantially the entirety of the second display surface, the predetermined display control includes displaying, on the first display surface, a map image indicating one or more pieces of display information displayed on substantially the entirety of the second display surface, and a size of the map image is smaller than a size of the first display surface.

(7)

The information processing system according to any one of (4) to (6), wherein a location where the second display surface is positioned is remote from a location where the first display surface is positioned, the processing unit displays the one or more pieces of display information within the second target area on the second display surface on a third display surface positioned at a location remote from each of the locations where the first display surface is positioned and the location where the second display surface is positioned, and the processing unit further displays a display indicating a positional relationship between the first target area and the second target area on the first display surface while the one or more pieces of display information in the first target area are displayed on the first display surface.

(8)

The information processing system according to (7), further comprising:

a receiving unit that receives pointing information indicating a position where a second user is pointing on the third display surface while the one or more pieces of display information in the second target area is displayed on the third display surface, wherein the processing unit further displays a predetermined image at a position in the first display surface corresponding to a pointing position indicated by the pointing information while the one or more pieces of display information in the first target area is displayed on the first display surface.

(9)

The information processing system according to any one of (4) to (8), wherein the processing unit further determines a transfer position on the second display surface of the information corresponding to the first object based on the detection result of the second operation.

(10)

The information processing system according to (9), wherein the first target area is substantially the entirety of the second display surface, the predetermined display control includes displaying, on the first display surface, a map image indicating one or more pieces of display information displayed on substantially the entirety of the second display surface, and a size of a map image is smaller than a size of the first display surface, and the second operation includes specifying the transfer position of the information corresponding to the first object on the second display surface by the first user in the map image.

(11)

The information processing system according to (9) or (10), wherein the information corresponding to the first object is an image corresponding to the first object, and the processing unit further displays the image corresponding to the first object to be displayed at the transfer position on the second display surface.

(12)

The information processing system according to any one of (3) to (11), wherein the processing unit further determines at least one display surface of the transfer destination of the information corresponding to the first object from among a plurality of display surfaces corresponding to the first display surface based on the information indicating a state of the one or more predetermined transfer objects and the detection result of the first operation, and the plurality of display surfaces include the second display surface.

(13)

The information processing system according to (12), wherein the one or more predetermined transfer objects exist in plurality, each of the plurality of predetermined transfer objects is a real object, and the processing unit determines at least one display surface of the transfer destination of the information corresponding to the first object from among the plurality of display surfaces based on whether or not a distance between any two transfer objects of the plurality of predetermined transfer objects is equal to or less than a predetermined threshold and whether or not an arrangement of the any two transfer objects is a predetermined arrangement, when the first operation is detected.

(14) The information processing system according to (12) or (13), wherein the predetermined transfer object is a real object having a plurality of surfaces, each of the plurality of surfaces of the predetermined transfer object is associated with a different display surface of the plurality of display surfaces, the first operation includes allowing the first user to arrange the first object on one of the plurality of surfaces of the predetermined transfer object, and the processing unit determines the display surface associated with the surface on which the first object is arranged among the plurality of surfaces of the predetermined transfer object as the display surface of the transfer destination of the information corresponding to the first object, when the first operation is detected.

(15) The information processing system according to any one of (12) to (14), wherein the predetermined transfer object is a real object having at least one inclined surface, the first operation includes allowing the first user to arrange the first object on any of the at least one inclined surface of the predetermined transfer object, and the processing unit determines the display surface positioned in a direction in which the first object is directed as the display surface of the transfer destination of the information corresponding to the first object from among the plurality of display surfaces, when the first operation is detected.

(16) The information processing system according to any one of (12) to (15), wherein the predetermined transfer object is a real object, and the processing unit continuously changes a display position of the image within the second display surface based on a detection result of a moving progress of the first object with respect to the predetermined transfer object and a detection result of a posture of the predetermined transfer object during the first operation, when the image corresponding to the first object is displayed on the second display surface.

(17) The information processing system according to any one of (12) to (16), wherein the information corresponding to the first object is an image corresponding to the first object, the information associated with the second display surface includes conversion rule information of a character string associated with the second display surface, and the processing unit displays an image including a second character string, which is associated with the second display surface and converted based on the conversion rule information of the character string and the first character string as the image corresponding to the first object on the second display surface when the first character string is included in the first object.

(18) The information processing system according to any one of (12) to (17), wherein the information corresponding to the first object is an image corresponding to the first object, and the information associated with the second display surface includes conversion rule information of a format of an image associated with the second display surface, and the processing unit displays an image of a format determined based on the conversion rule information of the format of the image associated with the second display surface and the first object as the image corresponding to the first object on the second display surface.

(19) An information processing method, comprising:

performing, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface; and changing, by a processor, a display state of the second display surface based on a detection result of a second operation by the first user after the detection of the first operation.

(20) A program for executing a computer to function as a processing unit that performs, on a first display surface, a predetermined display control indicating that one or more pieces of display information in a second display surface corresponding to the first display surface is changed to be operable in the first display surface when a first operation for a first user to move a first object to a detection area having a predetermined positional relationship with one or more predetermined transfer objects positioned in the first display surface, and changes a display state of the second display surface based on a detection result of a second operation by the first user after the detection of the first operation.

REFERENCE SIGNS LIST

10 Information processing system
22 Communication network
32 Transfer base
50 Smartphone
80 Server
90 Table
100 Processing unit
102 Transfer operation detection unit
104 Surface attribute matching processing unit
106 Display control unit
120 Input unit
122 Display processing unit
124 Output unit
126 Storage unit
128 Surface attribute information DB

The invention claimed is:

1. An information processing system, comprising:
a processing unit configured to
perform, on a first display surface, a predetermined display control indicating that one or more pieces of display information in a second display surface corresponding to the first display surface is changed to be operable in the first display surface based on a first operation of a first user to move a first object to a detection area having a predetermined positional relationship with a plurality of predetermined transfer objects positioned in the first display surface, change a display state of the second display surface based on a detection result of a second operation by the first user after the first operation, and display information corresponding to the first object on the second display surface based on the detection result of the second operation, wherein each of the plurality of predetermined transfer objects is a real object, wherein the processing unit determines at least one display surface of a transfer destination of the information corresponding to the first object from among a plurality of display surfaces based on whether or not a distance between any two transfer objects of the plurality of predetermined transfer objects is equal to or less than a predetermined threshold and whether or not an arrangement of the any two transfer objects is a predetermined arrangement, when the first operation is detected, wherein the second operation is an operation that continuously performs the first operation while maintaining an operation state for the first object in a predetermined operation state, and wherein the processing unit is implemented via at least one processor.

2. The information processing system according to claim 1, wherein the predetermined display control includes displaying, on the first display surface, one or more pieces of display information within a first target area on the second display surface.

3. The information processing system according to claim 2, wherein the first target area is a partial area in the second display surface, and wherein the processing unit is further configured to
change the first target area from a first area in the second display surface to a second area in the second display surface based on the detection result of the second operation, and
switch display information displayed on the first display surface from one or more pieces of display information within the first area to the one or more pieces of display information within the second area when the first target area is changed from the first area to the second area.

4. The information processing system according to claim 2, wherein
the first target area is substantially the entirety of the second display surface,
the predetermined display control includes displaying, on the first display surface, a map image indicating one or more pieces of display information displayed on substantially the entirety of the second display surface, and
a size of the map image is smaller than a size of the first display surface.

5. The information processing system according to claim 2, wherein
a location where the second display surface is positioned is remote from a location where the first display surface is positioned,
the processing unit displays the one or more pieces of display information within the second target area on the second display surface on a third display surface positioned at a location remote from each of the locations where the first display surface is positioned and the location where the second display surface is positioned, and
the processing unit further displays a display indicating a positional relationship between the first target area and the second target area on the first display surface while the one or more pieces of display information in the first target area are displayed on the first display surface.

6. The information processing system according to claim 5, further comprising:
a receiving unit configured to receive pointing information indicating a position where a second user is pointing on the third display surface while the one or more pieces of display information in the second target area is displayed on the third display surface,
wherein the processing unit further displays a predetermined image at a position in the first display surface corresponding to a pointing position indicated by the pointing information while the one or more pieces of display information in the first target area is displayed on the first display surface, and
wherein the receiving unit is implanted via at least one processor.

7. The information processing system according to claim 2, wherein the processing unit further determines a transfer position on the second display surface of the information corresponding to the first object based on the detection result of the second operation.

8. The information processing system according to claim 7, wherein
the first target area is substantially the entirety of the second display surface,
the predetermined display control includes displaying, on the first display surface, a map image indicating one or more pieces of display information displayed on substantially the entirety of the second display surface, and
a size of a map image is smaller than a size of the first display surface, and
the second operation includes specifying the transfer position of the information corresponding to the first object on the second display surface by the first user in the map image.

9. The information processing system according to claim 7, wherein
the information corresponding to the first object is an image corresponding to the first object, and
the processing unit further displays the image corresponding to the first object to be displayed at the transfer position on the second display surface.

10. The information processing system according to claim 1, wherein
the processing unit is further configured to determine the at least one display surface of the transfer destination of the information corresponding to the first object from among a plurality of display surfaces corresponding to the first display surface based on information indicating a state of the plurality of predetermined transfer objects and the detection result of the first operation, and
the plurality of display surfaces include the second display surface.

11. The information processing system according to claim 10, wherein
the predetermined transfer object is a real object having a plurality of surfaces,
each of the plurality of surfaces of the predetermined transfer object is associated with a different display surface of the plurality of display surfaces,
the first operation includes allowing the first user to arrange the first object on one of the plurality of surfaces of the predetermined transfer object, and
the processing unit determines the display surface associated with the surface on which the first object is arranged among the plurality of surfaces of the predetermined transfer object as the display surface of the transfer destination of the information corresponding to the first object, when the first operation is detected.

12. The information processing system according to claim 10, wherein
the predetermined transfer object is a real object having at least one inclined surface,
the first operation includes allowing the first user to arrange the first object on any of the at least one inclined surface of the predetermined transfer object, and
the processing unit determines the display surface positioned in a direction in which the first object is directed as the display surface of the transfer destination of the information corresponding to the first object from among the plurality of display surfaces, when the first operation is detected.

13. The information processing system according to claim 10, wherein
the predetermined transfer object is a real object, and
the processing unit continuously changes a display position of the image within the second display surface based on a detection result of a moving progress of the first object with respect to the predetermined transfer object and a detection result of a posture of the predetermined transfer object during the first operation, when the image corresponding to the first object is displayed on the second display surface.

14. The information processing system according to claim 10, wherein
the information corresponding to the first object is an image corresponding to the first object,
the information associated with the second display surface includes conversion rule information of a character string associated with the second display surface, and
the processing unit displays an image including a second character string, which is associated with the second display surface and converted based on the conversion rule information of the character string and the first character string as the image corresponding to the first object on the second display surface when the first character string is included in the first object.

15. The information processing system according to claim 10, wherein
the information corresponding to the first object is an image corresponding to the first object, and
the information associated with the second display surface includes conversion rule information of a format of an image associated with the second display surface, and
the processing unit displays an image of a format determined based on the conversion rule information of the format of the image associated with the second display surface and the first object as the image corresponding to the first object on the second display surface.

16. An information processing method, comprising:
performing, on a first display surface, a predetermined display control indicating that one or more pieces of display information in a second display surface corresponding to the first display surface is changed to be operable in the first display surface based on a first operation of a first user to move a first object to a detection area having a predetermined positional relationship with a plurality of predetermined transfer objects positioned in the first display surface;
changing, by a processor, a display state of the second display surface based on a detection result of a second operation by the first user after the detection of the first operation; and
displaying information corresponding to the first object on the second display surface based on the detection result of the second operation,
wherein each of the plurality of predetermined transfer objects is a real object,
wherein at least one display surface of a transfer destination of the information corresponding to the first object is determined from among the plurality of display surfaces based on whether or not a distance between any two transfer objects of the plurality of predetermined transfer objects is equal to or less than a predetermined threshold and whether or not an arrangement of the any two transfer objects is a predetermined arrangement, when the first operation is detected, and
wherein the second operation is an operation that continuously performs the first operation while maintaining an operation state for the first object in a predetermined operation state.

17. A non-transitory computer-readable storage medium having embodied thereon a program, which when executed by a computer causes the computer to execute a method, the method comprising:
performing, on a first display surface, a predetermined display control indicating that one or more pieces of display information in a second display surface corresponding to the first display surface is changed to be operable in the first display surface based on a first operation of a first user to move a first object to a detection area having a predetermined positional relationship with a plurality of predetermined transfer objects positioned in the first display surface;
changing a display state of the second display surface based on a detection result of a second operation by the first user after the detection of the first operation; and
displaying information corresponding to the first object on the second display surface based on the detection result of the second operation,
wherein each of the plurality of predetermined transfer objects is a real object,
wherein at least one display surface of a transfer destination of the information corresponding to the first object is determined from among the plurality of display surfaces based on whether or not a distance between any two transfer objects of the plurality of predetermined transfer objects is equal to or less than a predetermined threshold and whether or not an arrangement of the any two transfer objects is a predetermined arrangement, when the first operation is detected, and
wherein the second operation is an operation that continuously performs the first operation while maintaining an operation state for the first object in a predetermined operation state.

* * * * *